United States Patent
Siwiak

(10) Patent No.: US 7,206,334 B2
(45) Date of Patent: Apr. 17, 2007

(54) ULTRA-WIDEBAND HIGH DATA-RATE COMMUNICATION APPARATUS AND ASSOCIATED METHODS

(75) Inventor: Kazimierz Siwiak, Coral Springs, FL (US)

(73) Assignee: Alereon, Inc., Austin, TX (US)

(*) Notice: Subject to any disclaimer, the term of this patent is extended or adjusted under 35 U.S.C. 154(b) by 473 days.

(21) Appl. No.: 10/436,646

(22) Filed: May 13, 2003

(65) Prior Publication Data

US 2004/0017841 A1 Jan. 29, 2004

Related U.S. Application Data

(63) Continuation-in-part of application No. 10/206,648, filed on Jul. 26, 2002, now abandoned.

(60) Provisional application No. 60/451,538, filed on Mar. 3, 2003, provisional application No. 60/402,677, filed on Aug. 12, 2002, provisional application No. 60/401,711, filed on Aug. 7, 2002.

(51) Int. Cl.
*H04B 1/00* (2006.01)

(52) U.S. Cl. ...................... 375/146; 375/295

(58) Field of Classification Search ............ 375/259, 375/261, 271, 279, 280, 281, 219, 223, 295, 375/298, 300, 302, 308; 455/91, 73

See application file for complete search history.

(56) References Cited

U.S. PATENT DOCUMENTS

| | | |
|---|---|---|
| 2,999,129 A | 9/1961 | Lynch |
| 3,552,520 A | 1/1971 | Naubereit |
| 3,737,776 A * | 6/1973 | Fletcher et al. ............. 375/308 |
| 5,363,108 A | 11/1994 | Fullerton |

(Continued)

FOREIGN PATENT DOCUMENTS

| | | |
|---|---|---|
| GB | 2335830 A | 9/1999 |
| WO | WO 01/76086 A2 | 10/2001 |

OTHER PUBLICATIONS

International Search Report for PCT/US03/25809 mailed Feb. 4, 2004.
International Search Report for PCT/US03/22815 mailed Jan. 8, 2004.
Ziemer et al., "Principles of Communications," Systems Modulation, And Noise, Second Edition, pp. 427-430.
Siwiak et al., "An Introduction to Ultra Wide Band Wireless Technology," Wireless Local Area Networks, The New Wireless Revolution, Chapter 15, pp. 219-231.
Couch, "Digital and Analog Communication Systems," Bandpass Communication Systems, pp. 344-379.
Lee and Miller, CDMA Systems Engineering Handbook, Artech House (ISBN 0-89006-990-5), Fig. 1-9.

*Primary Examiner*—Jean B. Corrielus
*Assistant Examiner*—Nader Bolourchi
(74) *Attorney, Agent, or Firm*—Sprinkle IP Law Group

(57) ABSTRACT

An RF transmitter includes a reference signal generator, a signal generator, and a mixer. The reference signal generator provides a reference signal that has a prescribed or desired frequency. The signal generator provides an operating signal in response to a selection signal. The operating signal has a frequency that equals the frequency of the reference signal multiplied by a number. The mixer mixes the operating signal with another signal to generate a transmission signal. An RF receiver includes a first mixer, a second mixer, an integrator/sampler, and a signal generator. The first mixer receives as its inputs an input RF signal and a second input signal, and mixes its input signals to generate a mixed signal. The integrator/sampler receives the mixed signal and processes it to provide an output signal. The signal generator provides an operating signal in response to a selection signal. The operating signal has a frequency equal to the frequency of a reference signal, multiplied by a number. The second mixer mixes the operating signal with a template signal to generate the second input signal of the first mixer.

12 Claims, 35 Drawing Sheets

| | |
|---|---|
| 40 | controller input |
| 41 | reference clock |
| 42 | timing controller |
| 43 | data buffer |
| 44 | data input |
| 45 | PN generator |
| 46 | data/PN combiner |
| 47 | mixer |
| 48 | antenna |
| 49 | harmonic generator |

U.S. PATENT DOCUMENTS

| | | | |
|---|---|---|---|
| 5,592,131 A * | 1/1997 | Labreche et al. ............ 332/103 |
| 5,677,927 A | 10/1997 | Fullerton et al. |
| 5,764,696 A | 6/1998 | Barnes et al. |
| 5,960,031 A | 9/1999 | Fullerton et al. |
| 5,969,663 A | 10/1999 | Fullerton et al. |
| 6,002,707 A * | 12/1999 | Thue ........................... 375/130 |
| 6,026,125 A * | 2/2000 | Larrick, et al. ............. 375/295 |
| 6,038,249 A | 3/2000 | Akiyama |
| 6,091,374 A | 7/2000 | Barnes |
| 6,356,647 B1 * | 3/2002 | Bober et al. ................. 382/107 |
| 6,384,773 B1 | 5/2002 | Martin et al. |
| 6,400,329 B1 | 6/2002 | Barnes |
| 6,437,756 B1 | 8/2002 | Schantz |
| 6,538,615 B1 | 3/2003 | Schantz |
| 6,593,886 B2 | 7/2003 | Schantz |
| 6,603,818 B1 * | 8/2003 | Dress et al. ................. 375/295 |
| 6,606,051 B1 | 8/2003 | Fullerton et al. |
| 6,668,008 B1 * | 12/2003 | Panasik ...................... 375/139 |
| 6,774,859 B2 | 8/2004 | Schantz et al. |
| 6,845,253 B1 | 1/2005 | Schantz |

* cited by examiner

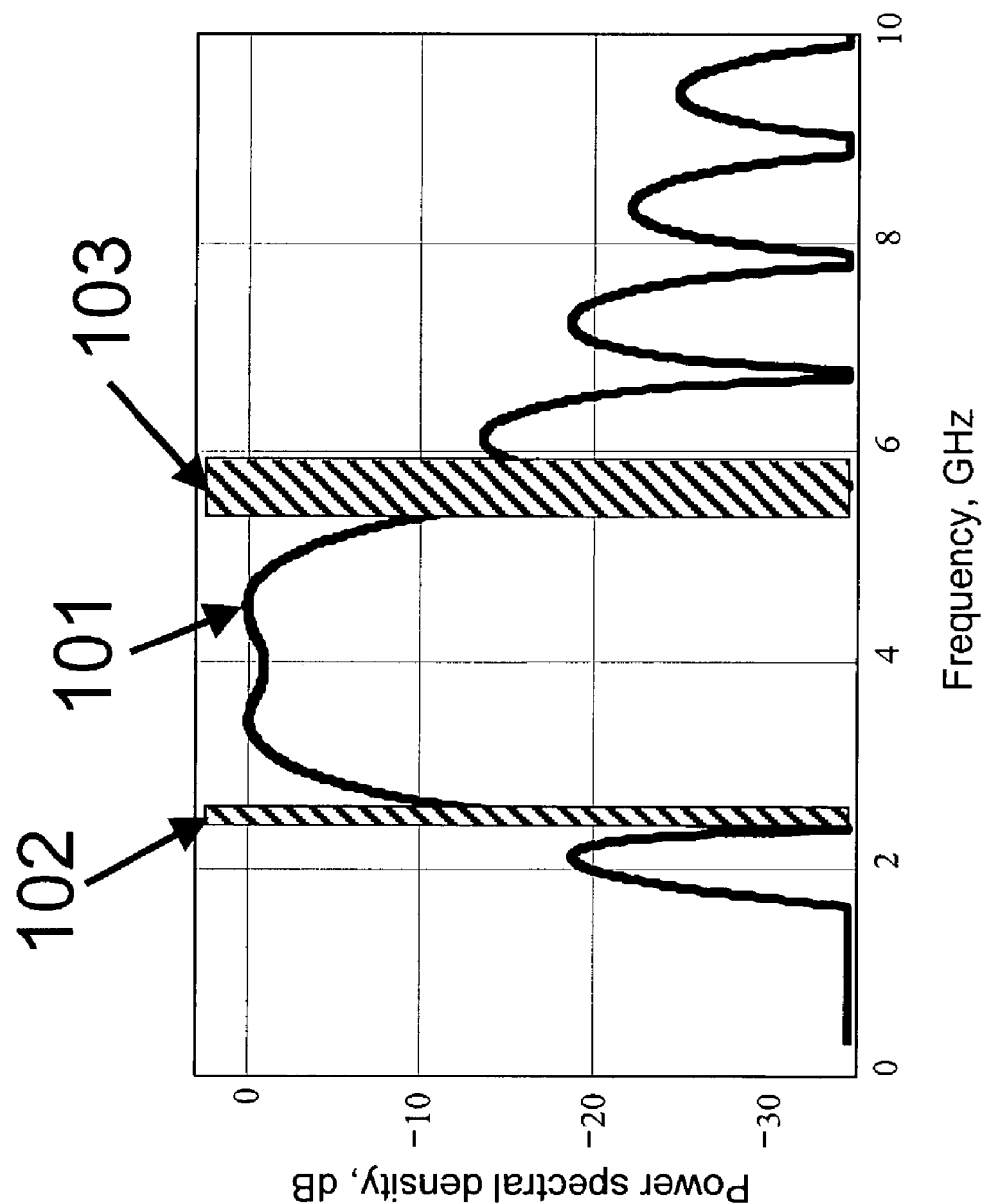

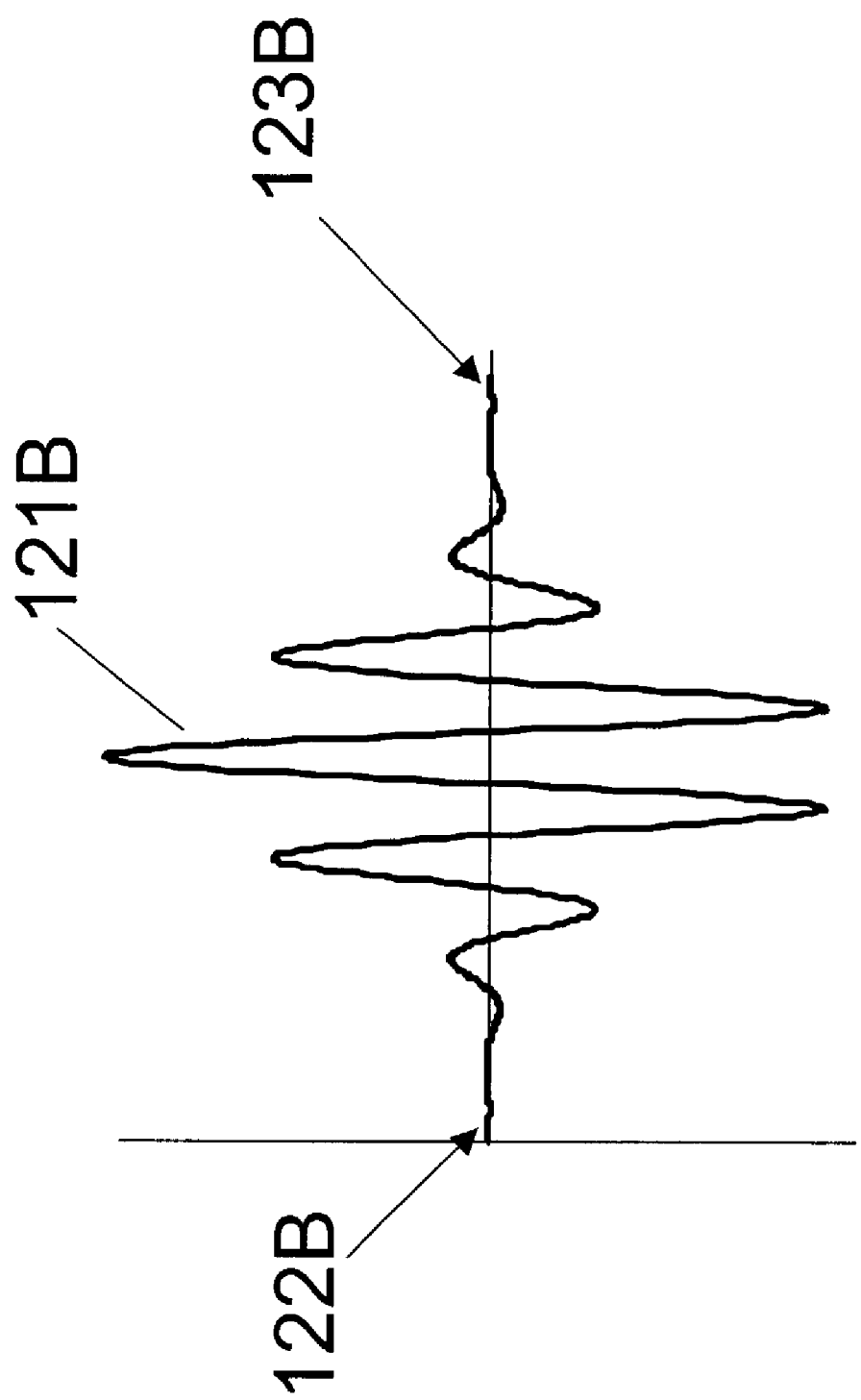

ULTRA-WIDEBAND HIGH DATA-RATE COMMUNICATION APPARATUS AND ASSOCIATED METHODS

CROSS-REFERENCE TO RELATED APPLICATIONS

This patent application is a continuation-in-part of, claims priority to, and incorporates by reference U.S. patent application Ser. No. 10/206,648, now abandoned titled "High Data-Rate Communication Apparatus and Associated Methods," filed on Jul. 26, 2002.

Furthermore, this patent application claims priority to, and incorporates by reference, the following patent documents:

Provisional U.S. Patent Application Ser. No. 60/451,538, filed on Mar. 3, 2003, and titled "Ultra-Wideband High Data-Rate Communication Apparatus and Associated Methods";

Provisional U.S. Patent Application Ser. No. 60/401,711, filed on Aug. 7, 2002, and titled "High Data-Rate Communication Apparatus and Associated Methods"; and Provisional U.S. Patent Application Ser. No. 60/402,677, filed on Aug. 12, 2002, and titled "High Data-Rate Communication Apparatus and Associated Methods."

TECHNICAL FIELD

This patent application relates generally to communication apparatus and, more particularly, to ultra-wideband (UWB) high data-rate (HDR) communication apparatus.

BACKGROUND

The proliferation of wireless communication devices in unlicensed spectrum and the ever increasing consumer demands for higher data bandwidths has placed a severe strain on those frequency spectrum bands. Examples of the unlicensed bands include the 915 MHz, the 2.4 GHz Industrial, Scientific and Medical (ISM) band, and the 5 GHz Unlicensed National Information Infrastructure (UNII) bands. New devices and new standards emerge continually, for example, the IEEE 802.11b, IEEE 802.11a, IEEE 802.15.3, HiperLAN/2 standards. The emergence and acceptance of the standards has placed, and continues to place, a further burden on those frequency bands. Coexistence among the many systems competing for radio-frequency (RF) spectrum is taking on an increasing level of importance as consumer devices proliferate.

Persons skilled in the art know that the available bandwidth of the license-free bands (and the RF spectrum available generally) constrains the available data bandwidth of wireless systems. Furthermore, data-rate throughput capability varies proportionally with available bandwidth, but only logarithmically with the available signal-to-noise ratio. Hence, to transmit increasingly higher data rates within a constrained bandwidth requires the use of complex communication systems with sophisticated signal modulation schemes.

The complex communication systems typically need significantly increased signal-to-noise ratios, thus making the higher data rate systems more fragile and more easily susceptible to interference from other users of the spectrum and from multipath interference. The increased susceptibility to interference aggravates the coexistence concerns noted above. Furthermore, regulatory limitations within given RF bands constrain the maximum available signal-to-noise ratio and therefore place a limit on the data-rate throughput of the communication system. A need therefore exists for a high data-rate communication apparatus and system that can readily coexist with other existing wireless communication systems, and yet can robustly support relatively high data-rates in a multipath environment.

SUMMARY

One aspect of the invention relates to communication apparatus, such as communication transmission apparatus and communication receiver apparatus. In one exemplary embodiment, an RF transmitter according to the invention includes a reference signal generator, a signal generator, and a mixer.

The reference signal generator provides a reference signal that has a prescribed or desired frequency. The signal generator provides an operating signal in response to a selection signal. The operating signal has a frequency that equals the frequency of the reference signal multiplied by a number. More particularly, in some embodiments, the number may constitute an integer number, whereas in other embodiments, the number may constitute a non-integer number, as desired. The mixer mixes the operating signal with another signal to generate a transmission signal.

In another exemplary embodiment, an RF receiver according to the invention includes two mixers, a first mixer and a second mixer. The receiver further includes an integrator/sampler and a signal generator.

The first mixer receives as its inputs an input RF signal and a second input signal. The first mixer mixes its input signals to generate a mixed signal. The integrator/sampler receives the mixed signal and processes it to provide an output signal. The signal generator provides an operating signal in response to a selection signal. The operating signal has a frequency equal to the frequency of a reference signal, multiplied by a number. More particularly, in some embodiments, the number may constitute an integer number, whereas in other embodiments, the number may constitute a non-integer number, as desired. The second mixer mixes the operating signal with a template signal to generate the second input signal of the first mixer.

BRIEF DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numeral designators used in more than one drawing denote the same, similar, or equivalent functionality, components, or blocks.

FIG. 10 illustrates an illustrative PSD profile in an exemplary embodiment according to the invention.

DETAILED DESCRIPTION

This invention contemplates high data-rate communication apparatus and associated methods. Communication apparatus according to the invention provide a solution to the problems of coexisting communication systems, and yet providing relatively high data-rates. Note that wireless or radio communication systems according to the invention provide relatively high data-rates in "hostile" propagation environments, such as multipath environments. Furthermore, as described below, one may apply the inventive concepts described here to land-line communication systems, for example, communication systems using coaxial cables, or the like.

In one exemplary embodiment according to the invention, a high data-rate UWB data transmission system uses a binary phase shift keying (BPSK) modulation of a carrier frequency, known to persons of ordinary skill in the art with the benefit of the description of the invention. One obtains the power spectral density (PSD) at frequency $f$ of such a system as:

$$P_n = \frac{2nf_c^2}{\pi} \cdot \left| \frac{\sin\left(\frac{\pi f}{f_c}\right)}{f^2 - (nf_c)^2} \right|^2,$$

where $f_c$ denotes the reference clock frequency, and n represents the number of carrier cycles per chip. In other words, $$n = \frac{\text{\# of carrier cyles}}{1 \text{ chip}}.$$

Figure 11A:
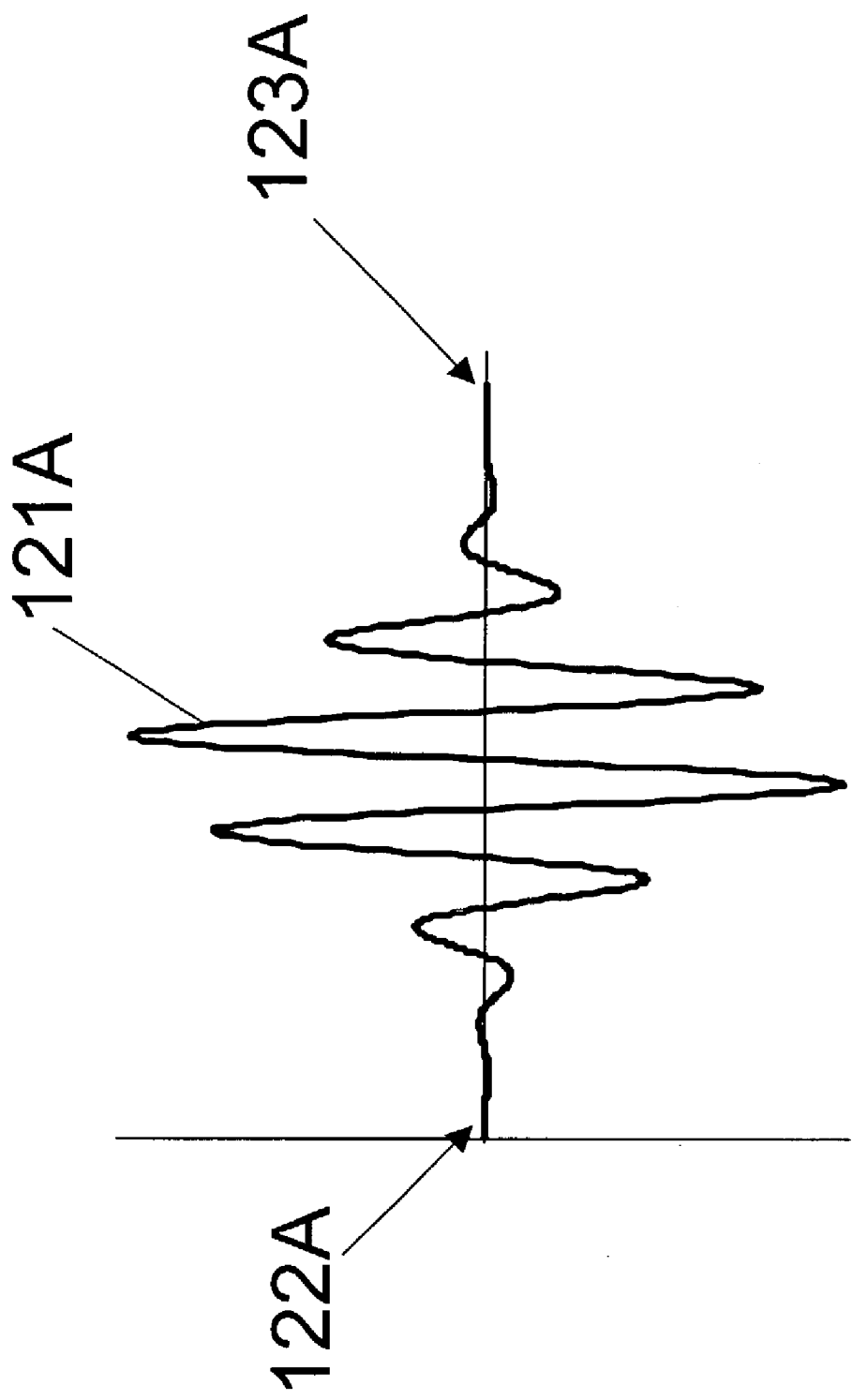
FIG. 11 shows one cycle of an exemplary output signal of a transmitter in a UWB communication apparatus according to the invention.
FIG. 11B illustrates one cycle of another exemplary output signal of a transmitter in a UWB communication apparatus according to the invention.

A chip refers to a signal element, such as depicted in FIG. 11A or FIG. 11B. Put another way, a chip refers to a single element in a sequence of elements used to generate the transmitted signal. The transmitted signal results from multiplying the sequence of chips (the chip sequence) by a spreading code, i.e., the code that spreads the transmitted signal spread over a relatively wide band. Multiple chips in proportion to a desired energy level per bit encode each data bit.

In this embodiment, the modulation chipping rate is commensurate with the carrier frequency. Put another way, n is a relatively small number. In illustrative embodiments, for example, n has a value of less than ten, such as 3 or 4. In other illustrative embodiments, one may use n in the range of 1 to 500, or 1 to 42. Using the latter range of values of n, one may achieve a UWB bandwidth of 500 MHz or greater, up to a frequency limit of approximately 10.6 GHz, as prescribed in the Federal Communications Commission's (FCC) Part 15 rules.

As persons of ordinary skill in the art with the benefit of the description of the invention understand, one may use other positive integer values of n, as desired. Generally speaking, the choice of the values of n depend on one's definition of ultra-wideband. Depending on a desired bandwidth, one may select appropriate values of n, as desired.

The value of n (rounded up to an integer value) corresponds to approximately the desired center operating frequency divided by one half the desired bandwidth. In other words, $$n = \left\lceil \frac{f_o}{\frac{\Delta f}{2}} \right\rceil, \text{ or } n = \left\lceil \frac{2f_o}{\Delta f} \right\rceil,$$

where $f_o$ and $\Delta f$ denote, respectively, the center operating frequency and the desired bandwidth. For instance, the above example of the FCC's definition of UWB results in values of n in the range of 1 to 42. More specifically, a 500-MHz-wide UWB system operating below (by half the bandwidth) the current FCC Part 15 limit frequency of 10.6 GHz results in:

$$n = \left\lceil \frac{10.6 - \left(\frac{0.5}{2}\right)}{\left(\frac{0.5}{2}\right)} \right\rceil,$$

or n=⌈41.4⌉=42.

The FCC has also allowed UWB signals of at least a 500-MHz bandwidth in the frequency range of 22–29 GHz, which corresponds to an upper value of n=116,000. Thus, persons skilled in the art with the benefit of the description of the invention may choose virtually any appropriate ranges of values for n, depending on the performance and design specifications and requirements for a given application. Note that generally the signal bandwidth varies inversely with the value of n.

Figure 1:
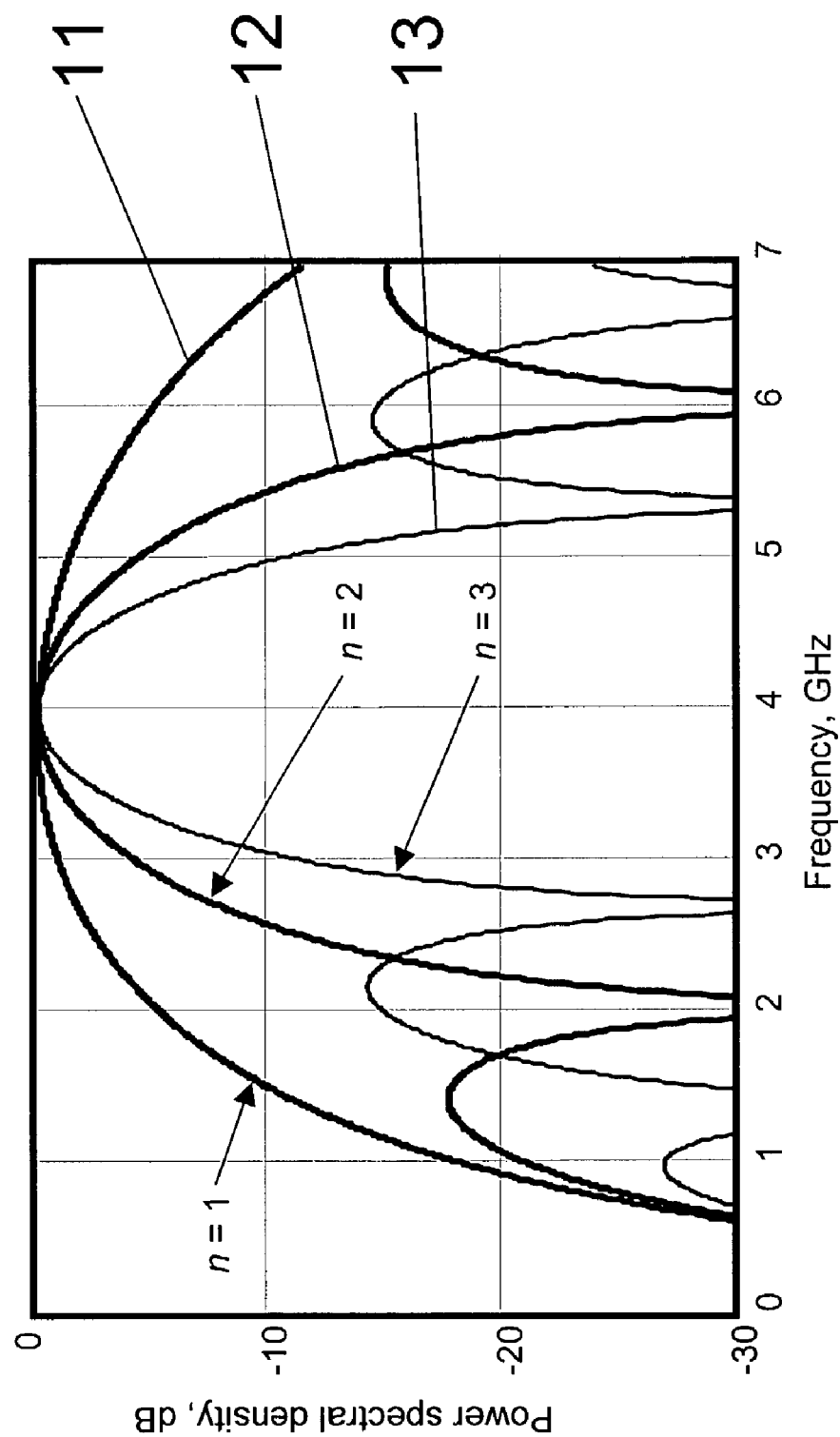
FIG. 1 shows several power spectral density (PSD) profiles in various embodiments according to the invention.

FIG. 1 illustrates several PSD profiles for various values of n (the number of carrier cycles per chip). PSD profile 11 corresponds to n=1, whereas PSD profile 12 and PSD profile 13 correspond, respectively, to n=2 and n=3. Note that as the value of n increases, the bandwidth of the modulated signal decreases. Note further that, in a UWB system that one wishes to constrain to a predetermined maximum PSD (e.g., PSD characteristics prescribed by a regulatory authority), one seeks to achieve as flat a spectrum as possible in order to maximize the total transmitted power in a predetermined bandwidth.

In such a system, one likewise seeks to choose a transmission bandwidth independent of the modulation rate in order to maximize the total transmitted power. As persons of ordinary skill in the art appreciate, in conventional BPSK systems, the PSD profile is not flat even in the highest bandwidth case, where n=1. Furthermore, the bandwidth depends on the chip rate, as manifested by the parameter n. The dependence of the bandwidth on the parameter n may be undesirable for a variety of reasons, such as difficulty or failure to meet prescribed regulatory or design specifications.

Figure 2:
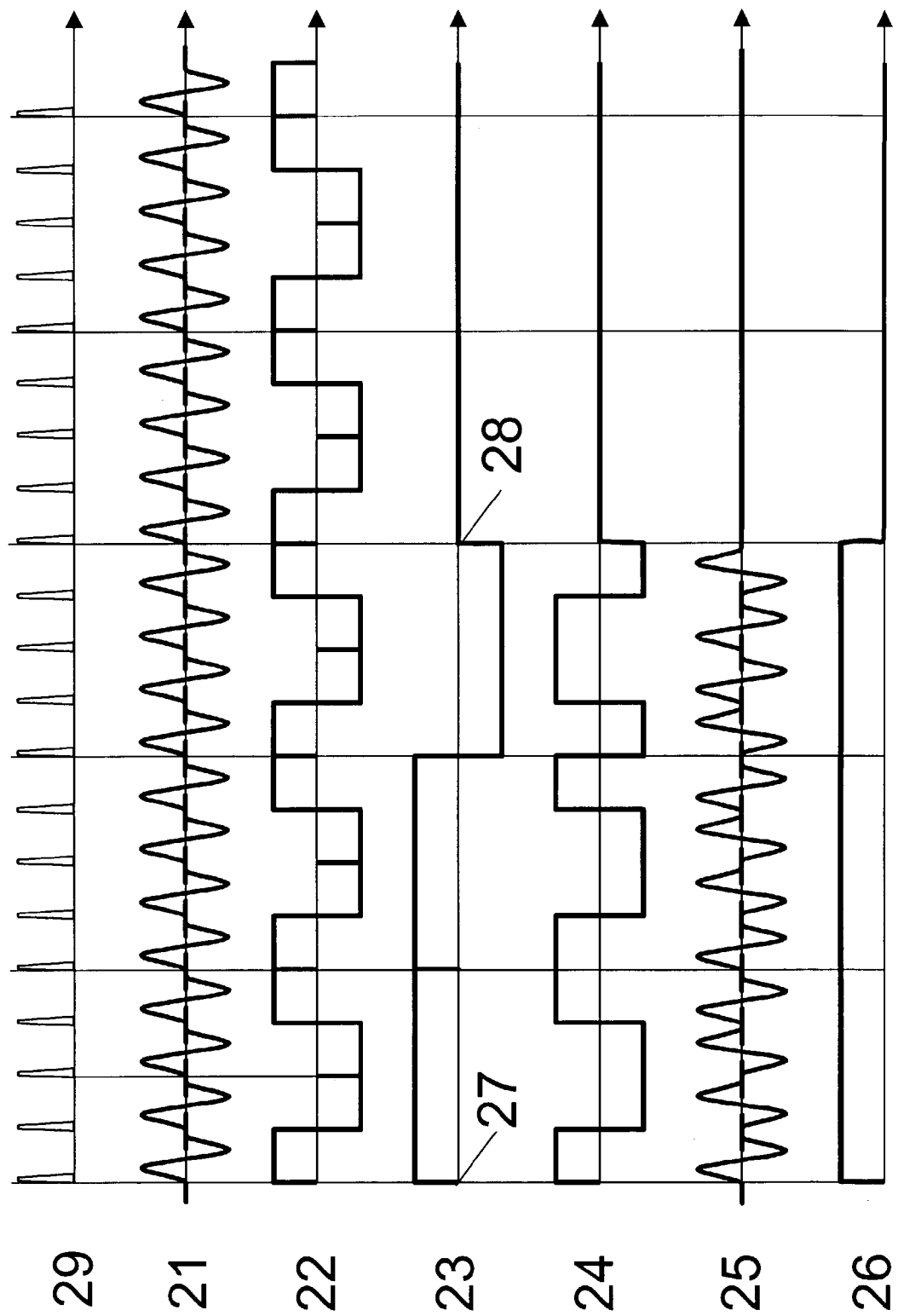
FIG. 2 illustrates exemplary signal waveforms corresponding to a high data-rate UWB apparatus.

For illustrative purposes, FIG. 2 depicts various signals corresponding to a BPSK transmission system. Carrier signal 21 may include only a fundamental frequency. Alternatively, rather than a continuous sine-wave signal, carrier signal 21 may include other waveforms, as described below.

FIG. 2 also shows a pseudo-random noise (PN) sequence 22. Note that the waveforms in FIG. 2 correspond to a communication system with one chip per RF cycle (i.e., n=1), and 4 chips per data bit.

The third waveform in FIG. 2 corresponds to data bits 23. Beginning at time 27 and ending at time 28, PN sequence 22 codes data bits 23. The coding of data bits 23 results in signal 24. Signal 24 modulates carrier 21 to generate modulated signal 25. Signal 26 acts a gating signal. Put another way, the communication system transmits modulated signal 25 while the gating signal 26 is active (during the active portion of signal 26). Modulated signal 25 has a spectrum substantially the same as spectrum 11 in FIG. 1 (i.e., the case where the parameter n has a value of unity).

One may determine the data-rate or data throughput of the communication system from various system parameters. For example, assume that the carrier signal has a frequency of 4 GHz, and that the system operates with one chip per RF cycle (i.e., n=1) and 4 chips per data bit. Given those parameters, persons of ordinary skill in the art who have the benefit of the description of the invention readily appreciate that the system provides a 1-gigabit-per-second (Gb/s) data rate.

Figure 3:
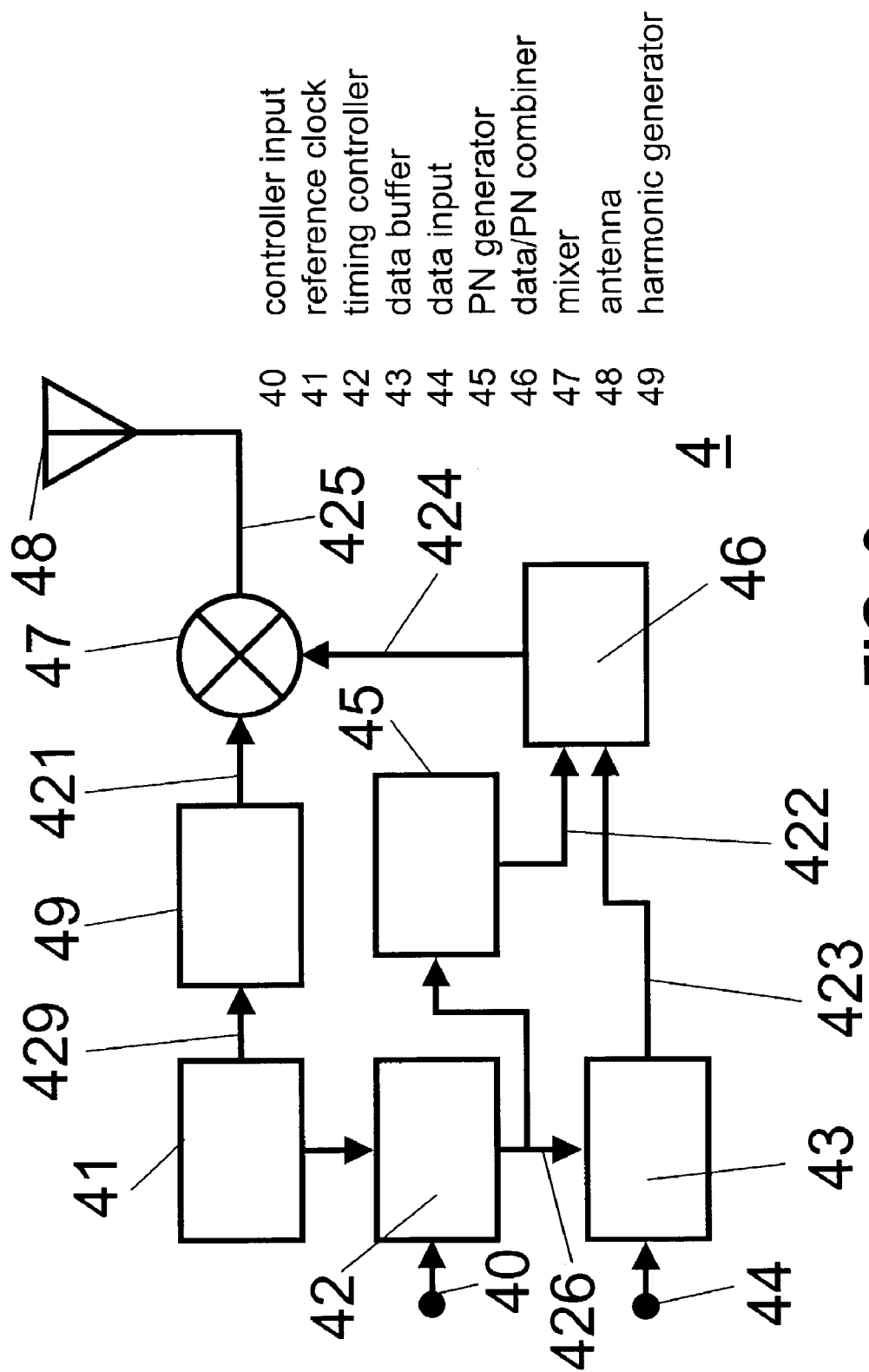
FIG. 3 depicts an exemplary embodiment of a high data-rate UWB transmitter according to the invention.

One exemplary embodiment of a high data-rate UWB system according to the invention includes a high data-rate UWB transmitter and a high data-rate UWB receiver. FIG. 3 shows an exemplary embodiment of high data-rate UWB transmitter 4 according to the invention.

Transmitter 4 includes reference clock 41 (a reference clock generator), timing controller 42, data buffer 43, PN generator 45 (a pseudo-random noise sequence generator), data/PN combiner 46, mixer 47, antenna 48, and harmonic generator 49. Reference clock 41 generates a signal with a desired frequency. The frequency of reference clock 41 corresponds to a carrier frequency for transmitter 4. Thus, the frequency of reference clock 41 corresponds to the desired carrier frequency. One may implement reference clock 41 in a number of way and by using various techniques that fall within the knowledge of persons skilled in the art with the benefit of the description of the invention.

Reference clock 41 couples to harmonic generator 49. Based a clock signal it receives from reference clock 41, harmonic generator 49 generates one or more harmonics of the carrier frequency (the frequency of clock reference 41). For example, given a clock frequency $f_c$, a second harmonic signal at the output of harmonic generator 49 has a frequency $2 \cdot f_c$, and so on, as persons skilled in the art with the benefit of the description of the invention understand. Harmonic generator 49 generates the one or more of harmonics synchronously with respect to the reference clock (i.e., the one or more harmonics are synchronized to the reference clock).

Note that one may realize harmonic generator 49 in a number of ways, for example, comb line generators, as persons of ordinary skill with the benefit of the description of the invention understand. As another example, one may use phase-locked loops, as desired. As other examples, one may employ an oscillator followed by digital divider circuitry. By dividing a signal of a given frequency by various integers, one may obtain the one or more harmnonics. In connection with such an implementation, one may use fractional-N synthesizers, as desired.

Furthermore, one may use a variety of circuitry and techniques to synchronize the one or more harmonics to the reference clock. Such circuitry and techniques fall within the knowledge of persons of ordinary skill in the art who have the benefit of the description of the invention. As an example, a comb line generator may provide synchronization of the one or more harmonics to the reference clock.

Mixer 47 receives the one or more harmonics from harmonic generator 49. Mixer 47 mixes the one or more harmonics of the carrier frequency with a signal (described further below) that it receives from data/PN combiner 46. Mixer 47 provides the resulting signals to antenna 48. Antenna 48 propagates those signals into the transmission medium. In illustrative embodiments, antenna 48 may constitute a wide-band antenna.

Examples of wide-band antennas include those described in the following patent documents: U.S. Pat. No. 6,091,374; U.S. patent application Ser. No. 09/670,792, filed on Sep. 27, 2000; U.S. patent application Ser. No. 09/753,244, filed on Jan. 2, 2001; U.S. patent application Ser. No. 09/753,243, filed on Jan. 2, 2001; and U.S. patent application Ser. No. 09/077,340, filed on Feb. 15, 2002; and U.S. patent application Ser. No. 09/419,806, all assigned to the assignee of the present application. Furthermore, one may use wide-band horn antennas and ridged horn antennas, as desired. As yet another alternative, one may employ a differentially driven wire segment as a simple, effective, wide-band radiator. In addition, one may use other suitable wide-band antennas, as persons of ordinary skill in the art who have the benefit of the description of the invention understand.

Note that some antennas are of the "constant gain with frequency" types, and result in systems that have frequency dependent propagation characteristics. Other antennas, for example, horn antennas, are of the "constant aperture" variety, and produce frequency-independent propagation behavior. To use harmonics with relatively high frequencies, exemplary embodiments according to the invention use "constant aperture with frequency" antennas, although one may employ other types of antenna, as persons of ordinary skill in the art who have the benefit of the description of the invention understand.

Reference clock 41 also couples to timing controller 42. Timing controller 42 clocks the data in data buffer 43. Note that timing signals from timing controller 42 also clock PN generator 45. Data buffer 43 receives its input data from data port 44. A PN sequence from PN generator 45 modulates the data from data buffer 43 by using data/PN combiner 46, in a manner that persons of ordinary skill in the art with the benefit of the description of the invention understand. PN encoded data from data/PN combiner 46 modulates the one or more harmonics in mixer 47. In illustrative embodiments according to the invention, data/PN combiner 46 constitutes an exclusive-OR (XOR) gate, although one may use other suitable circuitry, as persons of ordinary skill in the art with the benefit of the description of the invention understand.

In illustrative embodiments, one may use filters at the output of harmonic generator 49 to adjust the amplitudes of the one or more harmonics so that have substantially the same value. Note, however, that in other embodiments according to the invention, one may use unequal amplitudes, as desired. By using unequal amplitudes, one may control the amount of energy in the transmitted signals at particular frequencies or bands of frequencies.

Figure 16:
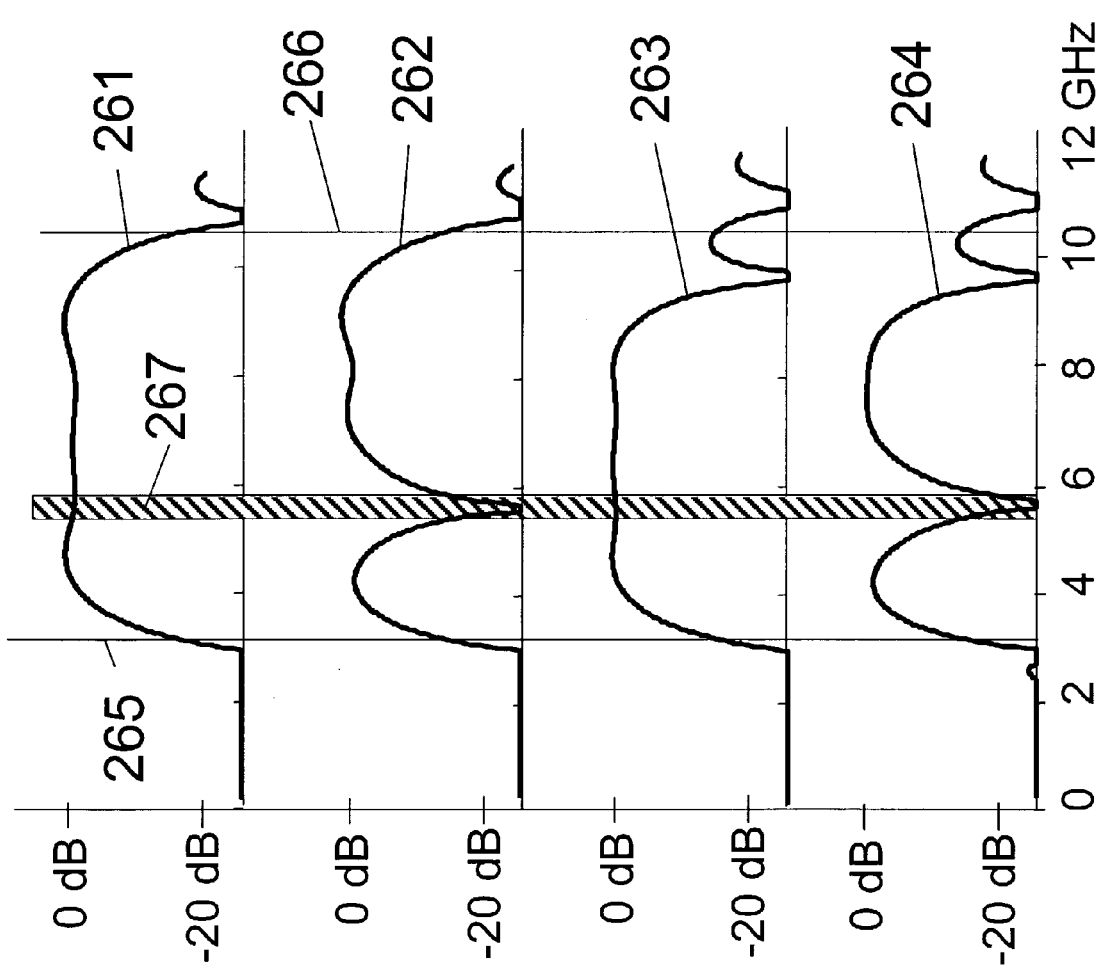
FIG. 16 shows PSD profiles for other exemplary embodiments of communication systems or apparatus according to the invention.

Unequal amplitudes affect the amount of energy in various parts of the corresponding PSD profile. For example, reduced (or eliminated) amplitudes result in reduced energy in corresponding frequency bands. (FIG. 16 shows an example of such a system, where one desires to radiate less energy in band 267 so as to improve coexistence with radio systems operating within that band.)

Figure 4:
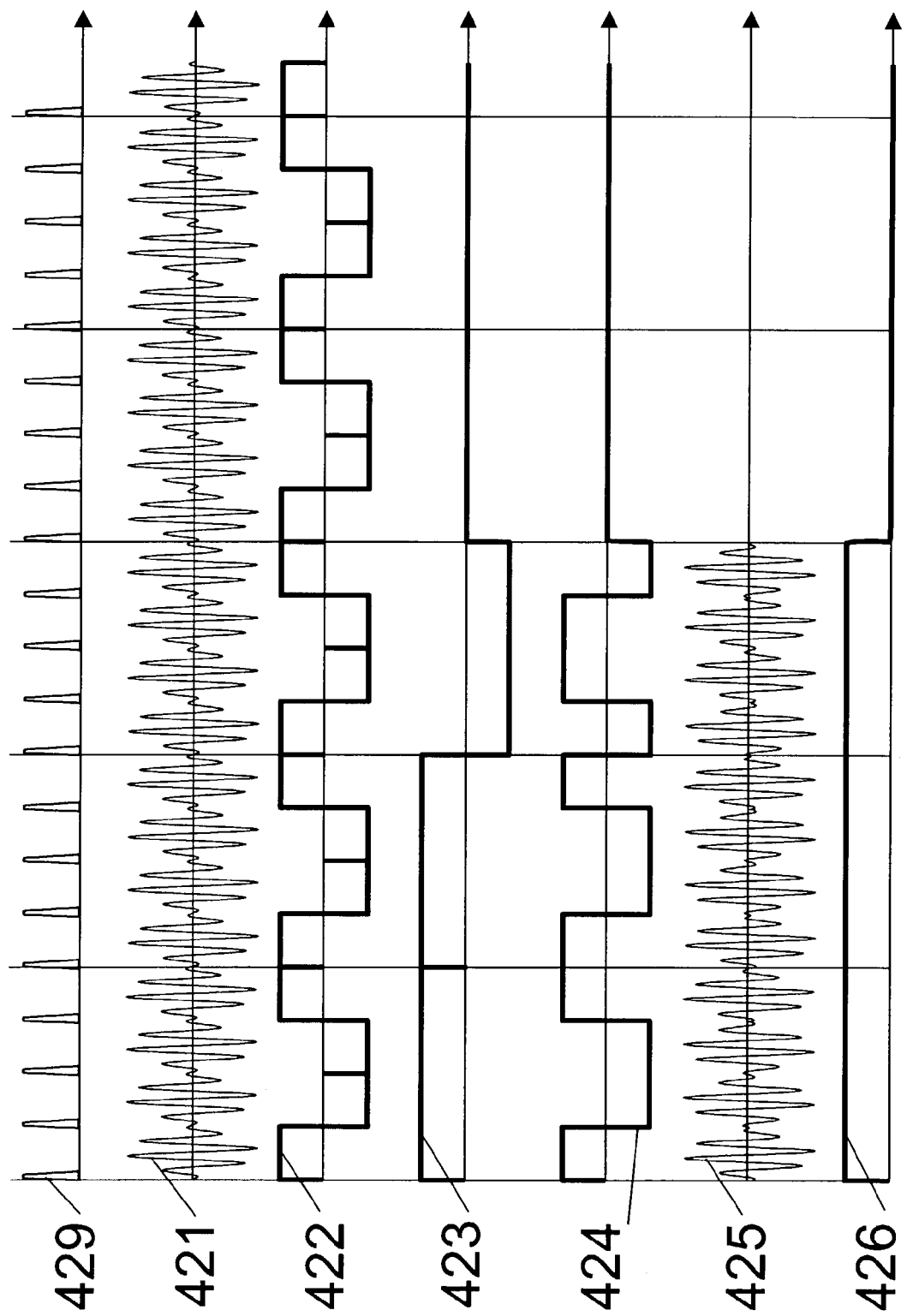
FIG. 4 shows exemplary waveforms corresponding to a high data-rate UWB transmitter according to the invention.

FIG. 4 illustrates exemplary waveforms corresponding to high data-rate UWB transmitter 4. Signal 421 corresponds to the output of harmonic generator 49. Signal 422 corresponds to a relatively short PN sequence of 4 chips per data bit. Signal 423 illustrates a relatively short data sequence. Signal 429, shown to provide more timing detail for transmitter 4, constitutes the output signal of reference clock 41.

Persons of ordinary skill in the art who have the benefit of the description of the invention appreciate that, depending on the application, chip sequences longer than 4 chips per bit may be desirable. For example, one may use such chip sequences when the transmission medium constitutes an RF channel with substantial multipath, or when one desires more energy per data bit (at the cost of the data throughput rate).

Generally, one may use as few as one chip per bit to obtain the maximum data rate, as desired. Furthermore, one may employ as many as tens of thousands of chips per bit in order to obtain "integration" gain at the cost of data rate. Thus, the range for the number of chips per bit may be very broad, as desired, depending on the design and performance specifications for a particular application, as persons skilled in the art understand. For example, in illustrative embodiments according to the invention, one may generally use 1 to 200 chips per bit, as desired. As another example, in embodiments that comply with IEEE 802.15, one typically desires data rates as high as 480 Mb/s, corresponding to a few chips per bit, and as low as 11 Mb/s, implying approximately several hundred chips per bit.

Persons of ordinary skill in the art who have the benefit of the description of the invention appreciate that the number of the PN chips per data bit is a measure of coding gain useful in mitigating against interference and against multi-path impairments. Thus, using a larger number of chips per data bit provides one mechanism for reducing the effects of interference and multipath.

As noted above, one may implement data/PN combiner 46 using an exclusive-OR gate. Signal 424 depicts the result of an exclusive-OR operation on signals 422 and 423. Modulated RF signal 425 results from combining signal 421 and signal 424 in mixer 47. Timing signal 426 depicts the transmission time for the sequence of data bits 423.

Figure 5:
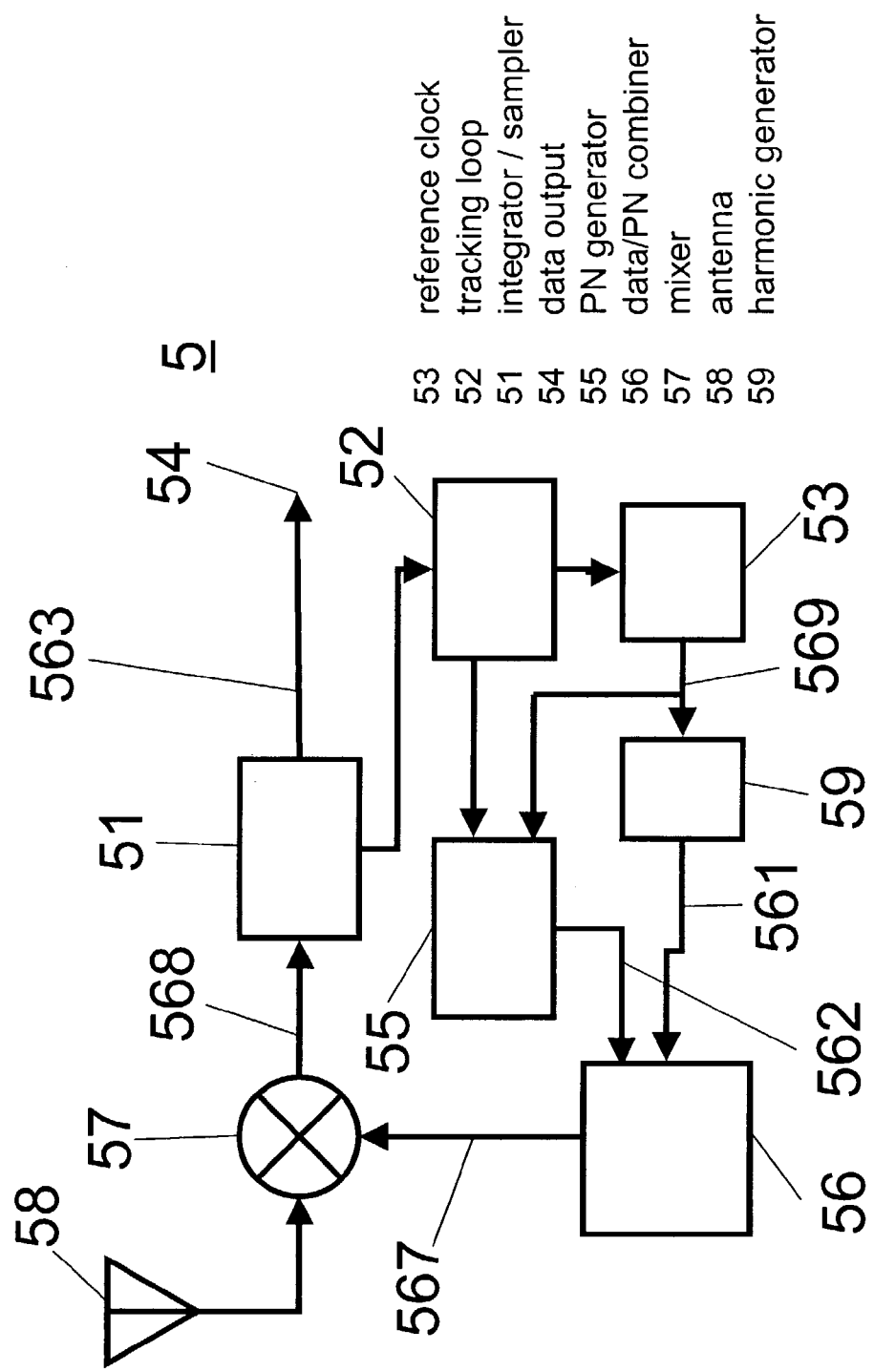
FIG. 5 illustrates an exemplary embodiment of high data-rate UWB receiver according to the invention.

FIG. 5 illustrates an exemplary embodiment of high data-rate UWB receiver 5 according to the invention. Receiver 5 includes reference clock 53, tracking loop 52, integrator/sampler 51, PN generator 55, data/PN combiner 56, mixer 57, antenna 58, and harmonic generator 59. Similarly named blocks and components in receiver 5 may have similar structure and operation as the corresponding blocks and components in transmitter 4 depicted in FIG. 3.

Referring to FIG. 5, in high data-rate UWB receiver 5, receiving antenna 58 couples received modulated signal 425 (shown as the signal coupled to the transmission medium in FIG. 3, with an exemplary waveform depicted in FIG. 4) to mixer 57. Mixer 57 supplies its output signal to integrator/sampler 51. Integrator/sampler 51 integrates the output signal of mixer 57 to deliver recovered data bit signal 563 as data output 54.

Mixer 57 also receives template signal 567. Data/PN combiner 56 generates template signal 567 from an output of PN generator 55 and harmonic generator 59. In illustrative embodiments according to the invention, data/PN combiner 56 constitutes an exclusive-OR (XOR) gate, although one may use other suitable circuitry, as persons of ordinary skill in the art with the benefit of the description of the invention understand. Harmonic generator 59 operates in a similar manner as harmonic generator 49 in FIG. 3, and may have a similar structure or circuitry.

A tracking loop 52, well known in the art, controls reference clock 53 and PN generator 55. Tracking loop 52 controls the timing of PN generator 55 for proper signal acquisition and tracking, as persons of ordinary skill in the art with the benefit of the description of the invention understand. Reference clock 53 provides reference clock signal 569 to PN generator 55 and harmonic generator 59.

Note that one may implement tracking loop 52 in a variety of ways, as desired. The choice of implementation depends on a number of factors, such as design and performance specifications and characteristics, as persons skilled in the art understand. Tracking loop 52 operates in conjunction with template signal 567 to provide a locking mechanism for receiving a transmitted signal (template receiver or matched template receiver), as persons skilled in the art who have the benefit of the description of the invention understand.

Mixer 57 mixes the signal received from antenna 58 with template signal 567 to generate signal 568. Integrator/sampler 51 integrates signal 568 to generate recovered data signal 563. Integrator/sampler 51 drives tracking loop 52, which controls signal acquisition and tracking in high data-rate UWB receiver 5.

Figure 6:
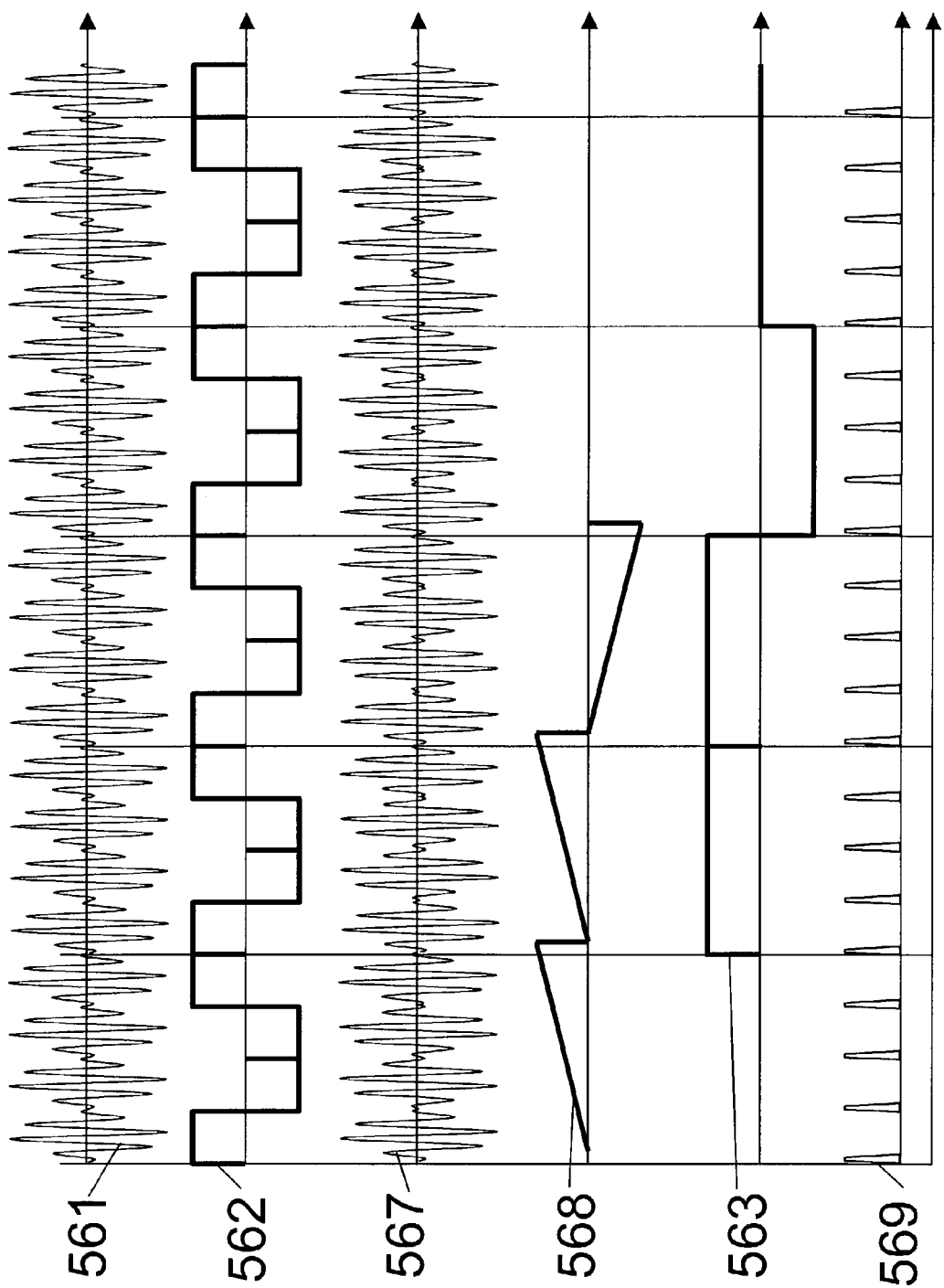
FIG. 6 depicts exemplary waveforms corresponding to a high data-rate UWB receiver according to the invention.

FIG. 6 illustrates exemplary waveforms corresponding to high data-rate UWB receiver 5. Signal 562 constitutes the output of PN generator 55. Signal 561 corresponds to the output of harmonic generator 59, whereas signal 567 is the output signal of data/PN combiner. Signal 568 constitutes the output signal of mixer 57, which feeds integrator/sampler 51. Signal 563 is the output signal of integrator/sampler 51. Finally, signal 569, shown to provide more timing detail for receiver 5, constitutes the output signal of reference clock 53.

Figure 7:
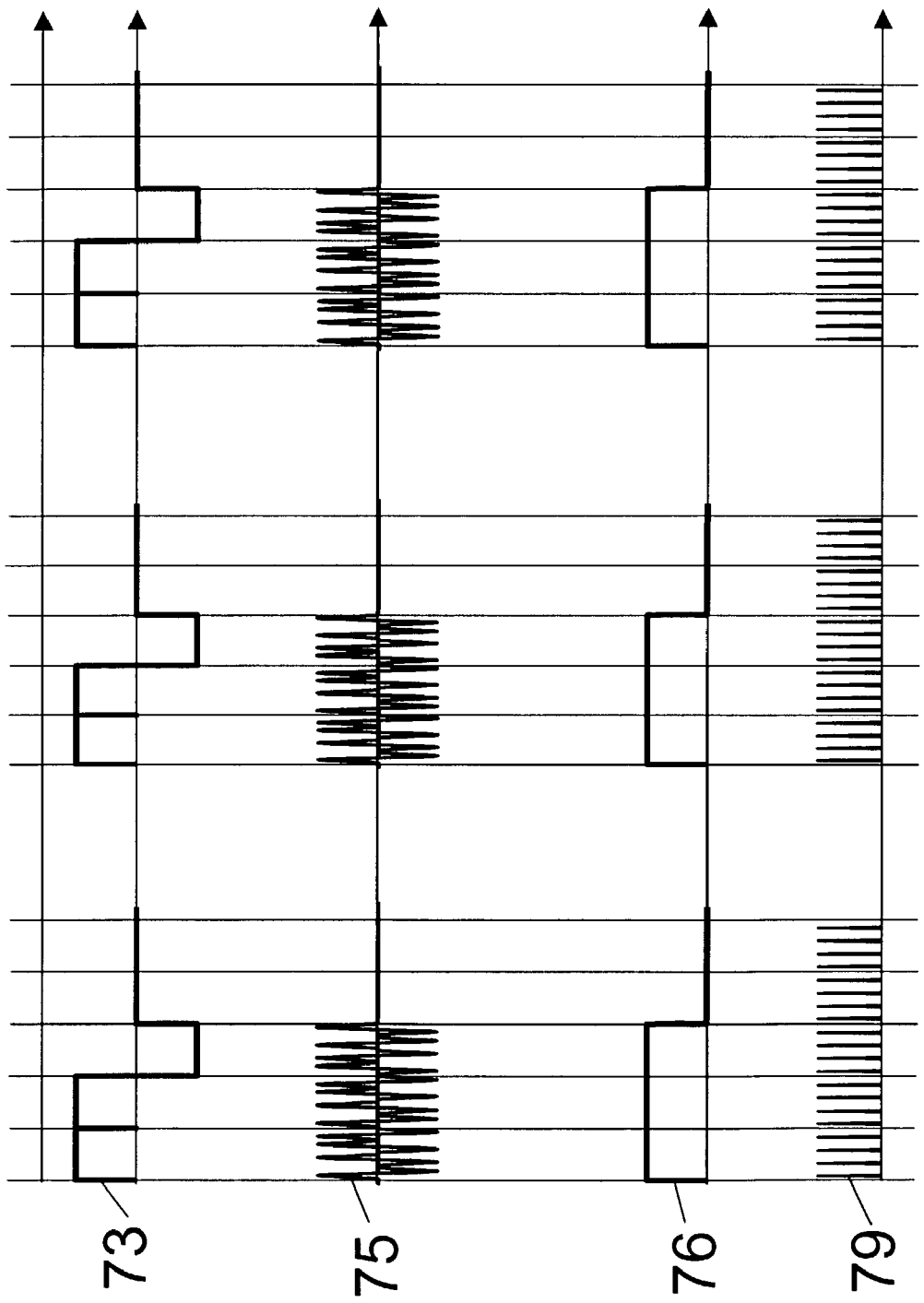
FIG. 7 shows the timing relationship among various signals in a high data-rate UWB transmitter according to the invention.

FIG. 7 shows further details of the timing relationship among various signals in the high data-rate UWB transmitter 4. Waveform 75 corresponds to the signals in the transmission medium (i.e., propagated from antenna 48). Waveform 76 shows the transmission periods, i.e., periods of time during which transmitter 4 transmits. Finally, waveform 73 illustrates data bit stream 73 during transmission periods 76. Waveform 79 depicts the clock tick marks for timing reference with respect to the other waveforms in FIG. 7.

In other embodiments according to the invention, one may operate high data-rate UWB transmitter 4 in either of two modes, depending on a selected or prescribed parameter. Each mode may generate a particular or prescribed PSD profile by using particular or prescribed harmonic orders (i.e., the choice of the harmonics of the carrier to use for each mode). By selecting a particular mode, one may operate transmitter 4 such that it produced output signals that conform to a particular PSD profile or meet prescribed conditions (as set forth, for example, by a regulatory authority, such as the FCC).

Figure 8:
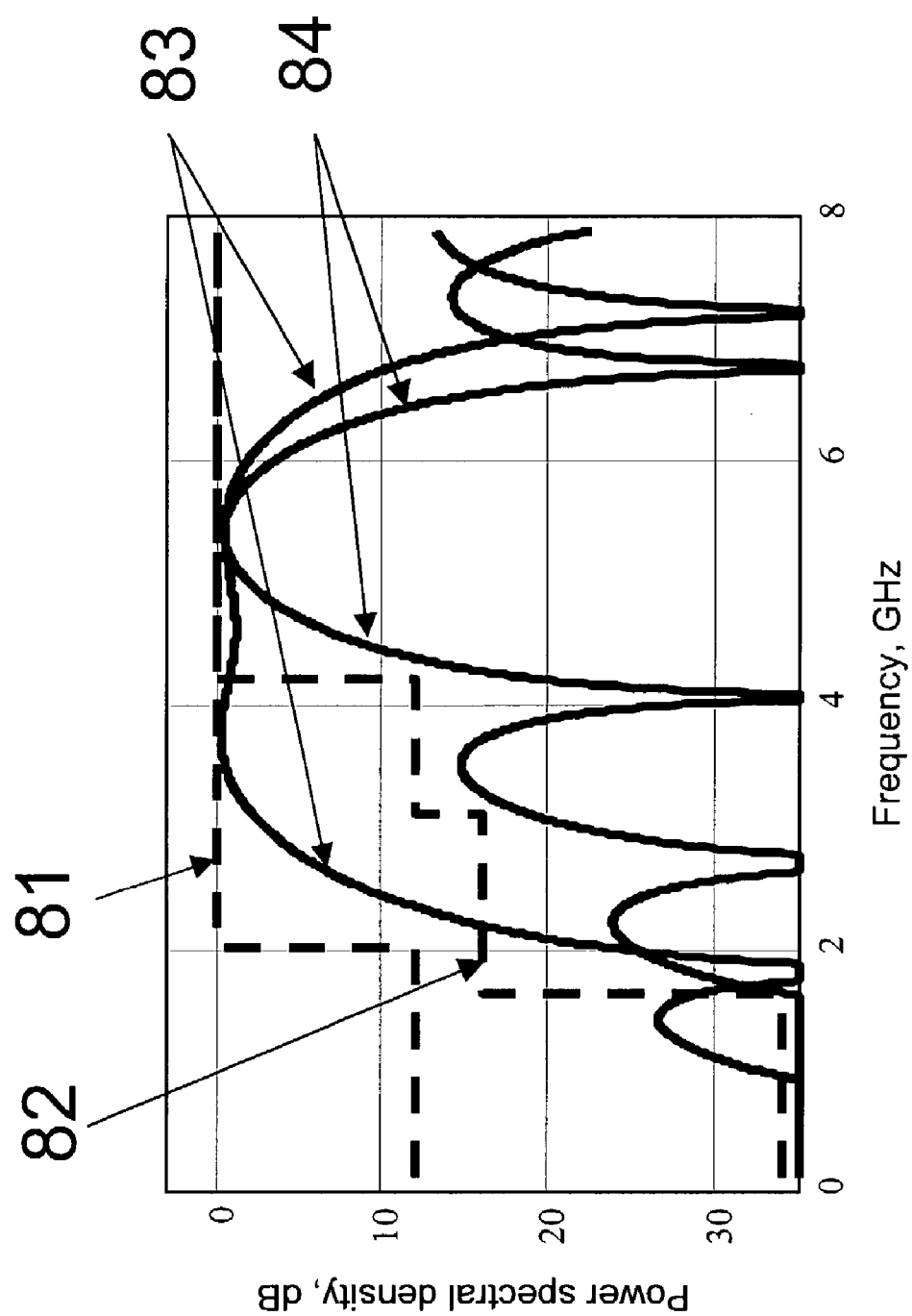
FIG. 8 illustrates exemplary desired or prescribed PSD profiles that correspond to the two modes of operation in illustrative embodiments according to the invention.

FIG. 8 depicts two exemplary desired or prescribed PSD profiles that correspond to the two modes of operation in such embodiments. A transmitter according to the invention may produce outputs that conform to a selected one of predetermined PSD amplitude profile mask 80 and predetermined PSD amplitude profile mask 81. In an embodiment of such a transmitter, the frequency of the reference clock (i.e., the frequency of reference clock 41 in FIG. 3) is approximately 1.8 GHz. Accordingly, the second and third harmonics appear at approximately 3.6 GHz and 5.4 GHz, respectively.

In a first mode of operation conforming to PSD amplitude profile mask 80, one modulates the 3.6 GHz carrier (the second harmonic of the reference clock frequency) with one chip per two RF carrier cycles. Furthermore, one modulates the 5.4 GHz carrier (the third harmonic of the reference clock frequency) with one chip per three RF cycles. In this mode of operation, the transmitter has a chipping rate of 1.8 giga-chips per second. The transmitter produces a transmitted PSD profile 83. Note that transmitted PSD profile 83 has a substantially flat shape, and conforms to PSD mask 80 (i.e., it remains under PSD mask 80).

In a second operating mode, one suppresses the second harmonic while modulating the third harmonic 1.80-GHz clock (i.e., the harmonic appearing at 5.6 GHz) at a rate of one chip per four RF cycles. As a result, the transmitter has a chipping rate of 1.35 giga-chips per second.

Note that one may implement embodiments according to the invention that include more than two operating modes, as desired. For example, one may provide a UWB apparatus that includes m operating modes, where m denotes an integer larger than unity. One may implement such a system in a variety of ways, as persons of ordinary skill in the art with the benefit of the description of the invention understand. For example, one may use a bank of selectable harmonic filters (i.e., selectable choice of which harmonic orders to use) to select any combination of one or more harmonics. Such a UWB radio apparatus may selectively avoid interference from or with other radio systems operating in the same band or bands. Note that in illustrative embodiments according to the invention, one may consider "one or more of m harmnonics" as a form of modulation in addition to the polarity modulation (i.e., BPSK modulation).

Although the description above refers to the second and third harmonic, persons of ordinary skill in the art who have the benefit of the description of the invention appreciate that one may use other harmonics, as desired. Put another way, in each operating mode, one may employ additional harmonics beyond the third harmonic. Using additional harmonics increases the total transmitted power, while simultaneously conforming to the prescribed respective masks (i.e., remaining under the PSD masks).

Figure 9:
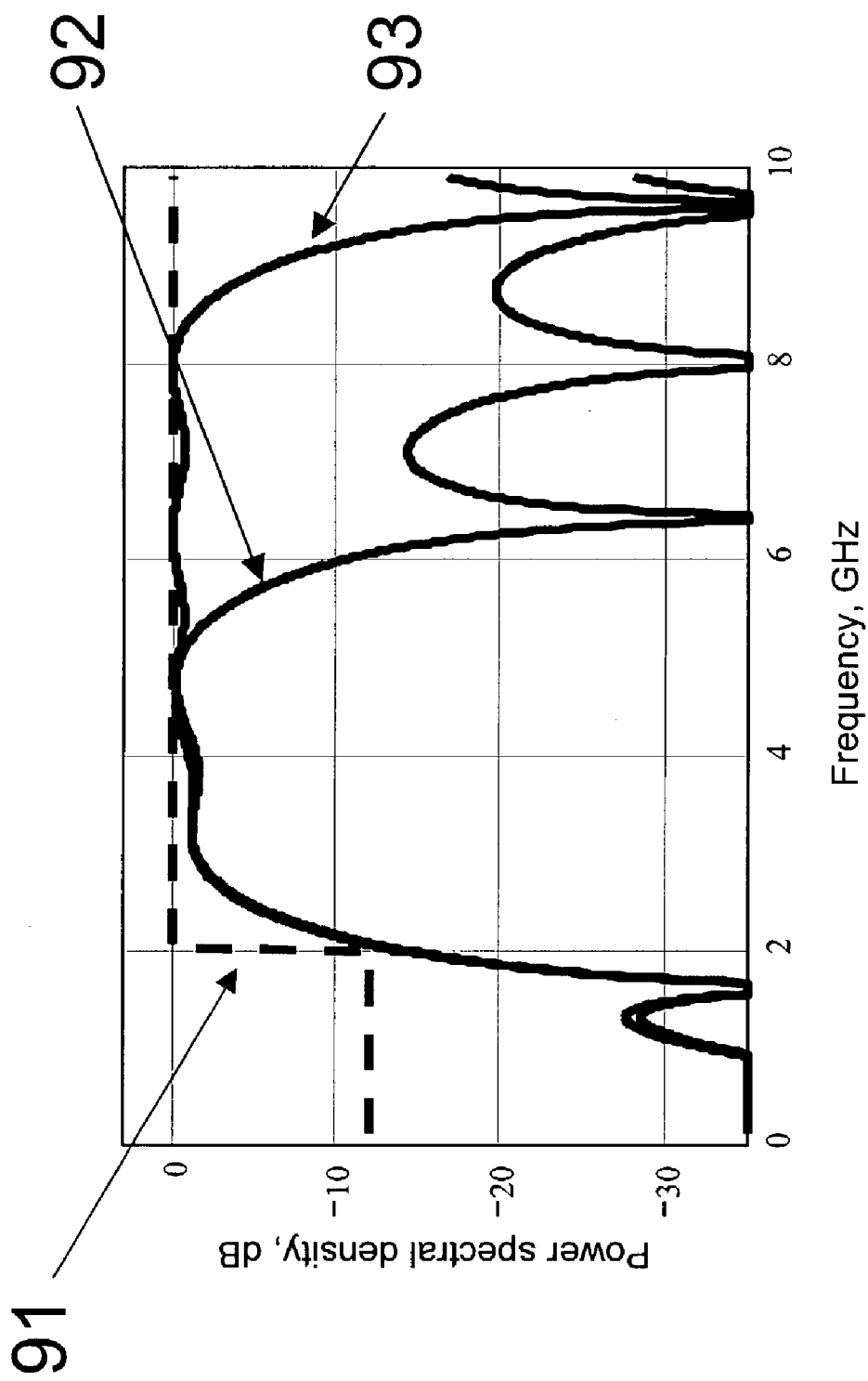
FIG. 9 shows a PSD profile for an exemplary embodiment of the invention that uses higher-order harmonics.

FIG. 9 shows a PSD profile for an exemplary embodiment of the invention that uses higher-order harmonics. Transmitted PSD profile 91 corresponds to modulated third and fourth harmonics of a 1.1-GHz reference clock. PSD profile 91 assumes modulation at the rate of 1.1 giga-chips per second.

If one desired more transmitted power, one may employ the third through seventh harmonics. Doing so results in transmitted PSD profile 93. Note that both PSD profile 92 and PSD profile 93 have substantially flat shapes. Note further that both PSD profile 92 and PSD profile 93 conform to a prescribed or desired PSD amplitude profile mask 90. Thus, by using a number of harmonics of the reference clock frequency that have an appropriate order, one may implement communication systems with particular output power profiles that conform to prescribed PSD profiles, as desired.

Note that one may use an appropriate clock reference frequency and associated harmonics to provide co-existence with other devices that use a particular RF band or spectrum. For example, in other embodiments according to the invention, the clock reference parameters and the harmonic carriers are selected so that the PSD of the high data rate UWB transmissions coexist with wireless devices operating in the 2.4 GHz ISM band and in the 5 GHz UNII bands.

More specifically, in such embodiments, the reference clock has a frequency of approximately 1.1 GHz. Furthermore, the transmitter uses as carrier frequencies modulated at the reference clock rate of approximately 1.1 GHz both the third and fourth harmonics of the reference clock frequency (i.e., 3.3 GHz and 4.4 GHz, respectively).

FIG. 10 shows an exemplary PSD profile for such an embodiment of the invention. Transmission PSD profile 101 fits between the 2.4 GHz ISM band 102 and the 5 GHz UNII bands 103, satisfying a desired level of coexistence. Note that the communication system can still support a relatively high data-rate. For example, if one uses 10 PN chips to comprise one data bit, the resulting data rate is 110 megabits per second (Mb/s).

Signal harmonics may be added with a selectable, desired, or designed degree of freedom regarding relative phase of the carriers. For example, in a communication system according to the invention that uses the third and fourth harmonics, one may generally represent the time signals x(t), the sum of the carrier harmonics, by:

$$x(t)=\sin(2\pi\cdot 3\cdot f_r t)+\sin(2\pi\cdot 4\cdot f_r t+\phi),$$

where $f_r$ represents the reference clock frequency and $\phi$ denotes a selectable or prescribed phase angle between 0 and $2\pi$ radians. Note that in exemplary embodiments according to the invention, one may realize the phase angle by using a filter, as persons of ordinary skill in the art with the benefit of the description of the invention understand.

Note that in exemplary embodiments according to the invention, one may use various values of $\phi$, as desired, where $0 \leq \phi \leq 2\pi$. FIG. 11A illustrates one cycle of an exemplary output signal 121A of a transmitter in a UWB communication system according to the invention. Signal 121A corresponds to $\phi=\pi$. Starting point 122 and ending point 123 coincide with the chip boundaries, as illustrated, for example, by signal 421 and chip signal 422 (output signal of PN generator) in FIG. 4.

Furthermore, note that one may represent output signal x(t) by using cosines, as desired. In other words, $$x_t(t)=\cos(2\pi\cdot 3\cdot f_r t)+\cos(2\pi\cdot 4\cdot f_r t+\phi),$$

where $f_r$ represents the reference clock frequency and $\phi$ denotes a selectable or prescribed phase angle between 0 and $2\pi$ radians (inclusive of the end points). FIG. 11B shows one cycle of another exemplary output signal 121B of a transmitter in a UWB communication system according to the invention. Output signal 121B has starting point 122B and ending point 123B.

Persons skilled in the art with the benefit of the description of the invention appreciate that It will be appreciated that signals x(t) and $x_t(t)$ constitute orthogonal signals. One may therefore use signals x(t) and $x_t(t)$ to implement quadrature phase shift keying (QPSK) modulation, as described below.

Note that signals 121A and 121B have relatively small signal levels at both their starting points (i.e., 122A and 122B, respectively) and their ending points (i.e., 123A and 123B). Exemplary embodiments according to the invention switch signals ON and OFF at those relatively small signal levels. Doing so tends to avoid switching transients that with imperfect switching might alter the resulting spectrum undesirably.

In illustrative embodiments according to the invention, one may represent the harmonic carriers by a composite signal S that constitutes a summation of sinusoidal and/or cosinusoidal signals, i.e., $$S(t)=\Sigma \sin\{2\pi\cdot n\cdot f_r\cdot(t-s)\},$$

where the summation extends over the range of harmonics n desired (i.e., it spans the order of the desired harmonics, from the lowest to the highest). Put another way, the composite signal S constitutes a sum of harmonic carriers over a selected range, n. Note that one may also add cosine harmonics to implement a quadrature UWB communication apparatus.

Figure 12:
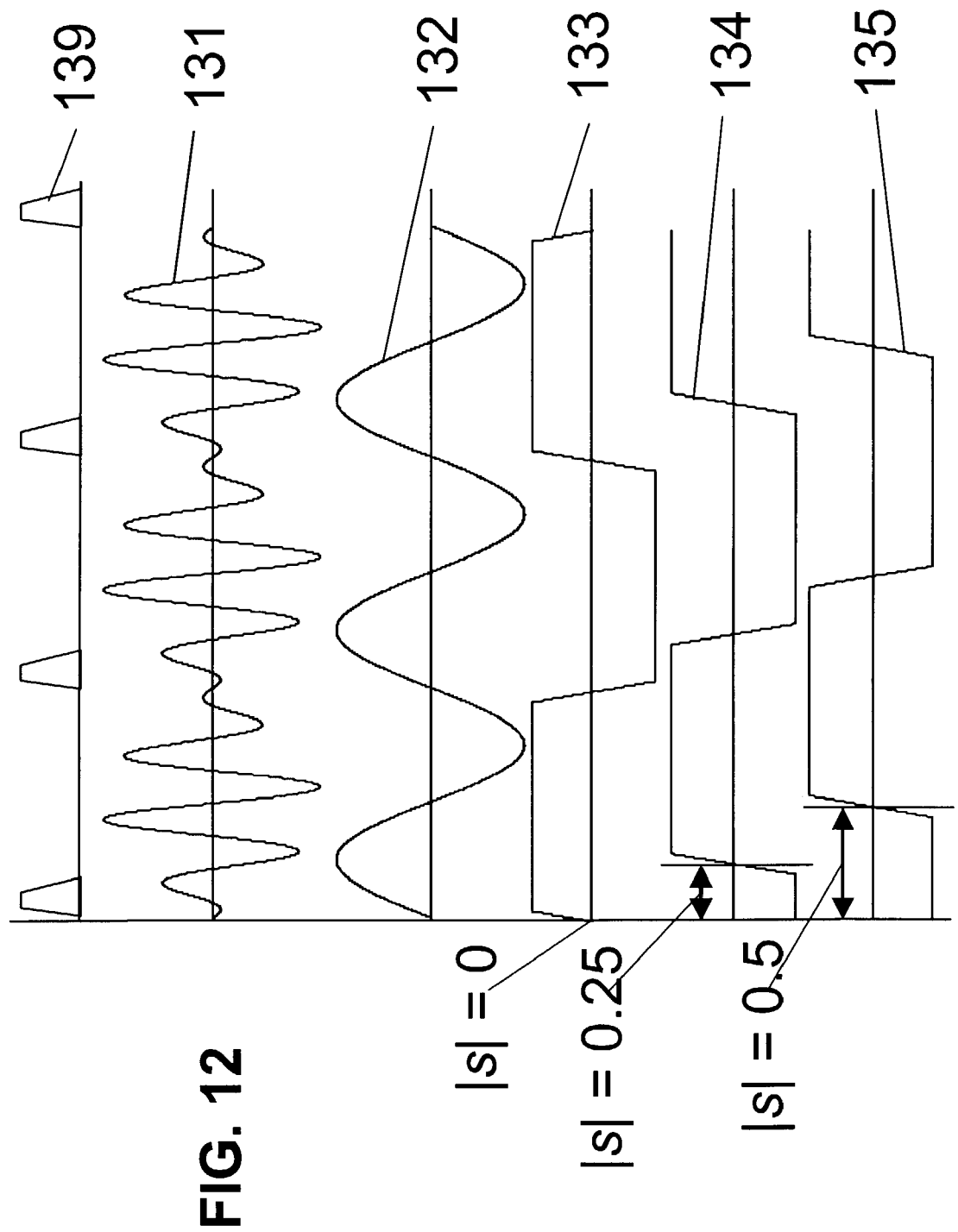
FIG. 12 depicts a timing relationship between several signals in an exemplary embodiment according to the invention.

As noted above, in some embodiments, n may range from 3 to 4 (corresponding to a UWB communication apparatus operating in a desired 3.1 GHz to 5.2 GHz frequency range). FIG. 12 shows the timing relationship between several signals in such an embodiment according to the invention, with n=3. Signal 139 depicts a reference clock signal, included to facilitate presentation of the timing relationship between the various signals. Signal 131 corresponds to composite signal S, described above. Signal 132 denotes the sinusoidal signal the harmonics of which result in composite signal 131. Reference clock signal 139 corresponds to the positive-going zero-crossings of sinusoidal signal 132.

Note that time displacement s offsets the chipping signal from the carrier signal. More specifically, time displacement s appears as an offset between reference clock signal 139 (or sinusoidal signal 132) and the chipping signals.

FIG. 12 shows signals corresponding to several values of time displacement s. Each time displacement s signifies the offset between reference clock signal 139 (or sinusoidal signal 132) and one of chipping signal 133, chipping signal 134, and chipping signal 135, respectively. Specifically, chipping signal 133 corresponds to a time displacement s of zero. Chipping signal 134 and chipping signal 135 denote, respectively, time displacements of 0.25 and 0.5, respectively.

Persons of ordinary skill in the art who have the benefit of the description of the invention appreciate that, because of symmetry, negative values of s give the same results as positive values of s. Hence, the description of the invention refers to the magnitude of s, or |s|. Also, note that, although FIG. 12 illustrates the chipping sequence "101" as an example for the sake of illustration, persons skilled in the art with the benefit of the description of the invention understand that one may generally use a desired PN sequence.

Figure 13:
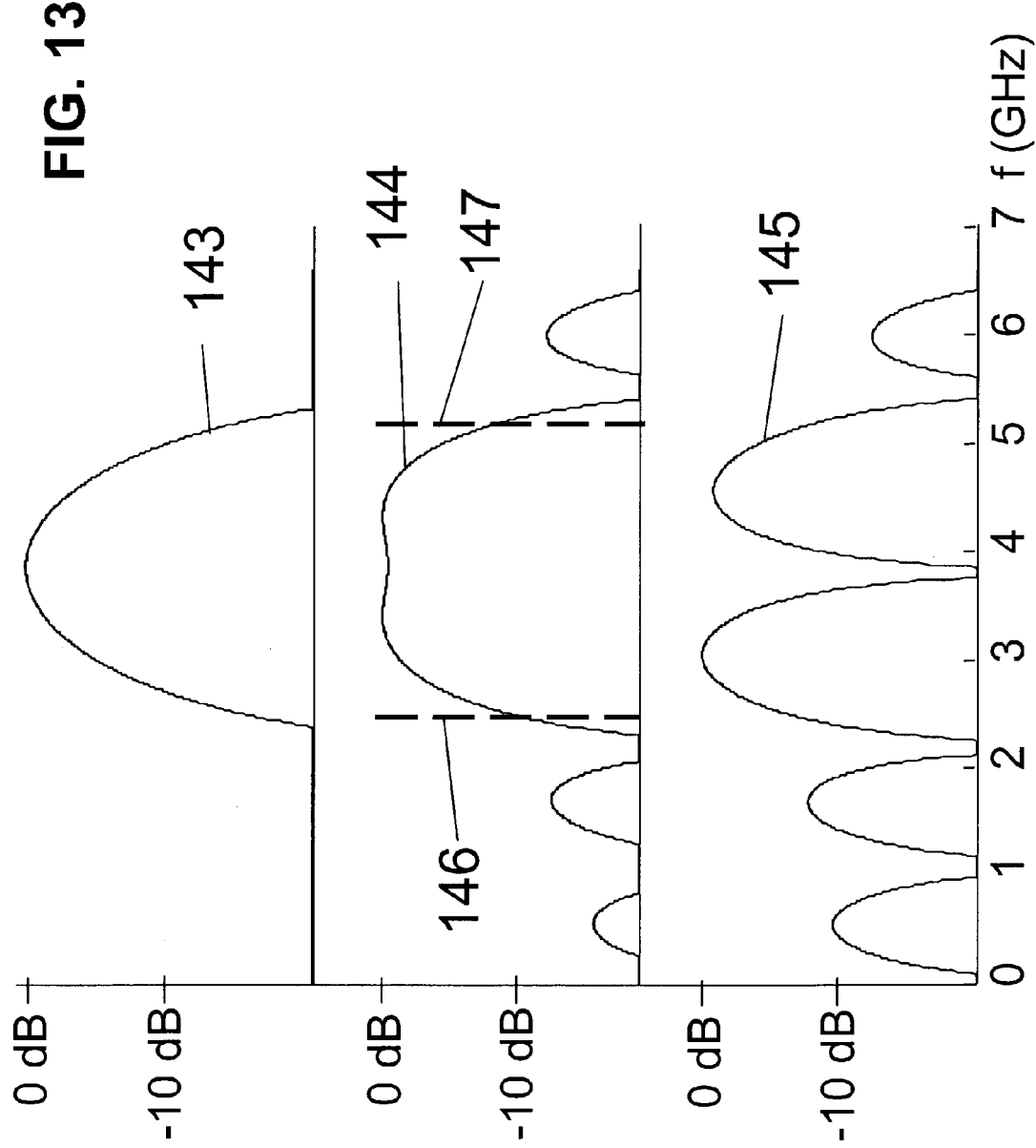
FIG. 13 shows several PSD profiles for an illustrative embodiment according to the invention.

FIG. 13 illustrates several PSD profiles for an illustrative embodiment according to the invention. PSD profile 143 depicts the power spectral density of signal 131 multiplied by PN chipping sequence 133. Similarly, PSD profile 144 corresponds to the power spectral density of signal 131 multiplied by PN chipping sequence 134. Finally, PSD profile 145 illustrates the power spectral density of signal 131 multiplied by PN chipping sequence 135.

FIG. 13 also illustrates boundary 146 of the 2.4 GHz ISM band and boundary 147 of the UNII band. For two harmonics, a time displacement value |s|=0.25 provides a substantially flat PSD profile 144. Persons of ordinary skill in the art who have the benefit of the description of the invention understand, however, that one may use time displacement values (s) in a range of approximately 0.1 and approximately 0.9 to provide substantially similar PSD profiles for the third and fourth harmonics, as desired. In a similar manner, one may use other values of time displacement s and appropriate numbers of harmonics to implement communication systems having desired or prescribed PSD profiles, as desired.

Figure 14:
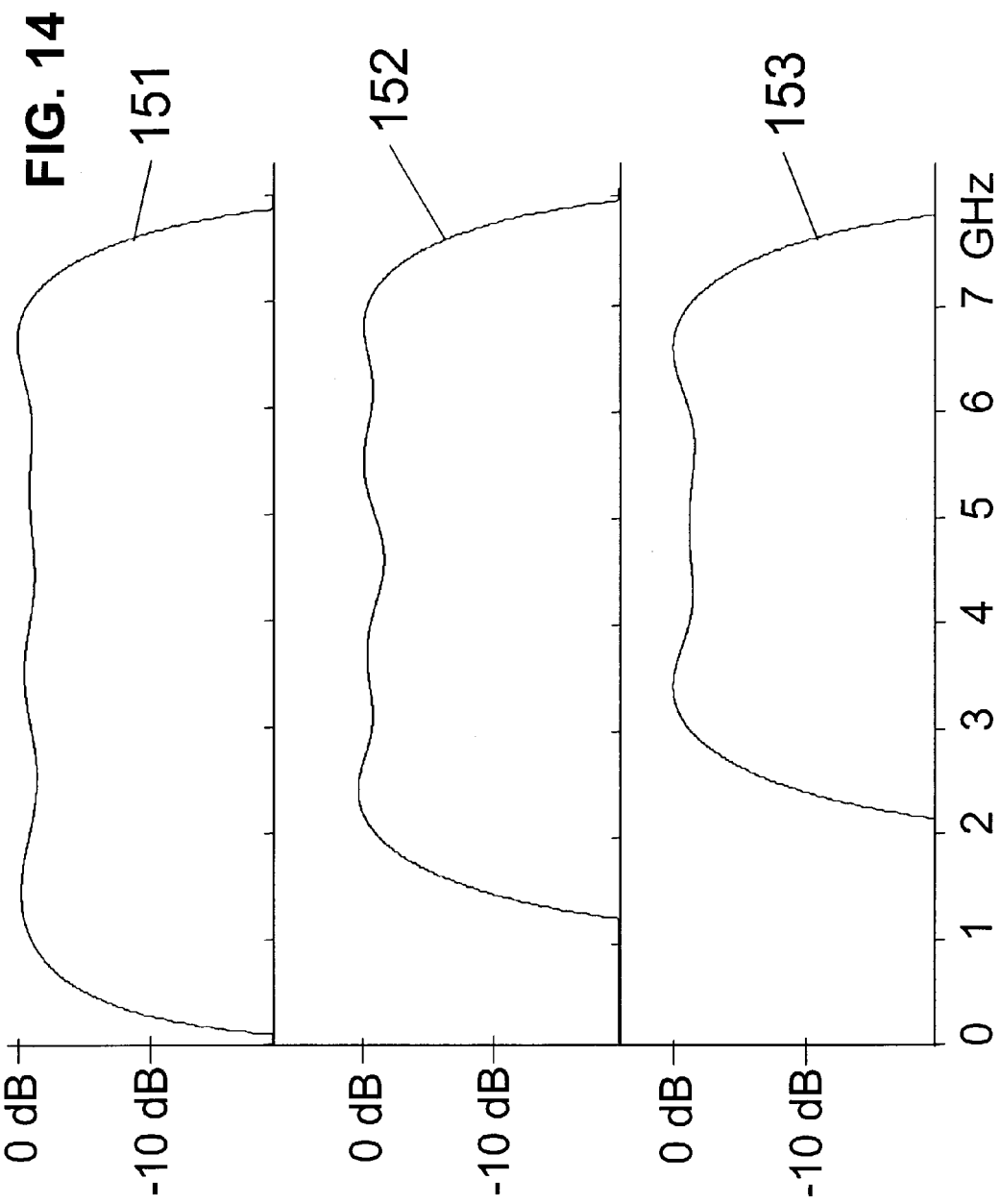
FIG. 14 illustrates several PSD profiles for other exemplary embodiments according to the invention.

As an example, FIG. 14 depicts several PSD profiles that correspond to exemplary embodiments of the invention that use increasing numbers of harmonics. FIG. 14 includes PSD profile 151, PSD profile 152, and PSD profile 153. A substantially flat PSD profile 151 corresponds to a signal that includes the fundamental frequency through the seventh harmonic, using a time displacement value of |s|=0.375.

Similarly, PSD profile 152 pertains to a signal that includes the second through the seventh harmonics, using a time displacement value of |s|=0.375. Finally, PSD profile 153 corresponds to a signal that includes the third through the seventh harmonics and uses a time displacement value of |s|=0.375.

Note that values of time displacement s between approximately 0.1 and approximately 0.9 provide substantially flat PSD profiles, similar to the PSD profiles that FIG. 14 illustrates. As noted above, using larger numbers of harmonics while conforming to PSD profiles (i.e., constrained to a maximum PSD value) results in an increase in the total transmitted or radiated power.

One may generate and implement the time displacement s in variety of ways, as persons of ordinary skill in the art who have the benefit of the description of the invention understand. For example, one may implement s as digitally derived clock shift in timing controller 42 of transmitter 4 and PN generator 55 in receiver 4. As another example, one may implement the desired time shift by using a physical delay line in the path of the digital input of mixer 47 in transmitter 4 and mixer 57 in receiver 5.

Figure 15:
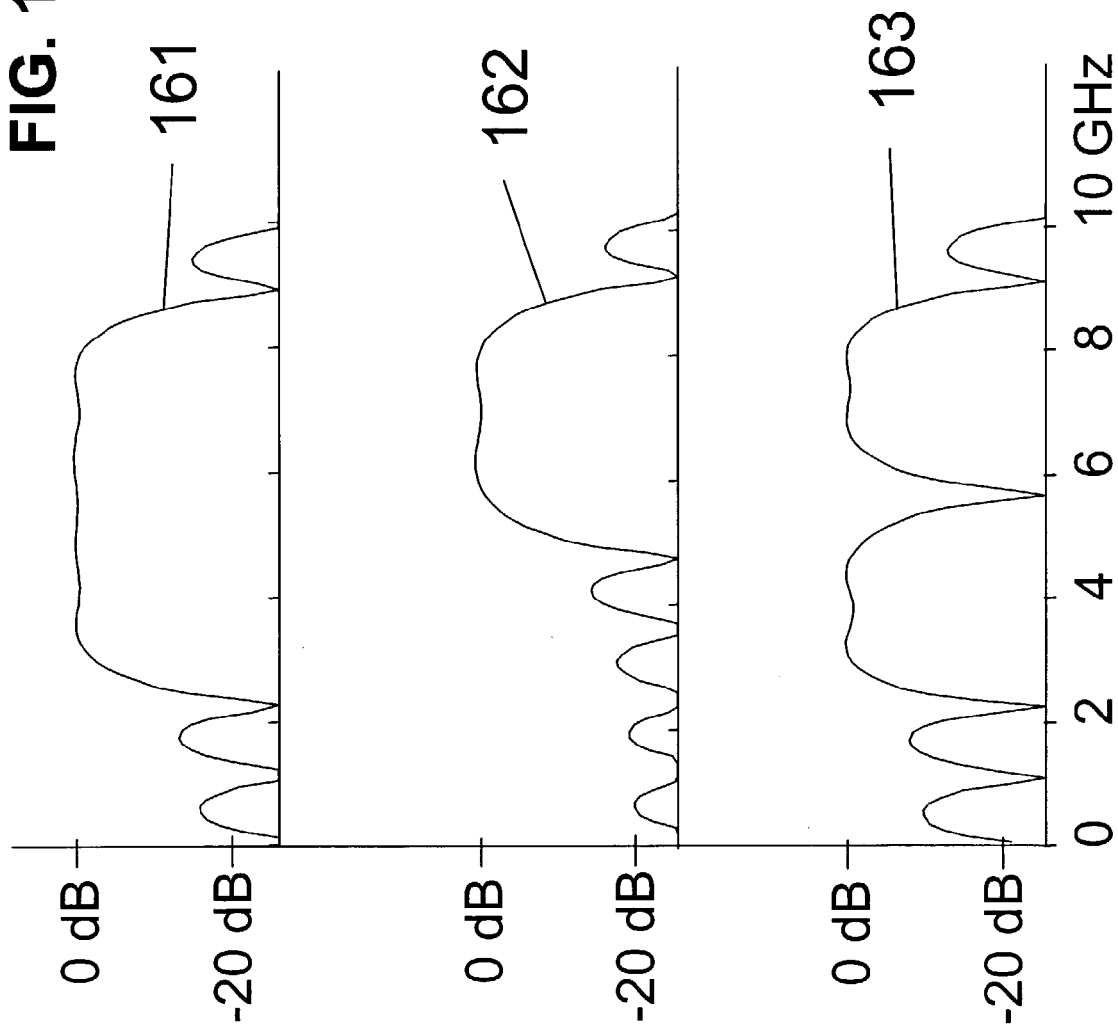
FIG. 15 depicts PSD profiles for other illustrative embodiments according to the invention.

One may obtain the spectra shown in the figures by computing the Fourier Transform of the composite signal S. More specifically, where the data pulses have a generally rectangular shape and have not been filtered (e.g., chipping signal 422 in FIG. 4), one may obtain the PSD as:

$$PSD = 2f_r \int_0^{(1/f_r)} \sum_{n=n_1}^{n_2} \sin\left[2\pi \cdot n \cdot f_r\left(t - \frac{s}{f_r}\right)\right] e^{j2\pi ft} \, dt,$$

where $f_r$ denotes the chipping clock frequency, and $n_1$ and $n_2$ correspond to the order of the harmonics used (i.e., the lower and upper boundaries of the range of harmonics used). Note that one may omit selected harmonics within the range $n_1$ to $n_2$ to further shape the spectrum, as desired. FIG. 15 shows an example of applying this technique.

Referring to FIG. 15, PSD profile 161 shows the power spectral density for an embodiment of a communication system according to the invention that uses the third through seventh harmonics of a 1.1-GHz clock. In contrast, PSD profile 162 corresponds to a system that employs the fifth through the seventh harmonics. As a result, the PSD energy in the latter system lies mostly above 5 GHz.

As a third example, PSD profile 163 corresponds to a system that uses the third, fourth, sixth, and seventh harmonics. Omitting the fifth harmonic in this system results in a gap in the vicinity of 5 GHz to 6 GHz. As a result, the system may effectively coexist with systems that operate in the 5-GHz UNII band. Note that one may use filtering to readily remove energy in the side lobes shown in FIG. 15.

The PSD profiles shown in FIG. 15 correspond to illustrative embodiments of communication systems according to the invention. By judiciously employing selected harmonics together with a chosen clock frequency, one may design and implement a wide variety of communication systems with prescribed PSD profiles in a flexible manner. The choice of design parameters (e.g., clock frequency and the number and order of harmonics) depend on desired design and performance specifications and fall within the knowledge of persons of ordinary skill in the art who have the benefit of the description of the invention.

FIG. 16 shows PSD profiles for other exemplary embodiments of communication systems or apparatus according to the invention. These embodiment conform with a PSD mask in which the emissions at 3.1 GHz are at least −10 dB from the peak (marker labeled as 265 in FIG. 16). Furthermore, the mask specifies emissions at 10.6 GHz of at least −10 dB from the peak (marker denoted as 266 in FIG. 16).

UNII band 267 extends from 5.15 GHz to approximately 5.9 GHz. FIG. 16 illustrates four PSD profiles (denoted as profiles 261, 262, 263, and 264, respectively) that correspond to different choices of the order of harmonics used. All four PSD profiles correspond to a baseband chipping reference clock frequency of 1.4 GHz. Furthermore, the PSD profiles assume time displacement s of approximately 0.375 between the reference clock signal and the chipping sequences (see FIG. 13 and accompanying description for an explanation of time displacement s and its effect on PSD profiles).

As noted above, PSD profiles 261, 262, 263, and 264 denote various choices of the order of harmonics used. PSD profile 261 corresponds to a communication system that uses the 3rd through the 7th harmonics of the chipping reference clock. Thus, such a system effectively occupies the allowed bandwidth between 3.1 GHz and 10.6 GHz.

PSD profile 262 corresponds to a system that employs the 3rd, the 5th, the 6th, and the 7th harmonics of the chipping reference clock. In other words, unlike the system corresponding to PSD profile 261, it omits the fourth harmonic, which overlaps UNII band 267.

The system corresponding to PSD profile 263 uses the 3rd through the 6th harmonics of the chipping reference clock. Thus, this system omits the relatively higher frequencies by not using higher-order harmonics.

PSD profile 264 pertains to a communication system that uses the 3rd, the 5th, and the 6th harmonics of the chipping reference clock. This system omits the fourth harmonic, which overlaps UNII band 267. The system may switch its operation modes between PSD profile 261 and PSD profile 262 or, alternatively, between PSD profile 263 and PSD profile 264, as described below in detail.

Table 1 below summarizes the harmonics used in the systems corresponding to PSD profiles 261, 262, 263, and 264:

TABLE 1

| PSD Profile | Harmonic Orders Used |
| --- | --- |
| 261 | 3, 4, 5, 6, and 7 |
| 262 | 3, 5, 6, and 7 |
| 263 | 3, 4, 5, and 6 |
| 264 | 3, 5, and 6 |

As noted above, communication systems according to exemplary embodiments of the invention may include multimode operation. Such systems may switch from one mode of operation to another mode of operation based on desired or prescribed conditions or stimulus. Referring to FIG. 3, controller input signal 40 enables mode switching in transmitter 4. The state of controller input signal 40, transmitter 4 and, more specifically, timing controller 42, determines the chipping duration relative to the reference clock cycle in a manner apparent to persons of ordinary skill in the art who have the benefit of the description of the invention.

Communication systems according to the invention may perform mode switching in response to virtually any stimulus, as desired. For example, a system user may manually selection the mode and thus cause mode switching. As an alternative, the mode switching may occur in an automatic manner, for instance, in response to predetermined or selected system event.

As another example, the mode switching may occur in a semi-automatic manner, but involve manual user selection in response to an event flagged or brought to the user's attention. In other embodiments, an internal or external variable or quantity, for example, time, may control mode switching. Alternatively, a remote signal received by the communication system may switch the operating mode.

As yet another example, communications systems and apparatus according to various embodiments of the invention may switch modes in response to the detection of radio-signal energy in a desired band or bands. For example, in response to detecting the presence of radio-signal energy in the UNII bands (between 5.15 GHz and 5.85 GHz), a UWB communication apparatus or system according to the invention may switch its mode of operation so that its transmissions have a prescribed spectral content. The new mode of operation may correspond to a PSD profile that tends to eliminate, reduce, or minimize interference with any devices operating in the particular band of interest. For example, the new PSD profile may constitute PSD profile 163 in FIG. 15.

Thus, the stimulus for the switching of modes in such systems is the detection of the presence of RF signals from devices operating in a particular band or at a particular frequency or plurality of frequencies, such as UNII band devices. The response of the communication system or apparatus constitutes switching modes so as to eliminate or minimize interference, for example, by omitting the harmonic component that would result in transmitted energy in the affected frequency range or band. Such a feature provides an additional measure of coexistence with devices operating in existing radio frequency bands, such as UNII radio devices.

Note that the above examples constitute only a sampling of how one may switch the operating mode. Depending on desired design and performance specifications, one may use other techniques and mechanisms for mode switching, as persons of ordinary skill in the art who have the benefit of the description of the invention understand. Furthermore, one may apply any of these techniques to various embodiments of communication systems and apparatus according to the invention, as desired.

Figure 17:
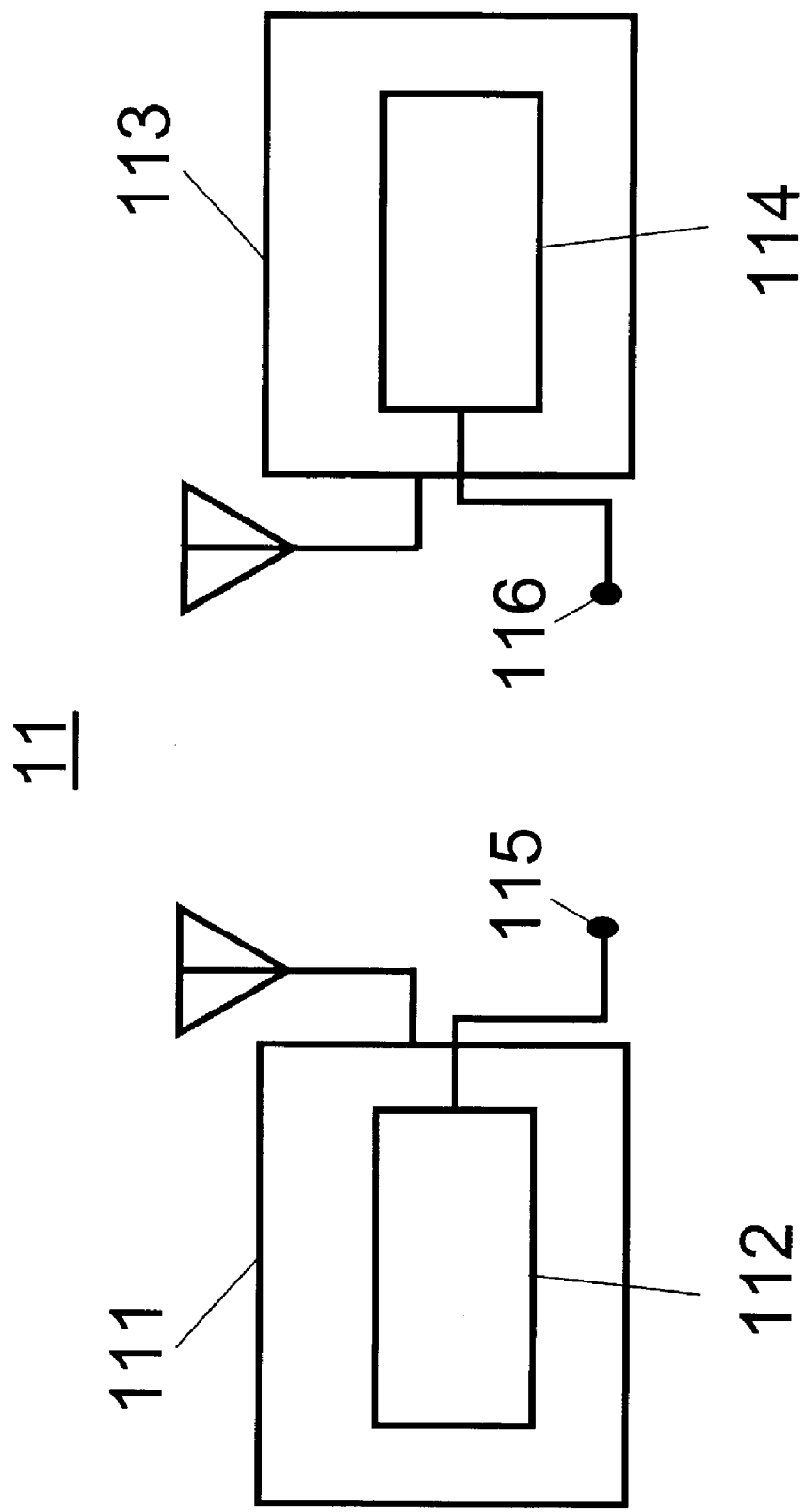
FIG. 17 illustrates an exemplary embodiment according to the invention of a communication system that incorporates mode switching.

FIG. 17 shows an exemplary embodiment according to the invention of a communication system that incorporates mode switching. High data-rate UWB communication system 11 includes transceiver 111, which has internal power source 112 (e.g., a battery or other power source). System 11 also includes second transceiver 113, with its internal power source 114 (e.g., a battery or other power source). The mode switching in system 11 occurs depending on whether the system operates from its internal power sources or from an external power source (not shown explicitly in FIG. 17).

When system 11 uses internal power source 112 and internal power source 114, it may operate in a mode that conforms to a particular PSD profile, for example, PSD mask 81 in FIG. 8. This mode may correspond, for example, to system operation indoors. PSD mask 81, corresponding to indoors operation, may have more relaxed requirements because system 11 may cause less potential interference with other systems while it operates indoors.

Conversely, when system 11 uses external power (supplied through port 115 to transceiver 111 and supplied through port 116 to transceiver 113), it may operate in another mode that conforms to a different PSD profile, for example, PSD mask 82 in FIG. 8. The second mode may correspond, for example, to system operation outdoors. Thus, by switching operation modes, WB communication systems according to the invention can meet more stringent PSD masks outdoors and yet conform to a more relaxed PSD mask while operating indoors.

To switch modes, system 11 senses the application of external power, and supplies a trigger signal to controller input 40 of the transmitter (see FIG. 3). In response, timing controller 42 and harmonic generator 49 adjust pre-determined timing parameters to generate the desired PSD profile, as described above in reference to FIG. 8. An analogous operation occurs in the receiver circuitry of the transceiver. Furthermore, a companion or corresponding transceiver similarly adjusts parameters in its transmitter circuitry and receiver circuitry in response to the particular PSD profile that the receiver circuitry receives.

Note that, although FIG. 17 shows a pair of transceivers, alternative systems may include a transceiver and a receiver, or a transmitter or receiver, as desired. Mode switching in such systems occurs using a similar technique and mechanism as described above, as persons skilled in the art with the benefit of the description of the invention understand.

Figure 18:
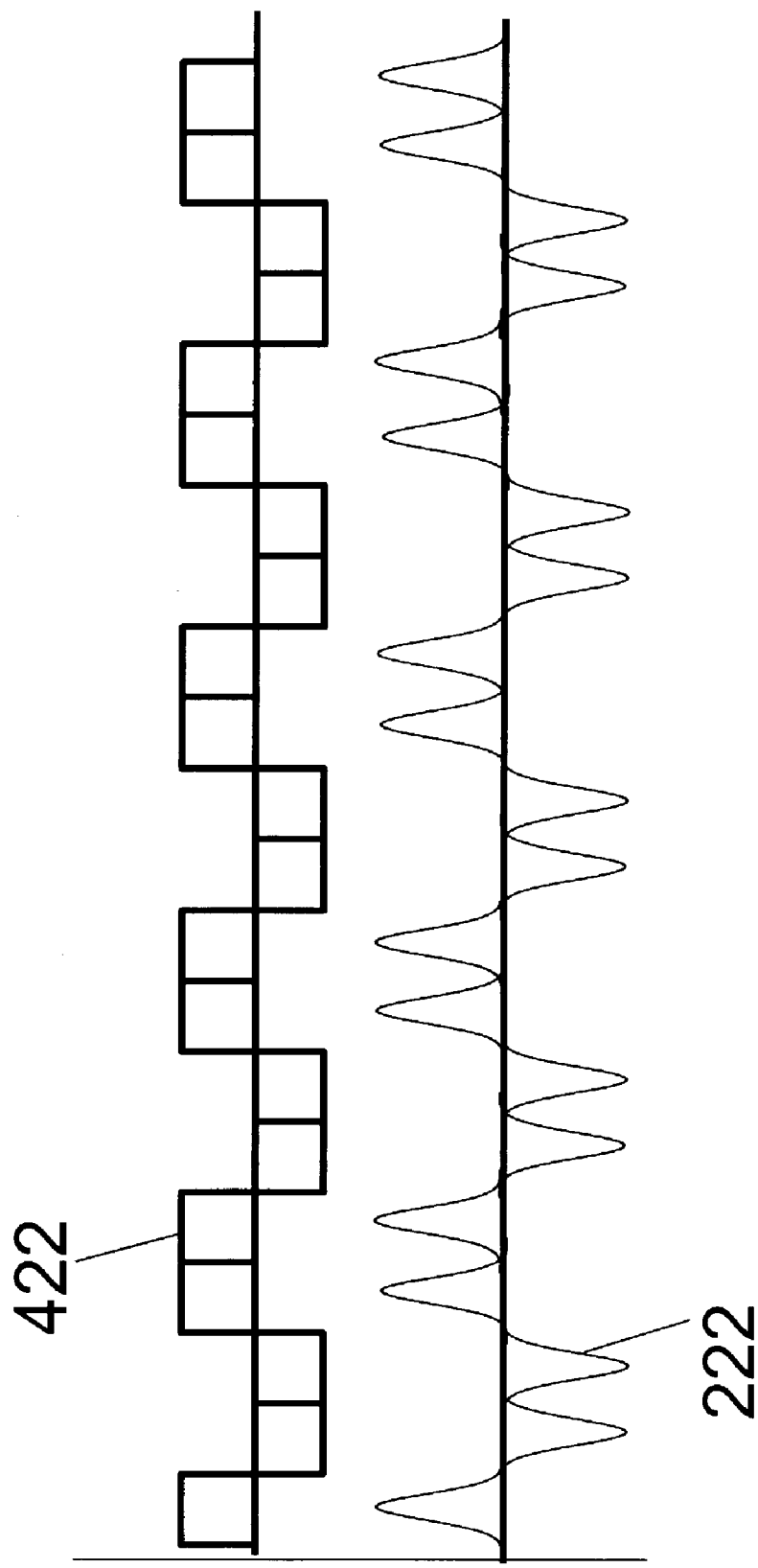
FIG. 18 depicts illustrative chipping sequences for use in communication systems and apparatus according to the invention.

Another aspect of the invention relates to the shape of the pulses within chipping signal 422 (reproduced in FIG. 18 for convenience). Chipping signal 422 includes pulses with generally rectangular shapes. As a consequence, one may generally obtain the spectrum in the frequency domain of the chip as given approximately by the well-known sinc function, $$\frac{\sin(x)}{x}.$$

(A chip corresponds to the distance in time between the vertical segments of signal 422, or the zero-crossings of signal 222.) The multiplication operation in mixer 47 shifts that spectrum in the frequency domain and centers a copy of the spectrum at each of the harmonic signals present in signal 421 (output signal of harmonic generator 49).

Although the description above assumes a chipping signal with pulses that generally have a rectangular shape (e.g., chipping signal 422), one may use other pulse shapes, as desired. For example, the pulses may have a more "rounded" shape.

One example of a more "rounded" pulse shape is the Gaussian impulse. Mathematically, one may represent a Gaussian impulse s(t) as:

$$s(t) = e^{\frac{-0.5 t^2}{\tau^2}},$$

where t represents time, and τ denotes a parameter that defines the pulse width. One may obtain the shape of the spectrum in the frequency domain by using the Fourier transform of s(t). Mathematically, one may express the Fourier spectrum of s(t) as:

$$S(f) = e^{-2(\pi f \tau)^2}.$$

Using the above relationships, one may design a pulse of width corresponding to frequency $f_B$ (for example 1.1 GHz)

where the magnitude of S(f) is below a reference value by a desired amount (for example, by 10 log[S($f_B$)]=−10 dB). This technique provides a design value for τ, which in turn allows one to evaluate s(t).

Note that FIG. 18 shows a Gaussian impulse as one example. One may use other shapes, as desired, as persons of ordinary skill in the art who have the benefit of the description of the invention understand. For example, one may use the trapezoidal shape of chipping signal 133, chipping signal 134, and chipping signal 135 in FIG. 12, as desired.

Furthermore, note that by shaping or filtering the pulses before mixing with a signal having a relatively high frequency (a harmonic signal), one avoids designing or shaping pulses at those relatively high frequencies. In the case of a filtered signal, one may obtain the PSD from:

$$PSD = 2f_r \int_0^{(1/f_r)} p(t) \sum_{n=n_1}^{n_2} \sin\left[2\pi \cdot n \cdot f_r\left(t - \frac{s}{f_r}\right)\right] e^{j2\pi ft} dt,$$

where p(t) denotes the baseband filtered data signal. On example is a Gaussian filtered signal, such as one chip of chipping sequence 222 in FIG. 18. Also, note that by using multiple harmonics, one may shift the shaped pulses in the frequency domain and center the shifted versions at the desired harmonic carriers.

Although FIG. 18 shows chipping sequence 422 and chipping sequence 222 as having +1 and −1 amplitude swings, one may use other swings, as persons of ordinary skill in the art who have the benefit of the description of the invention understand. For example, one may implement chipping sequences that use +1, 0, and −1 amplitude swings, as desired.

One may use various modulation schemes and techniques in communication systems and apparatus according to the invention, as desired. For example, exemplary embodiments of the invention may use techniques analogous to the conventional quadrature phase shift keying (QPSK) systems. Other exemplary embodiments according to the invention may use techniques analogous to offset QPSK (OQPSK).

More particularly, embodiments using QPSK use two harmonic carriers, which requires two degrees of freedom so that both pairs of harmonically related signals have a quadrature relationship. Specifically, the phase difference between the two reference clocks and an additional phase delay in one of the harmonic generator lines provide the two desired degrees of freedom. A QPSK-like UWB system according to the invention with two harmonic carriers has the desired property of providing a data rate twice the data rate of a BPSK-like system, while still having an essentially flat PSD profile that conforms to prescribed or desired criteria.

Providing an additional half chip length offset between the two data streams modulating the quadrature harmonic carriers provides an OQPSK system. Such an OQPSK system has the additional desirable property of a smoothed PSD spectrum or profile relative to the PSD profile of the QPSK system.

Figure 20:
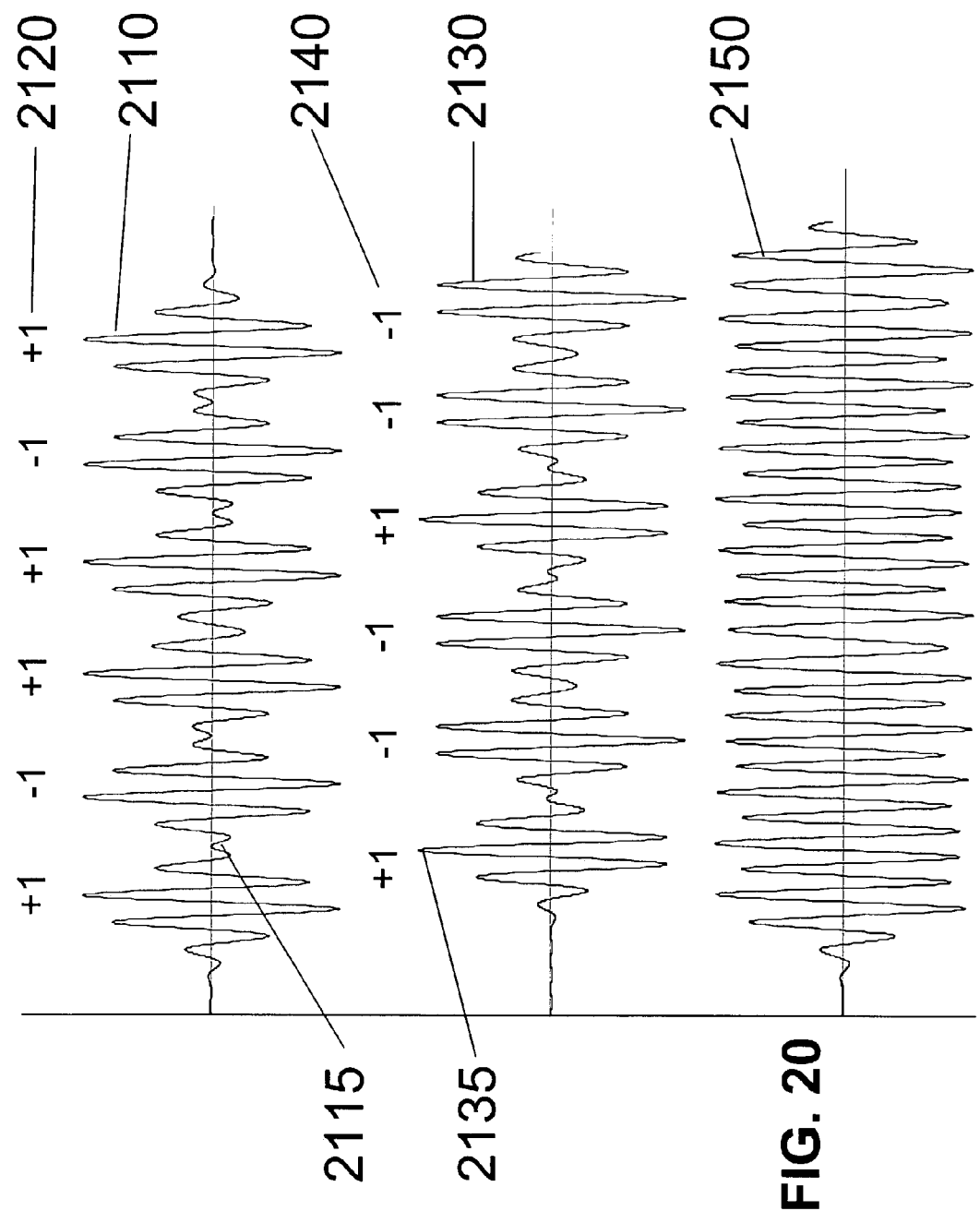
FIG. 20 illustrates a set of offset quadrature phase shift keyed (OQPSK) UWB signals in an exemplary embodiment according to the invention.

FIG. 20 shows one example of the waveforms of an OQPSK UWB signal set in an illustrative embodiment. Signal 2110 comprises sinusoidal harmonics, such as the signal shown in FIG. 11A, while signal 2130 comprises cosinusoidal harmonics, like the signal FIG. 11B illustrates.

Data stream 2120 modifies the polarity of signal 2110, and data stream 2140 modifies the polarity of signal 2130, independent of data signal 2120.

The signal 2130 is furthermore shifted in time to the right of signal 2110 so that the maximum envelope value 2135 of signal 2130 substantially corresponds with the minimum envelope value 2115 of signal 2110. Additionally, to maintain quadrature, the zero-crossings of signal 2110 correspond to the respective signal peaks of signal 2130. Conversely, the zero-crossings of signal 2130 correspond to the respective peaks of signal 2110.

Signal 2150 represents the sum of quadrature signals 2110 and 2130. Persons of ordinary skill in the art with the benefit of the description of the invention appreciate that the peak-to-average value of the composite signal is smaller than the peak-to-average values of either signal 2110 or signal 2130. This property results in a smoother PSD profile, and enables RF transmissions at a power level that requires less 'safety' margin to the regulatory limit levels.

In other embodiments according to the invention, one may use a differential phase shift keying (DPSK) scheme. One may modify a transmitter according to the invention, for example, transmitter 4 in FIG. 3, to generate DPSK signals, as persons of ordinary skill in the art who have the benefit of the description of the invention understand. Transmitter 4 generates DPSK signals as follows. Referring to FIG. 3, transmitter 4 receives data at data input 44. Transmitter 4 encodes the data differentially, similar to conventional DPSK. More specifically, transmitter 4 encodes the data as changes in the bit stream.

For example, suppose the sequence starts with a binary "1" bit. If the next bit is a "1," it indicates that transmitter 4 had sent a "0" previously (no change). On the other hand, if a "0" follows the original "1," then transmitter 4 encodes a "1." Thus, transmitter 4 encodes changes from 1 to −1 (or −1 to 1) as binary "1"s. Conversely, transmitter 4 encodes no bit-to-bit change (e.g., 1 followed by 1, or −1 followed by −1) as binary "0"s. As the above description makes evident, to transmit m bits, one transmits m+1 bits (a starting bit, followed by m bits of data), because the changes in the input data bits encode the data.

Referring to FIG. 3, data buffer 43 may perform the differential encoding described above. PN generator 45 generates chip sequences associated with a delay or time period D that equals the number of chips for a single data bit. The time delay D may be one chip time in one exemplary embodiment, and may constitute a coded sequence of bits in another illustrative embodiment (for example, D may be the number of chips associated with a single data bit). Put another way, one may use a per-chip (time period between starts of two chips) or per-bit (time period between the starts of two bits) time delay D. Regardless of the choice of time delay D, one keeps D constant for that system.

In exemplary embodiments according to the invention, one may generate chip sequences by using Barker codes or sequences. Each chip sequence is equal in length to one of the known Barker sequences. Preferably, transmitter 4 uses Barker sequences of length 13, 11, or 7, but as persons of ordinary skill in the art who have the benefit of the description of the invention understand, one may use other Barker sequences to provide chip sequences, as desired. Table 2 below lists the known Barker codes:

TABLE 2

| Length | Code Sequence |
|---|---|
| 2 | 1 −1 or 1 1 |
| 3 | 1 1 −1 |
| 4 | 1 −1 1 1 or 1 −1 −1 1 |
| 5 | 1 1 1 −1 1 |
| 7 | 1 1 1 −1 −1 1 −1 |
| 11 | 1 1 1 −1 −1 −1 1 −1 −1 1 −1 |
| 13 | 1 1 1 1 1 −1 −1 1 1 −1 1 −1 1 |

As persons skilled in the art understand, the reverse of the code sequences in Table 2 also constitute Barker codes. Furthermore, the inverse of the listed code sequences (i.e., code sequences obtained by replacing 1 with −1 and vice-versa) are Barker codes.

Note that, rather than using Barker codes, one may use other types of code, as persons of ordinary skill in the art who have the benefit of the description of the invention understand. For example, one may use Kasami codes, as desired. Other examples includes Hadamard codes, Walsh codes, and codes that have low cross-correlation properties.

PN generator 45 multiples each bit obtained from data buffer 43 with the Barker sequence. Accordingly, the signal 424 (output signal of data/PN combiner 46) constitutes either the Barker sequence or the inverse of a Barker sequence (i.e., obtained by multiplying by −1 the code sequences in Table 2). Assuming, for example, that PN generator uses a Barker code of length 11, the time period or delay D equals the length of 11 chips. As another example, FIG. 12 illustrates one chip time, which relates to Barker chips in FIG. 6 (signal 562), relating to a Barker code of length 4).

Figure 19:
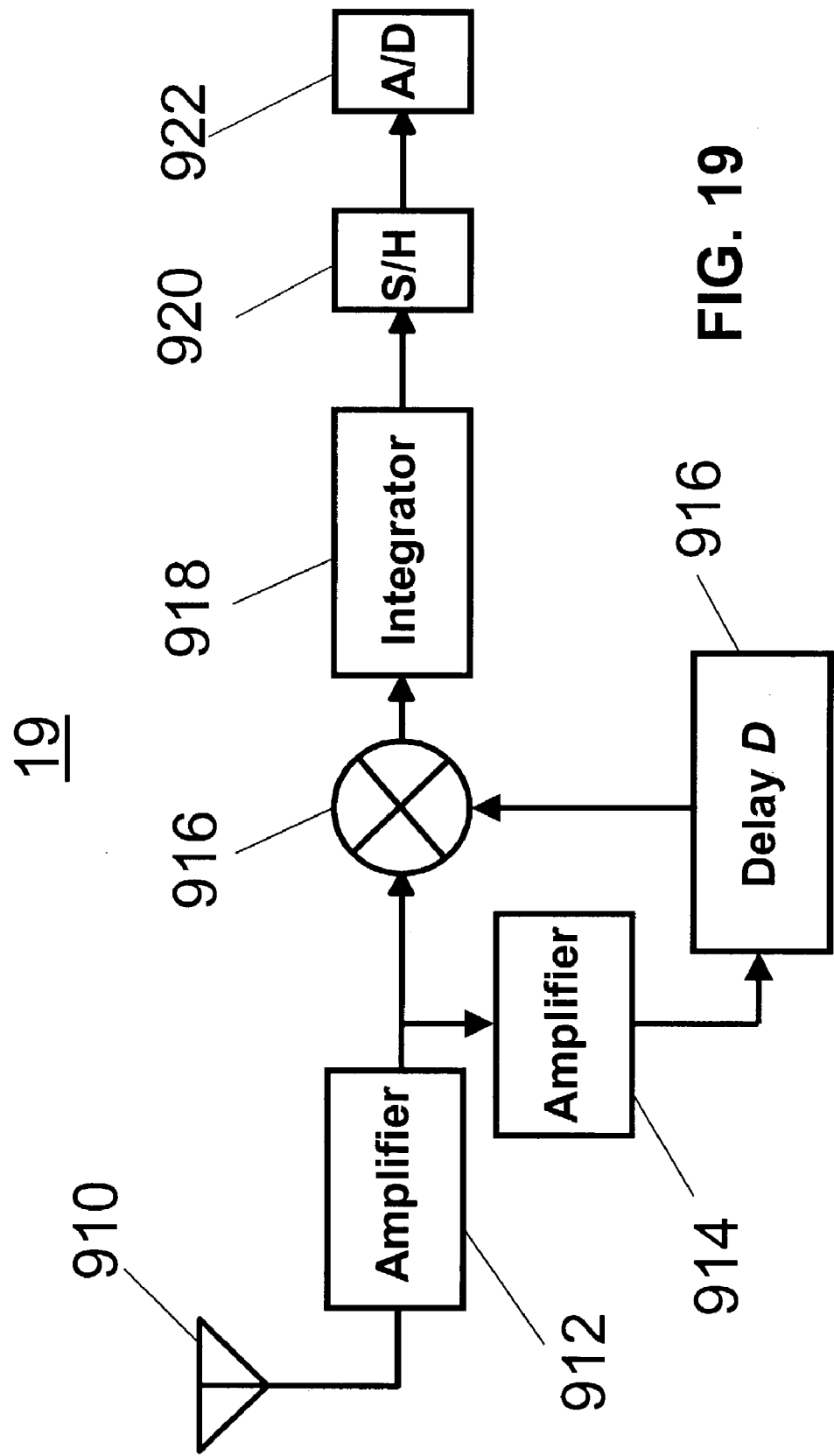
FIG. 19 shows an exemplary embodiment 19 of a differential receiver according to the invention.

FIG. 19 illustrates an exemplary embodiment 19 of a differential receiver according to the invention that is suitable for receiving DPSK signals. Receiver 19 includes antenna 910, mixer 916, integrator 918, sample-and-hold 920, and analog-to-digital converter (ADC) 922. Receiver 19 may optionally include amplifier 912 and amplifier 914.

Antenna 910 receives differentially encoded signals. Amplifier 912 amplifies the received signal and provides the resulting signal to one input of mixer 916 and amplifier 914. Through delay device 916, the output signal of amplifier 916 (if used) couples to another input of mixer 916.

The delay D provided by delay device 916 equals one bit time. Accordingly, mixer 916 multiplies the received signal by a version of the received signal delayed by a time period D. Because of the differential coding of the signals (described above), a bit sign in the delayed version of the received signal changes when receiver 19 receives a binary "1."

The output of mixer 916 feeds integrator 918. The output of mixer 916 constitutes a +1 Barker sequence of Table 2 multiplied by an inverse Barker sequence, thus resulting in a negative going voltage at the output of integrator 918 over the length of the Barker code. Sample-and-hold 920 samples the output signal of integrator 918 when that signal crosses a threshold. Sample-and-hold 920 provides the sampled signal to ADC 922. ADC 922 provides output data bits.

Note that, in illustrative embodiments, the length of the integration may be the time period D. Based on design and performance specifications, however, one may use longer or shorter time periods, as persons of ordinary skill in the art who have the benefit of the description of the invention understand.

Optional amplifiers 912 and optional amplifier 914 may constitute either linear amplifiers or limiting amplifiers, as desired. One may additionally use amplifier 914 to compensate for any losses in delay device 916. Note that one may place amplifier 912 as shown in FIG. 19 or, alternatively, after delay device 916.

One may implement delay device 916 in a variety of ways, as persons of ordinary skill in the art who have the benefit of the description of the invention understand. For example, a relatively simple delay device comprises a length of transmission line that has electrical length D. One may use a length of coaxial line, printed strip-line, or microstrip in various ways to realize such a device.

Implementing amplifier 912 and amplifier 914 as limiting amplifiers relaxes the design demands on mixer 916. Mixer 916 may have a variety of structures and circuitry, as persons of ordinary skill in the art who have the benefit of the description of the invention understand. For example, mixer 916 may constitute a passive ring diode mixer or a four-quadrant multiplier, as desired.

In conventional DPSK systems, the data bits constitute a length D equal to the length of one data bit. Such systems modulate the phase of the carrier (0 or $\pi/2$ radians) at the bit rate. In contrast, communication systems or apparatus according to the invention use a Barker encoded sequence of harmonic wavelets (as shown, for example, in FIG. 6) instead of the carrier in conventional systems. Communication systems or apparatus according to the invention modulate the polarity of the wavelets (i.e., +1 or −1) at the chip rate. Furthermore, they polarity modulate the chip sequences at the bit rate. Thus, in contrast to conventional DPSK systems, in communication systems and apparatus according to the invention, the bit time (see signal 563 in FIG. 6) comprises a coded sequence of wavelets.

Note that receiver 19 and associated circuitry may perform additional functionality. For example, such circuitry may recover the data bits, recover timing of the chip sequences, and fine tune the integration time of integrator 918 in response to signal quality, as persons of ordinary skill in the art who have the benefit of the description of the invention understand.

Note that the exemplary embodiments described above associate each data bit with a spreading code of length N. More specifically, one may use Barker codes of lengths N=2, 3, 4, 5, 7, 11, and 13. Thus, one may associate N chips with a single data bit. As an example, using a Barker code of length 7 (see Table 2, above), one may transmit a "1" by using the sequence 1 1 1 −1 −1 1 −1. Similarly, to transmit a "0," one may use the sequence −1 −1 −1 1 1 −1 1 (i.e., a sequence obtained by multiplying by −1 each number in the previous sequence).

In other embodiments according to the invention, one may use codes that have a larger length than needed to encode a single bit. Doing so may have several advantages. First, the spectrum of the resulting signal more closely resembles white noise (i.e., the benefit of spectrum "whiteness").

Second, one may use such codes to provide channelization. Longer codes have a relatively large number of nearly-orthogonal family members. One may use such family members to represent both various symbols (i.e., groups of bits) and to provide more effective channelization.

As an example, one may use PN sequence generated which the TIA-95 code division multiple access (CDMA). Such a sequence is 32,768 chips long. One may define channels and symbols by multiplying (e.g., by using an exclusive-OR operation) the PN sequence (at the chipping rate) with a Hadamard code or a Walsh code (i.e., repeated sequences like 1111111100000000, 1111000011110000, 1100110011001100, and so on, as persons skilled in the art understand). Thus, groups of chips are uniquely identify a symbol or channel. Such a techniques takes advantage of a code length of 32,767 to obtain a signal with a relatively smooth spectrum.

In addition to using relatively long codes to provide channelization, one may use other techniques, such as such as time-division multiplexing and space-division multiplexing (using directional antenna techniques to isolate links), as desired. Such techniques fall within the knowledge of persons of ordinary skill in the art who have the benefit of the description of the invention.

In addition to coding the transmitted data in embodiments according to the invention as described above, one may provide error-correction coding (ECC), as desired. For example, one may apply ECC to data input 44 in FIG. 3, as desired. Many such codes exist in the art, and one may apply them to communication systems and apparatus according to the invention as persons skilled in the art with the benefit of the description of the invention understand. Examples of such codes include BCH codes, Reed-Solomon codes, and Hamming codes.

Figure 21:
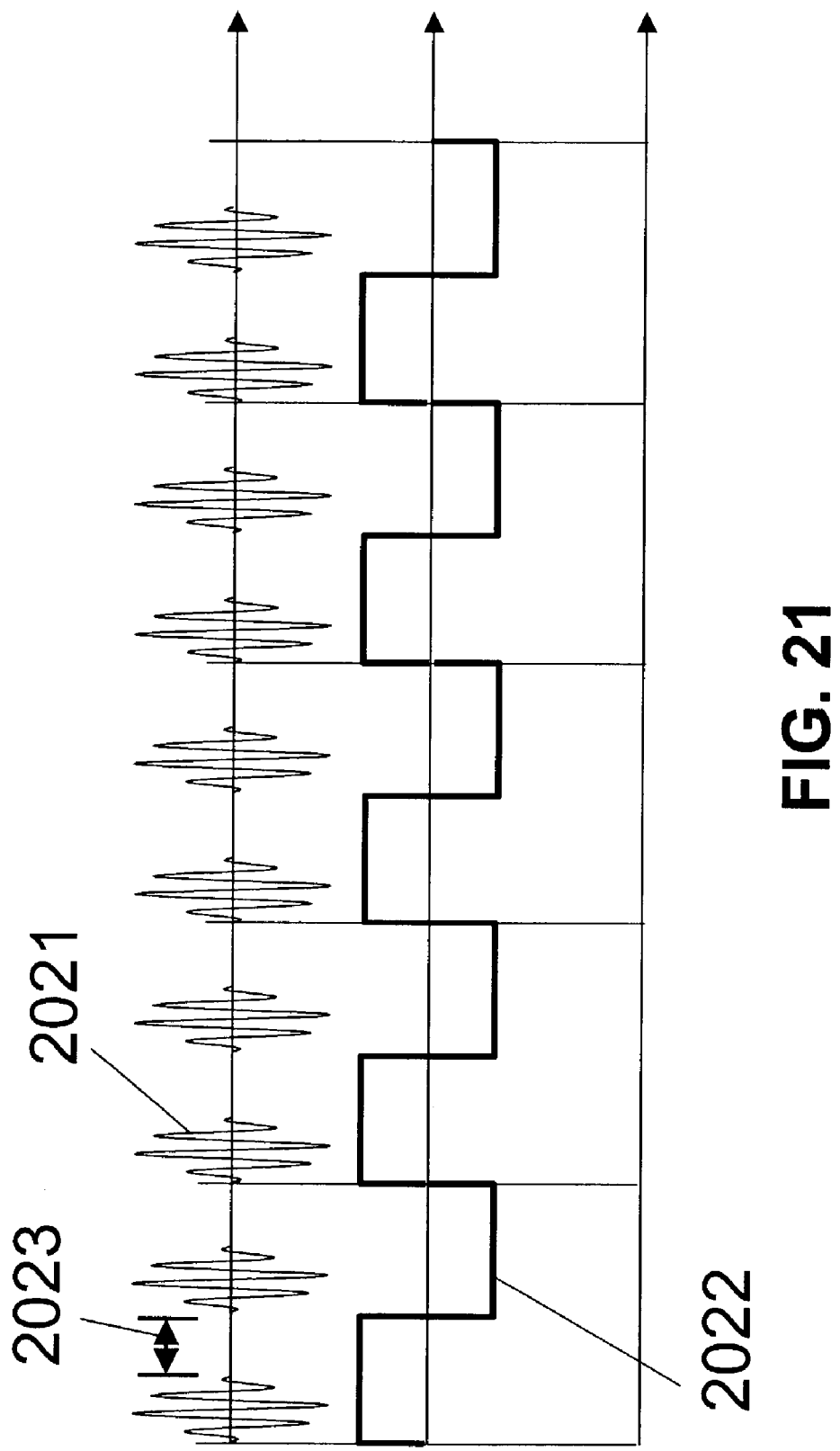
FIG. 21 depicts a set of chipping signal waveforms in an exemplary embodiment according to the invention.

As noted above, the carrier signal (e.g., carrier signal 21 in FIG. 2) may constitute a sinusoidal or non-sinusoidal carrier signal. FIG. 21 shows examples of some signal waveformns corresponding to a non-sinusoidal carrier signal. FIG. 21 includes a repeating pattern "1010" of chips 2022. Signal 2021 corresponds to the "1010" repeating pattern of chips. As FIG. 21 illustrates, signal 2021 may have a gap 2023 of an arbitrary length (with the parameters of signal 2022, of course) between its segments.

Another aspect of the invention relates to multiple independently modulated harmonic signals (e.g., harmonics of a given frequency, such as a clock frequency). In other words, in communication apparatus according to the invention, one may modulate various harmonic signals with either the same data stream, or independently, each (or a set) with a different data stream. Thus, the effective data rate constitutes the sum of all the data rates that modulate the harmonic signals.

Furthermore, one may selectively enable or turn ON each harmonic signal, as desired. Put another way, one may configure the harmonic signals independently. In one configuration, the harmonic signals are not ON or enabled simultaneously. In effect, one may hop from one harmonic signal or frequency to another harmonic signal or frequency as a function of time, as desired.

Configuring the harmonic signals by turning them ON selectively has a benefit of simplifying the communication apparatus or system. The communication apparatus or system may operate in the presence of multipath interference without a need to resort to coding. More specifically, such apparatus or systems may operate in an environment where multipath effects are present without having to code the signals that modulate each harmonic signal (as the embodiments described above do). Note, of course, that one may still use coding, as desired, but one need not do so to combat the effects of multipath interference.

To combat the effects of multipath interference, communication apparatus or systems according to the invention transmit one impulse on a given harmonic frequency or channel and then wait for the multipath echoes on that channel to decay before transmitting again. For example, suppose that multipath interference in a given environment has a delay spread of 25 ns. Thus, it takes about 20 ns for the echoes present because of multipath to decay, before one may receive the next impulse or signal (product of the harmonic signal and a signal chip or bit that carries one datum bit).

By using multiple harmonic signals (i.e., two or more harmonics) or frequencies, one may transmit multiple data bits. In other words, one may transmit a first datum bit on the frequency of a first harmonic signal, then transmit a second datum bit on the frequency of a second harmonic signal, and so on, until one transmits the final datum bit (say, datum bit N) using the Nth harmonic signal. One may then repeat this cycle, as desired.

The delay between subsequent transmissions using a given harmonic signal allows the multipath echoes to decay, so that echoes from one transmission do not interfere with a subsequent transmission that uses that harmonic signal. In effect, one takes advantage of the fact that sufficient numbers of the frequency-time combinations exist that before one transmits again using a given harmonic frequency, the multipath echoes present at that frequency have decayed sufficiently. Furthermore, by spacing the transmission frequencies sufficiently, one may reduce interference from multipath echoes of one harmonic frequency with transmissions on another harmonic frequency.

Figure 22:
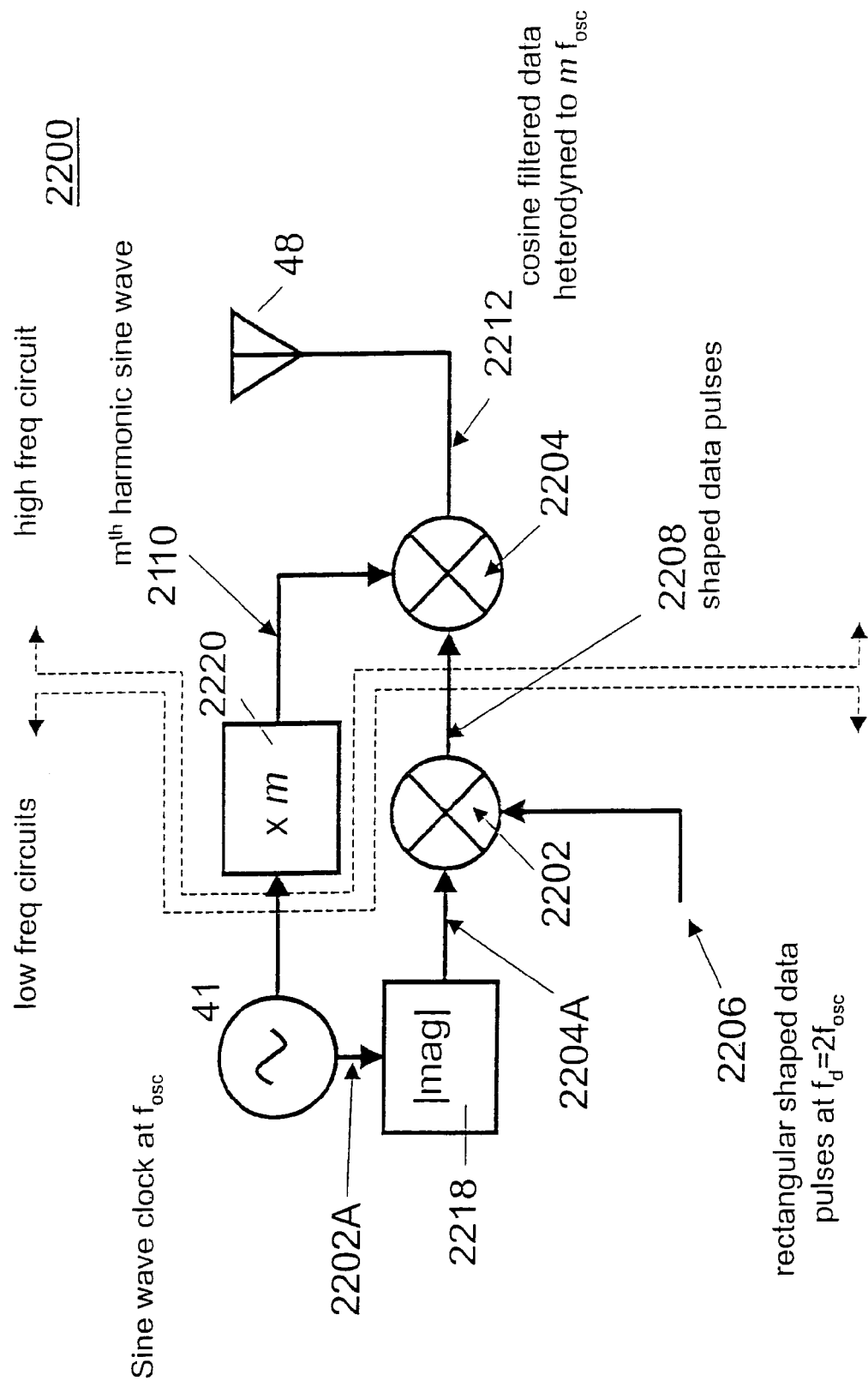
FIG. 22 shows an exemplary embodiment of a transmitter according to the invention that uses independently modulated harmonic signals.

FIG. 22 shows an exemplary embodiment of a transmitter 2200 according to the invention that uses independently modulated harmonic signals. Note that dashed lines in FIG. 22 separate circuitry that operates at relatively lower frequency from other circuitry that operates at relatively high frequency. One may include the lower-frequency circuitry in one IC and include the higher-frequency circuitry in another IC, as desired.

Reference clock 41 generates a signal with a desired frequency, for example, a sinewave with a frequency $f_{osc}$. One may implement reference clock 41 in a number of ways and by using various techniques that fall within the knowledge of persons skilled in the art with the benefit of the description of the invention.

Reference clock 41 couples to harmonic generator 2220. Based a clock signal it receives from reference clock 41, harmonic generator 2220 generates an mth harmonic signal of the frequency of clock reference 41. For example, given a clock frequency $f_{osc}$, a second harmonic signal at the output of harmonic generator 2220 has a frequency $2 \cdot f_{osc}$, and so on, such that, generally, the mth harmonic signal has a frequency $m \cdot f_{osc}$.

Note that one may vary m during operation of transmitter 2200, as desired. More specifically, one may vary m per data bit, or on a chip-by-chip basis. By varying m, one may generate a desired harmonic signal that has a given frequency. Thus, by using m=3, one may generate the third harmonic or, by using m=9, one may generate the ninth harmonic, and so on.

As persons of ordinary skill in the art who have the benefit of the description of the invention understand, one may realize harmonic generator 2220 in a number of ways, similar to harmonic generator 49, described above. As one example, one may use a frequency synthesizer. By varying the control signal of the frequency synthesizer (e.g., a control voltage), one may vary the output frequency of the frequency synthesizer. Thus, by applying a level of the control signal that corresponds to a desired value of m, one may generate the desired harmonic, as desired.

Harmonic generator 2220 generates the harmonic signals synchronously with respect to the reference clock. One may use a variety of circuitry and techniques to synchronize the one or more harmonics to the reference clock. Such circuitry and techniques fall within the knowledge of persons of ordinary skill in the art who have the benefit of the description of the invention, as discussed above.

Transmitter 2200 may also include signal shaping circuitry 2218 and mixer 2202. Using signal shaping circuitry 2218 and mixer 2202, one may shape (or filter) data signals 2206, as desired, and as described below in detail. In embodiments where one uses that option, mixer 2202 generates an output signal 2208 that constitutes shaped data pulses.

Transmitter 2200 also includes mixer 2204 and antenna 48. Output signal 2208 feeds one input of mixer 2204. Output signal 2210 of harmonic generator 2220 feeds another input of mixer 2204. The output signal of mixer 2204 constitutes modulated RF signals 2212. Antenna 48 accepts modulated RF signals 2212 from mixer 2204 and propagates them into a transmission medium.

Note that, by varying the value of m, one may cause transmitter 2200 to heterodyne operating frequency of output signal 2208 of mixer 2202 (shaped data pulses) to a different RF frequency. In other words, by varying the value of m as a function of time, one may cause the output frequency of transmitter 2200 to hop to various frequencies as a function of time, as described above. One may vary the value of m in a variety of ways, as persons of ordinary skill in the art who have the benefit of the description of the invention understand. For example, one may use a controller (not shown explicitly) to control various functions of transmitter 2200, including selecting the value of m, as desired.

As persons of ordinary skill in the art with the benefit of the description of the invention understand, one may use integer or non-integer (e.g., fractional) values of m, as desired. Thus, in general, one may derive operating frequency of output signal 2208 of mixer 2202 by using integer or non-integer values of m, as desired. Put another way, operating frequency of output signal 2208 of mixer 2202 need not (but may) constitute an integer harmonic of the clock signal. Rather, it may relate to the clock frequency in any desired or arbitrary way. For example, the clock frequency may constitute a fraction of operating frequency of output signal 2208. Furthermore, one may use frequency synthesizers, such as fractional-M synthesizers, to generate such operating frequencies, as persons of ordinary skill in the art who have the benefit of the description of the invention understand.

Furthermore, one may modulate intelligence or information signals in a variety of ways to generate data signals 2206, as desired. By way of illustration, one may apply BPSK modulation, quadrature amplitude modulation (QAM), and QPSK modulation, and the like, as described above and understood in the art. The choice of the modulation scheme depends on design and performance specifications for a particular implementation, as persons of ordinary skill in the art with the benefit of the description of the invention understand.

Figure 23:
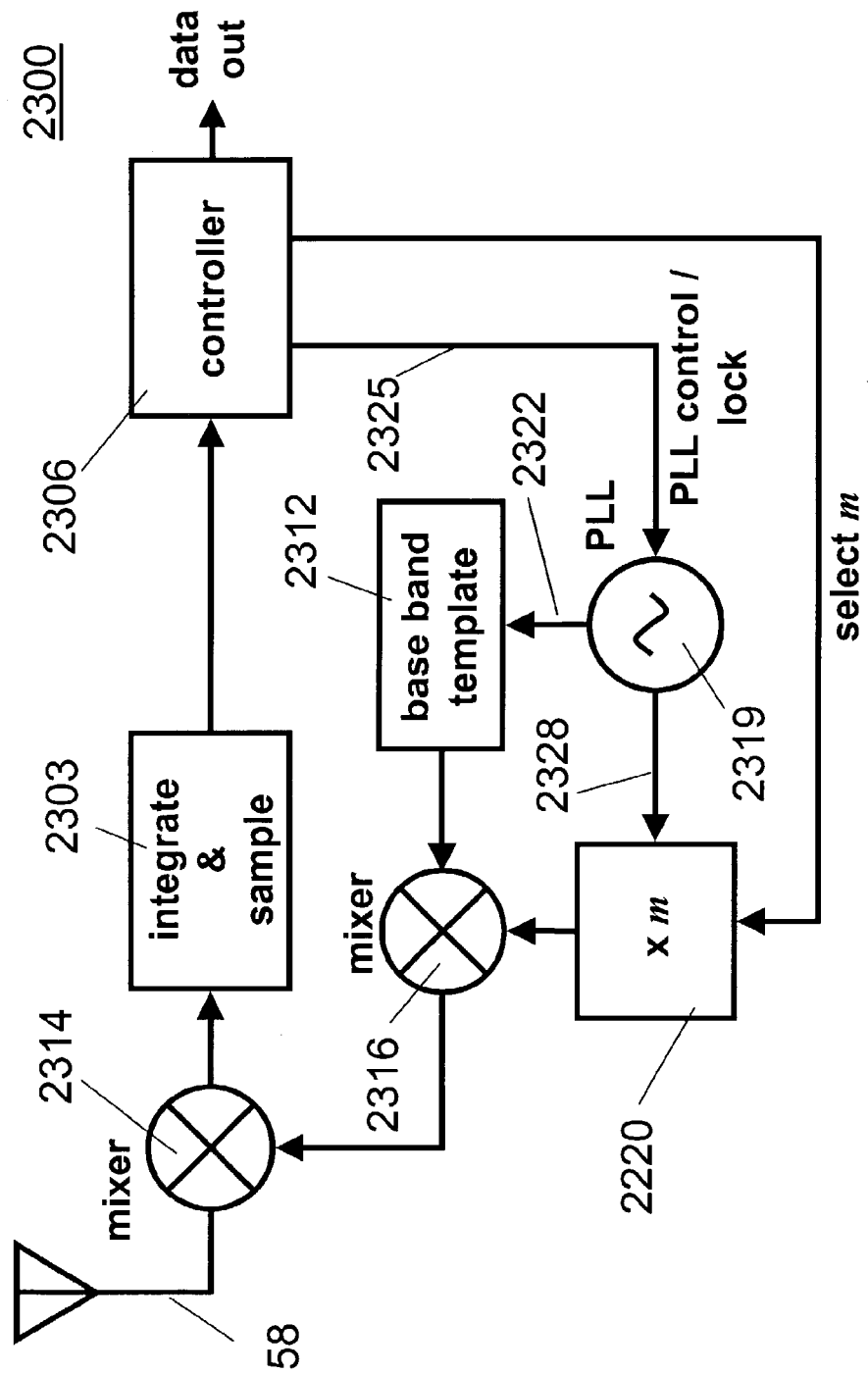
FIG. 23 illustrates an exemplary embodiment of a receiver according to the invention for receiving independently modulated harmonic signals.

FIG. 23 illustrates an exemplary embodiment of a receiver 2300 according to the invention for receiving independently modulated harmonic signals. Receiver 2300 includes antenna 58, mixer 2314, mixer 2316, integrator/sampler (integrator/sample-and-hold) 2303, controller 2306, baseband template generator 2312, phase-locked loop (PLL) 2319, and harmonic generator 2220.

Antenna 58 receives RF signals and provides them to one input of mixer 2314. Output signal of mixer 2316 constitutes a second input of mixer 2314. Baseband template generator 2312 generates a template signal that constitutes one input of mixer 2316. The output of harmonic generator 2220 constitutes a second input of mixer 2316.

The output of baseband template generator 2312 matches the output of signal shaping circuitry 2218 in transmitter 2200 (see FIG. 22). Baseband template generator 2312 generates its output under the control of PLL 2319. Using feedback within receiver 2300, PLL 2319 generates a first output signal, reference signal 2322, which it provides to baseband template generator 2312.

When receiver 2300 locks onto a desired RE signal, reference signal 2322 constitutes the same as the reference signal used in the corresponding transmitter for the RF signal. For example, referring to FIGS. 22 and 23, when receiver 2300 locks onto the signal transmitted by transmitter 2200, reference signal 2322 constitutes a signal similar to the reference signal that clock reference 41 generates (see FIG. 22). In other words, PLL 2319 generates reference signal 2322 such that it has a frequency $f_{osc}$.

PLL 2319 generates a second output signal 2328, which has a frequency $f_{osc}$, that feeds harmonic generator 2220. Harmonic generator 2220 operates as described above in connection with transmitter 2200 in FIG. 22. Thus, harmonic generator 2220 provides a harmonic signal to mixer 2316 that has a frequency $m \cdot f_{osc}$.

As noted above, the output of mixer 2316 feeds one input of mixer 2314. Receiver 2300 uses the output of mixer 2314 to control the feedback loop that includes PLL 2319 so that the output of mixer 2316 matches the RF signals received from antenna 58. The control loop includes integrator/sampler 2303, controller 2306, and PLL 2319.

The output of mixer 2314 feeds the input of integrator/sampler 2303. Depending on the datum value that receiver 2300 receives, integrator/sampler 2303 provides one of two voltage levels as its output. For example, if receiver 2300 receives a binary zero, the output of integrator/sampler 2303 may constitute a negative voltage. Conversely, if receiver 2300 receives a binary one, integrator/sampler 2303 may provide a positive voltage as its output.

The output of integrator/sampler 2303 feeds an input of controller 2306. Controller 2306 generates a datum value depending on the voltage level it receives from integrator/sampler 2303. For example, in response to a positive voltage present at the output of integrator/sampler 2303, controller 2306 may generate a binary one bit that has desired digital level.

Note that controller 2306 may perform filtering, shaping, and the like, of the data signals, as desired. Controller 2306 also provides feedback control signal 2325 to PLL 2319, thus affecting the frequency of the signals that PLL 2319 generates. Furthermore, controller 2306 decides the value of m and provides that value to harmonic generator 2220.

As noted above, harmonic generator 2220 generates as its output the mth harmonic of output signal 2328 of PLL 2319. Note that one determines the sequence of the values of m as a function of time for both the receiver and the transmitter. While operating, the receiver and the transmitter use various values of m according to the predetermined sequence.

Note that one may implement the feedback loop within receiver 2300 in a variety of ways, as desired. The choice of implementation depends on a number of factors, such as design and performance specifications and characteristics, as persons skilled in the art with the benefit of the description of the invention understand. The feedback loop uses baseband template generator 2312 to provide a locking mechanism for receiving a transmitted signal (i.e., a template receiver or matched template receiver), as persons skilled in the art who have the benefit of the description of the invention understand.

As noted above, by varying the value of m, communication apparatus and systems according to the invention may use various frequency channels. Furthermore, varying the value of m as a function of time varies the use of those channels as a function of time. Thus, one may specify a channel frequency plan and a channel timing plan for communication apparatus and systems according to the invention. By varying the frequency and channel timing plans, one may design and implement a wide variety of communication apparatus and system, as desired.

Table 3 below shows an example of a channel frequency and timing plan in an illustrative embodiment of a communication apparatus or system according to the invention:

TABLE 3

| M Channels | f (GHz) | Time Slot (ns) | m |
|---|---|---|---|
| 1 | 3.50 | 24 | 28 |
| 2 | 3.75 | 0 | 30 |
| 3 | 4.00 | 32 | 32 |
| 4 | 4.25 | 8 | 34 |
| 5 | 4.50 | 40 | 36 |
| 6 | 4.75 | 16 | 38 |

The example in Table 3 corresponds to a communication apparatus or system that uses six channels. Furthermore, the apparatus or system uses six time slots, each with an 8 ns duration. Thus, the time slots repeat at 48 ns intervals. The harmonics used range from the 28th harmonic to the 38th harmonic. Put another way, m ranges from 28 to 38. With a clock reference frequency of 125 MHz, the channels range in frequency from 3.50 GHz to 4.75 GHz.

More specifically, at time t=0, m=30 corresponds to a harmonic frequency of 3.75 GHz. That frequency corresponds to channel 2. Eight nanoseconds later, at t=8 ns, m=34 corresponds to a frequency of 4.25 GHz, which corresponds to channel 4, and so on. The frequency shown in the second column of Table 3 denotes the frequency of the harmonic signal that is ON or enabled (i.e., modulated and transmitted by the transmitter).

Note that one may order the channels and their corresponding frequencies in a variety of ways, as desired. In an embodiment that corresponds to Table 3, one may seek to select the channel frequency corresponding to a time slot as far apart from neighboring time slots possible. Referring to Table 3, note that a time period of at least two time slots (i.e., 16 ns) separates adjacent channels. Selecting the channel and frequency and timing plan in that manner tends to reduce or minimize interference among the channels, which tends to increase or maximize channel separation and promote decay of multipath interference.

Note, however, rather than using the channel plans in Table 3, one may use a wide variety of other apparatus or systems that have other numbers of channels, frequencies, time slots, and harmonic numbers, as desired, and as persons of ordinary skill in the art who have the benefit of the description of the invention understand. Depending on the desired system performance and design specifications, one may use channel and frequency and timing plans to improve multipath rejection performance and to provide channelization to accommodate multiple users in a communication system.

With any given channel frequency and timing plan, one may use a variety of modulation schemes, as desired, and as persons of ordinary skill in the art who have the benefit of the description of the invention understand. Examples of modulation schemes include BPSK, QPSK, 8-QAM, and 16-QAM. The choice of channels and the type of modulation technique used affects the overall data rate of the communication system or apparatus.

Table 4 below shows an example of channels used and the approximate resulting data rates of throughput (in megabits per second) for various modulation techniques:

TABLE 4

| No. of Channels Used | BPSK | QPSK | 8-QAM | 16-QAM |
|---|---|---|---|---|
| 1 | 20.8 | 41.7 | 83.3 | 166.7 |
| 2 | 41.7 | 83.3 | 166.7 | 333.3 |
| 3 | 62.5 | 125.0 | 250.0 | 500.0 |
| 4 | 83.3 | 166.7 | 333.3 | 666.7 |
| 5 | 104.7 | 208.3 | 416.7 | 833.3 |
| 6 | 125.0 | 250.0 | 500.0 | 1000.0 |
| Est. $E_b/N_o$ (db) | 7 | 7.5 | 12 | 16 |

Note that, rather than using six channels as Table 4 shows, one may use fewer or more channels, as desired. The choice of the number of channels and the modulation technique used depends on factors such as system performance and design specifications and considerations, as persons skilled in the art with the benefit of the description of the invention understand.

Furthermore, Table 4 corresponds to a UWB system with an approximately 500 MHz bandwidth per channel. One may apply the inventive concepts to a variety of UWB systems with other bandwidths, as desired. The bandwidth of 500 MHz corresponds to the smallest bandwidth defined as UWB in 47 C.F.R. Part 15 of the FCC rules and regulations.

Note further that Table 4 corresponds to a system with a pulse repetition rate of approximate 20.83 MHz. This pulse repetition rate corresponds to 8 nanosecond long pulses (one cycle of the 125 MHz reference) sent every 48 nanoseconds at a ⅟48 ns (approximately 20.83 MHz) pulse repetition rate.

The last row in Table 4, labeled "Est. $E_b/N_0$ (dB)," denotes the estimated or approximate energy used for each transmitted bit in the presence of noise. Referring to Table 4, of the modulation schemes listed, that BPSK modulation has the lowest amount of energy per bit to noise density ratio (7 dB for an approximate 0.1% bit error rate), but also has the lowest overall data throughput. Conversely, 16-QAM has the highest energy per bit to noise density ratio (16 dB for an approximately 0.1% bite error rate), but has the highest overall data throughput (roughly eight times higher than BPSK). Generally, the more complex a modulation scheme, the higher the energy level it uses to transmit a bit with a specified bit error rate in the presence of noise.

One may use the information from Table 4 to design and implement communication apparatus or systems that may meet the IEEE 802.15.3a proposed draft standard. The proposed draft specifies data rates of about 110 megabits per second, about 200 megabits per second, and about 480 megabits per second. The cells highlighted with bold numbers in Table 4 show combinations of modulation schemes and numbers of channels that one may use to implement such apparatus or systems in a flexible manner.

Such flexibility is desirable because with the regulatory transmissions limits specified as power spectral density limits, the total transmission power is proportional the total bandwidth used (in other words on the number of channels used in Table 4). Thus, one may transmit 125 Mb/s in three channels by using QPSK or, alternatively, in six channels by using BPSK. With six channels the total radiated power may be twice that of three channels for extended range communications. Hence, in a system, one may trade bandwidth for range at a given or desired data rate.

One aspect of apparatus or systems according to the invention concerns their scalability. More specifically, one may design a plurality of 500 MHz-wide channels in the frequency range of 3.1 to 5.2 GHz, using $f_{osc}$ of 125 MHz, with the following center frequencies:

$f_1 = 28 f_{osc} = 3.500$ GHz, $f_2 = 29 f_{osc} = 3.625$ GHz, $f_3 = 30 f_{osc} = 3.750$ GHz,

. . .

and $f_{13} = 40 f_{osc} = 5.000$ GHz.

In a rulemaking, the FCC has limited UWB emissions to −41.3 dBm per MHz. For each channel, one may determine the power from the following equation:

$P_c = -41.3 + 10 \log(2.374 f_{osc})$ or −16.6 dBm per channel.

Thus, increasing the number of channels to provide higher data rates also increases the total emitted power. For example, 2 channels would provide 3 dB more power than a single channel. As another example, 4 channels would provide 6 dB more power than a single channel, and so on. Using multiple channels increases the total emitted power by the same ratio as it increases the overall data rate or data throughput if one uses a single modulation scheme (e.g., not switching from BPSK to QPSK, and so on).

Consequently, the communication range remains approximately constant with an increase in the data rate or data throughput or, as stated above, one may trade bandwidth for communications range. Thus, apparatus or systems according to the invention provide a desirable scalability feature such that increasing the data rate or data throughput does not decrease the communication range. In other words, one may achieve communication with a higher data throughput at a desired range by increasing the number of channels and, hence, increasing the total emitted power.

Note that the examples described above with particular system parameters, such as frequencies and frequency ranges, constitute illustrative embodiments of the inventive concepts. As persons of ordinary skill in the art with the benefit of the description of the invention understand, one may use a variety of other system parameters (e.g., frequencies and frequency ranges), as desired, depending on various factors, such as desired design and performance specifications.

As an example, one may use two channels in the 3.1 to 5.1 GHz band, with $f_{osc} = 232$ MHz (i.e., the channels are wider than 500 MHz), with the following center frequencies:

$f_1 = 16 f_{osc} = 3.712$ GHz, and $f_2 = 20 f_{osc} = 4.640$ GHz, or m=16 and 20, respectively, and where $P_c = -41.3 + 10 \log(2.374 f_{osc})$, or −13.9 dBm.

By ruling, the FCC has allowed UWB emissions in the 3.1 to 10.6 GHz frequency band or range. The exemplary channel plans described conform to the FCC rules while allowing co-existing communications with the UNII band. Thus, the 3.1 to approximately 5.2 GHz range constitutes an example of a desirable frequency range if one wishes to avoid possible interference with communications in the UNII band.

The FCC rulemaking referenced above specifies one mask with a bandwidth defined at −10 dB points. In the example given above, the −10 dB point occurs at $2 f_{osc} = 464$ MHz, while the −20 dB point occurs at $2.62 f_{osc} = 607.84$ MHz. Thus, an apparatus or system according to an illustrative embodiment based on this example meets that FCC specification of −10 dB at 3.1 GHz. Note that, in this example, the two center frequencies correspond to a bandwidth of 928 MHz, and that two channels fit in the desired frequency range, here between 3.1 and 5.2 GHz.

Of course, one may implement other embodiments according to the invention with a wide variety of parameters, such as frequency plans, modulation schemes, and the like, as persons skilled in the art with the benefit of the description of the invention understand. In fact, one may use other frequency synthesis methods in which the value of m does not constitute an integer, as noted above.

Another aspect of the invention relates to signal shaping in communication apparatus. More specifically, signal shaping circuitry 2218 in FIG. 22 provides a way of shaping, processing or filtering output signal 2202A of reference clock 41 to generate shaped output signal 2204A. Shaped output signal 2204A feeds one input of mixer 2202, as described above.

The signal shaping circuitry 2218 affects the spectrum of output signal of mixer 2204, which essentially constitutes the transmitted signal of transmitter 2200. More specifically, rather than using signal shaping circuitry 2218 to mix shaped signal 2204A with data signals 2206, one may merely provide data signals 2206 to mixer 2204. As a consequence of bypassing or not using signal shaping circuitry 2218, the spectrum of the transmitted signal includes relatively high side lobe levels. Those side lobe levels may fail to fit a desired mask, such as a mask that the FCC or another regulatory body has prescribed.

By using signal shaping circuitry 2218, one may reduce or lower the side lobes of the transmitted signal. Consequently, the spectrum of the transmitted signal tends to more easily meet more stringent spectral radiation or mask requirements. Note that one applies an analogous signal shaping function in a receiver that receives and processes signals transmitted by transmitter 2200.

Referring to FIG. 23, receiver 2300 constitutes a matched template or matched filter receiver. Baseband template generator 2312 provides the same or analogous signal shaping functionality as does signal shaping circuitry 2218 in transmitter 2200. In other words, as noted above, the output of baseband template generator 2312 matches the output of signal shaping circuitry 2218 in transmitter 2200.

Note that signal shaping circuitry 2218 (and the corresponding signal shaping in receiver 2300) may provide virtually any desired signal shaping, processing, or filtering function, as desired. By way of illustration, signal shaping circuitry 2218 may add a DC component (such as a DC voltage), it may provide a magnitude function (e.g., by performing full-wave rectification of the input signal), and the like, as persons skilled in the art who have the benefit of the description of the invention understand.

Furthermore, one may combine various functions together, as desired. For example, one may add a DC offset to a magnitude function. Generally, one may apply a wide variety of signal shaping functions or combinations of functions by configuring the transfer function of signal shaping circuitry 2218. The choice of the function(s) to use depends on a variety of design and performance factors, such as desired spectral characteristics and/or desired levels of out of band energy, and the like, as persons of ordinary skill in the art who have the benefit of the description of the invention understand.

Rather than using analog circuitry to shape signals, one may use digital circuitry or a mixed-mode circuitry, as desired. For example, one may store signal samples in a memory, such as a read-only memory (ROM), and based on the input signal to signal shaping circuitry 2218, use a counter to access various addresses in the memory in other to generate a desired signal at the output of signal shaping circuitry 2218.

By using an appropriate transfer function for signal shaping circuitry 2218, one may smooth the spectrum of data signals 2206 or, put another way, reduce the high frequency content of baseband data signals 2206. As noted above, data signals 2206 generally have pulse shapes (e.g., a square-wave or pulse train). Suppose, for example, that signal shaping circuitry 2218 applies a magnitude function to output signal 2202A of reference clock 41.

Output signal 2204A of signal shaping circuitry 2218 constitutes a rectified cosine signal, and its spectrum contains less high-frequency content than does the spectrum of data signals 2206. Accordingly, output signal 2212 of mixer 2204 and, hence, the transmitted signal, has side lobes with lower levels.

In the above example, note that one may implement the magnitude function without using analog filtering components, as persons skilled in the art with the benefit of the description of the invention understand. Thus, one may implement the magnitude function in an IC that contains primarily digital circuitry, as desired. Doing so provides more processing and manufacturing flexibility, which may result in higher reliability and lower cost.

Figure 24:
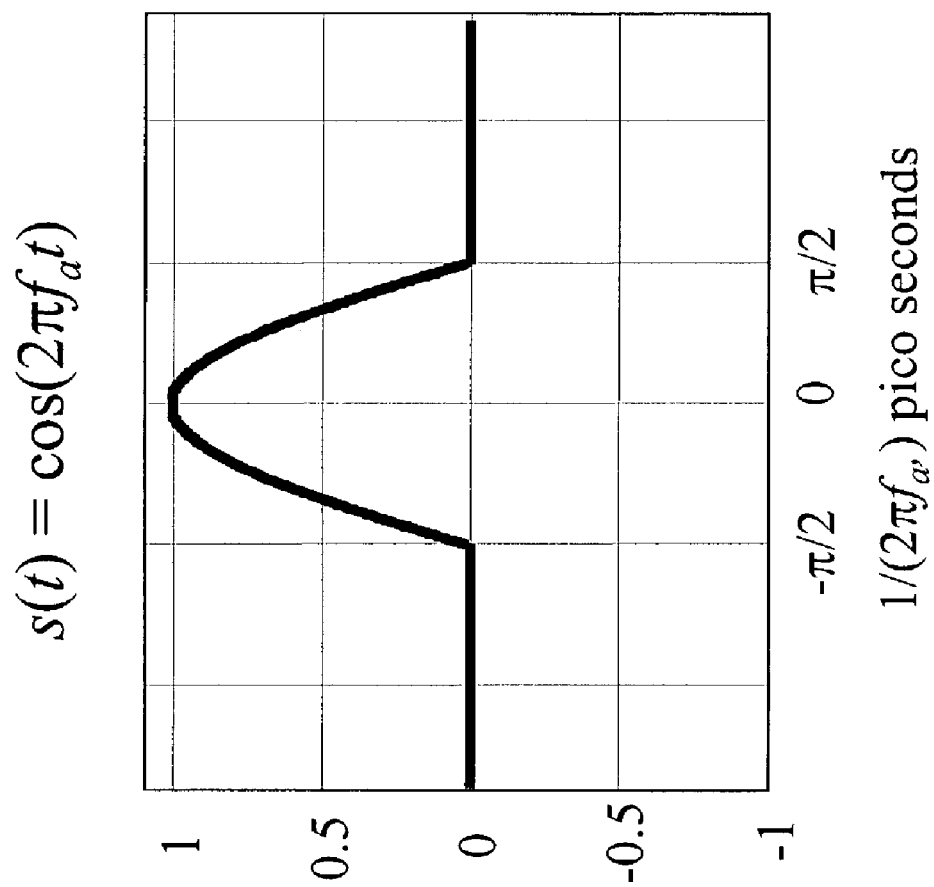
FIG. 24 depicts a sample waveform in an illustrative embodiment according to the invention.
Figure 25:
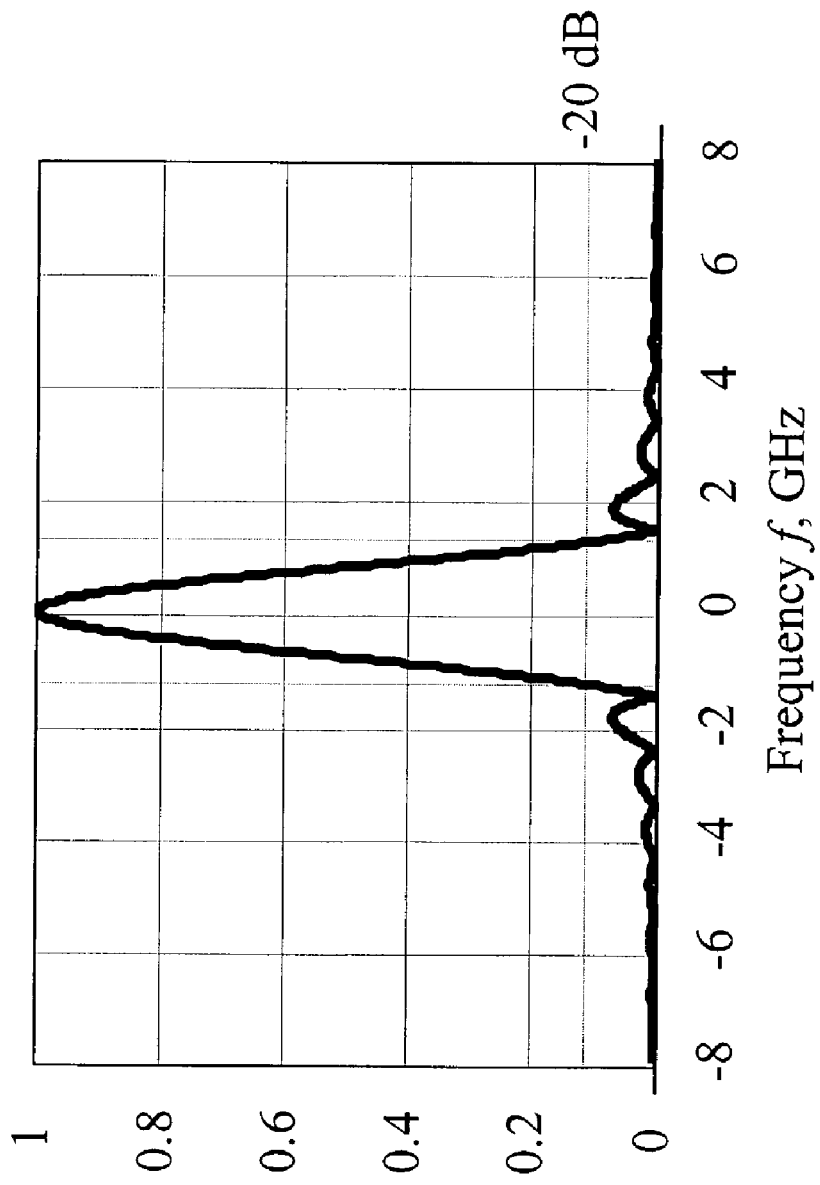
FIG. 25 shows a Fourier transform of the signal in FIG. 24.

FIGS. 24 and 25 show sample waveforms for one example of a magnitude function realized in an illustrative embodiment of a pulse shaping circuitry 2218 according to the invention. More specifically, FIG. 24 illustrates one cycle of output signal 2208 of mixer 2202 in FIG. 22 (assuming rectangular data signals 2206). In other words, reference clock 41 generates a cosine signal that it provides to signal shaping circuitry 2218. Signal shaping circuitry 2218 processes that signal to generate its magnitude, and provides the resulting signal (signal 2204A) to mixer 2202. Mixer 2202 mixes signal 2204A with input data signals 2206 to generate output signal 2208.

FIG. 25 depicts a Fourier transform of the signal in FIG. 24. Put another way, FIGS. 24 and 25 provide time and frequency domain representations, respectively, of output signal 2208 of mixer 2202. Thus, the waveform in FIG. 24 depicts the time signal:

$$s(t)=\cos(2\pi f_{osc}t),$$

and the spectrum in FIG. 25 illustrates the spectrum of s(t), or S(f):

$$S(f) = \frac{f_{osc}^2 \cos\left(\frac{\pi f}{2 f_{osc}}\right)}{(f_{osc}^2 - f^2)}.$$

In this exemplary embodiment, signal shaping circuitry 2218 realizes a magnitude function. The magnitude of the cosine function (i.e., output signal 2204A of signal shaping circuitry 2218), multiplied by the input data signals 2206, generates output signal 2208 of mixer 2202, as FIG. 24 illustrates (note, however, that FIG. 24 shows one cycle of signal 2208). As noted above, FIG. 25 illustrates the Fourier transform of the signal in FIG. 24. Effectively, in such an implementation, the input chip is weighted by a cosine function.

Note that the maximum chip rate constitutes twice the frequency of the reference clock, or $2f_{osc}$. One may, however, send sparse chips at a rate of:

$$R = \frac{2 f_{osc}}{N},$$

where $0 \leq N \leq \lceil 2 f_{osc} \rceil$. Furthermore, $$P_c = -41.3 + 10 \log(2.374 f_{osc}),$$

and the −10 dB point and the −20 dB point constitute, respectively, $2f_{osc}$ and $2.62 f_{osc}$. One may write the closest frequency above 3.1 GHz (the edge of the FCC-prescribed mask) where the signal level is −20 dB (or less), $f_1$, as:

$$f_1 = (m-2.62) \cdot f_{osc},$$

where m constitutes an integer.

Note that the signal in FIG. 24 and its associated spectrum in FIG. 25 constitute baseband signals. In other words, the spectrum of the signal in FIG. 24 centers around zero frequency, or DC. As the transmitter in FIG. 22 shows, one may heterodyne the baseband signal so as to center it around a relatively high frequency (an RF frequency). More specifically, one may use mixer 2204 to heterodyne output signal 2208 of mixer 2202 (by mixing it with signal 2210) and center it around a frequency $m \cdot f_{osc}$.

The heterodyning process shifts the spectrum of signal 2208 to a frequency band. The frequency band may constitute a desired frequency band, such as a band prescribed by a regulatory body (e.g., the FCC), or any other prescribed, specified, or designed frequency band. Using the inventive concepts described here, one may design an RF apparatus or system such that the shifted spectrum fits or satisfies a desired or prescribed mask, for example, a mask specified in the FCC's rulemaking.

Figure 26:
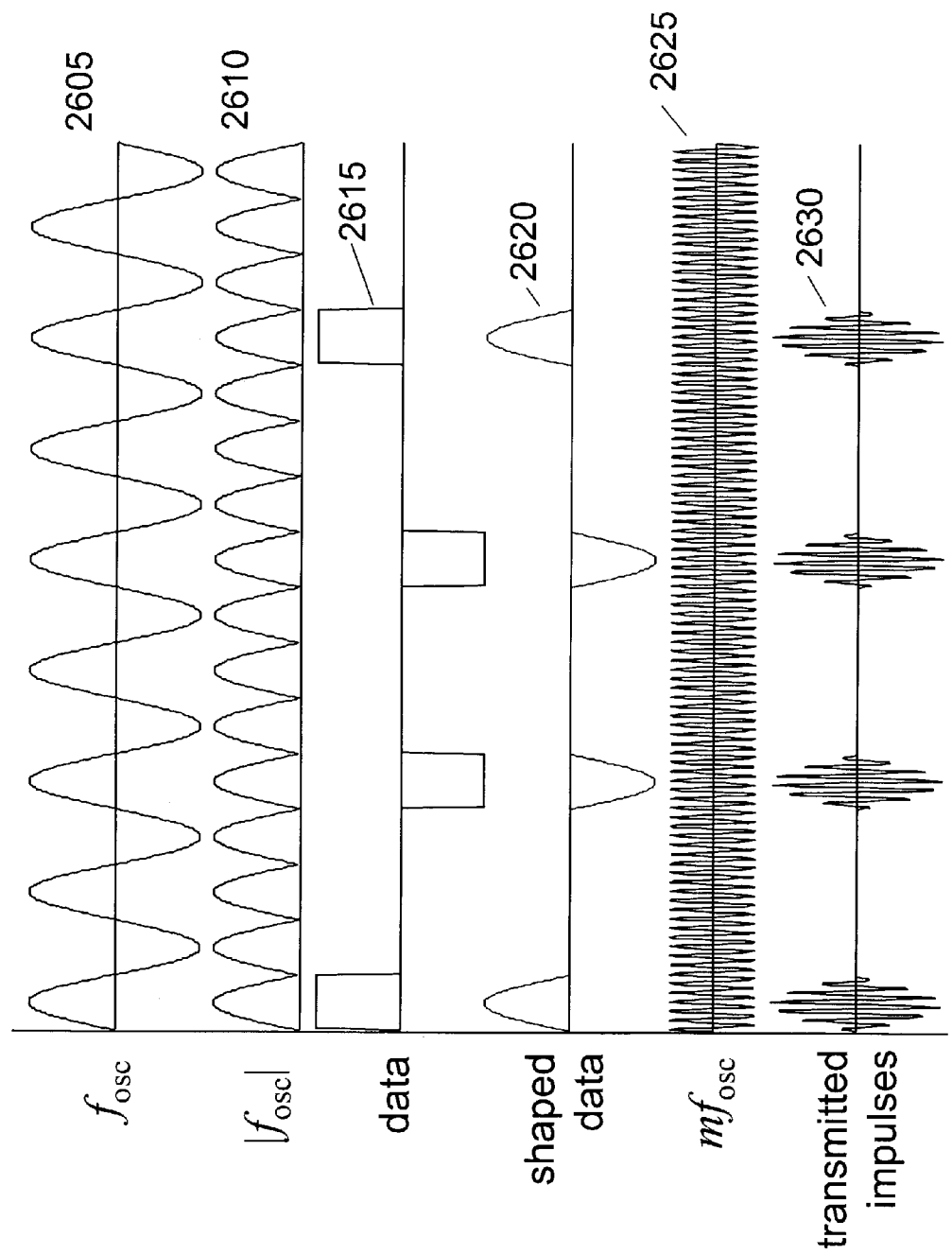
FIG. 26 illustrates sample waveforms in an exemplary embodiment of a transmitter according to the invention.

FIG. 26 illustrates sample waveforms in an exemplary embodiment of a transmitter according to the invention, such as transmitter 2200 in FIG. 22. Waveform 2605 corresponds to output signal 2202A of reference clock 41. Waveform 2610 denotes shaped output signal 2204A, i.e., the output of signal shaping circuitry 2218. In this particular embodiment, shaped output signal 2204A constitutes the magnitude of signal 2202A. As noted above, however, one may configure signal shaping circuitry 2218 to realize virtually any signal shaping or transfer function, as desired.

Waveform 2615 depicts input data signals 2206 (see FIG. 22). Waveform 2620 illustrates output signal 2208 as a function of time, i.e., the output signal of mixer 2202. Note that, as described above, waveform 2620 corresponds to the product (by mixing) of waveform 2610 and waveform 2615. As noted above, waveform 2620 corresponds to a baseband signal (i.e., a signal centered around zero frequency, or DC).

Waveform 2625 denotes output signal 2210 of harmonic generator 2220. Note that waveform 2625 corresponds to a particular value of m. As noted above, the value of m varies as a function of time. Thus, the frequency of waveform 2625 also varies as a function of time (in proportion with the value of m).

Waveform 2630 illustrates the output signal of mixer 2204, which constitutes modulated RF signals 2212. Note that mixer 2204 mixes output signal 2208 (a baseband signal) with output signal 2210 of harmonic generator 2220 (an RF signal) to generate modulated RF signals 2212.

As persons of ordinary skill in the art with the benefit of the description of the invention understand, one may generate in-phase and quadrature orthogonal channels as part of the heterodyning scheme. More specifically, by mixing output signal 2208, or a pulse, with a cosine signal, one may generate an in-phase or I channel. Thus, $$s_I(t) = [\cos(2\pi f_{osc} t)] \cdot \cos(2\pi f_o t),$$

and $$S(f) = f_{osc}^2 \cdot \left| \frac{\cos\left(\frac{\pi[|f| - f_0]}{2 f_{osc}}\right)}{\left[f_{osc}^2 - [|f| - f_0]^2\right]} \right|,$$

where $$f_o = m \cdot f_{osc}.$$

Figure 27:
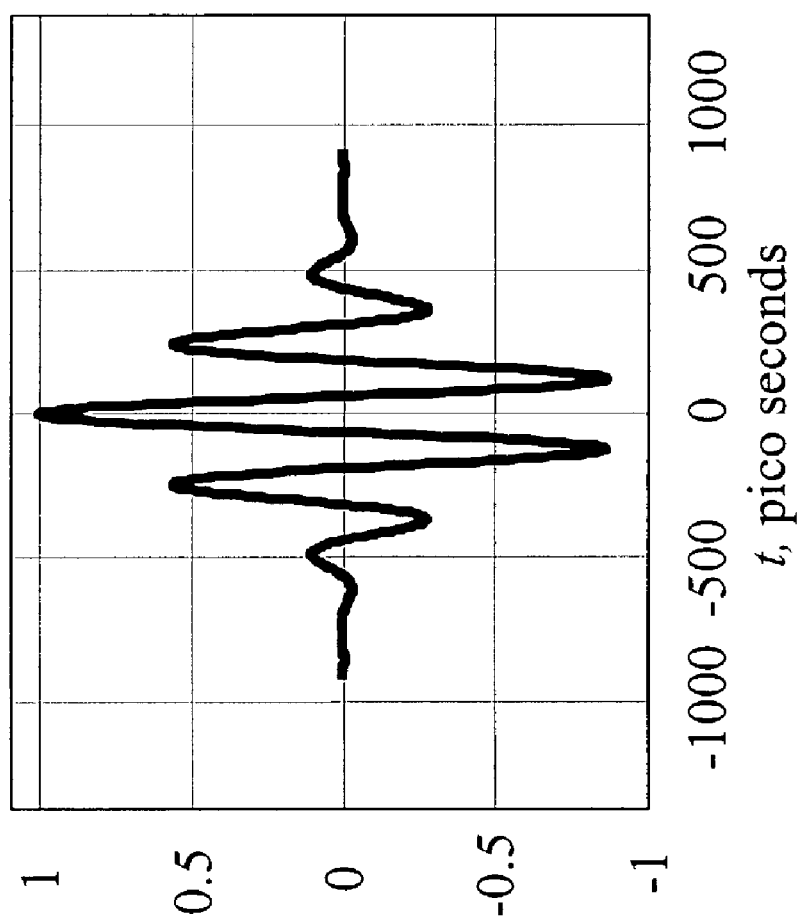
FIG. 27 depicts an exemplary in-phase channel pulse as a function of time in an illustrative embodiment according to the invention.
Figure 28:
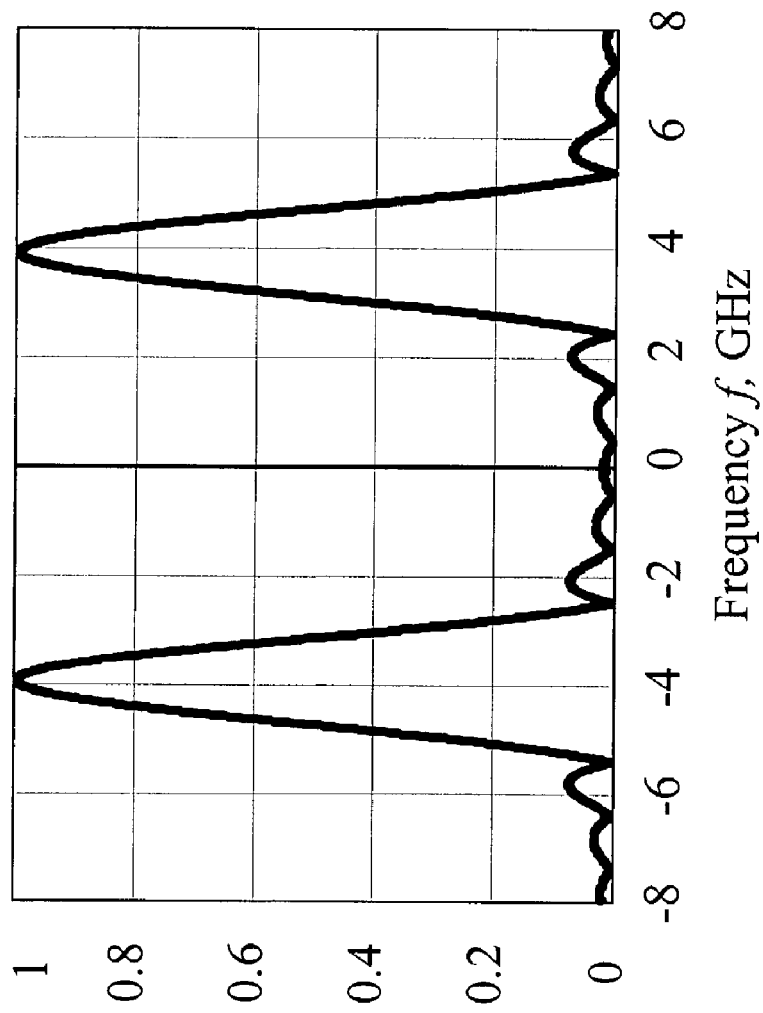
FIG. 28 shows the magnitude of the spectrum of the signal in FIG. 27.

FIG. 27 illustrates an exemplary I-channel pulse (as mixed to generate a shifted or heterodyned signal) as a function of time. FIG. 28 shows the magnitude of the spectrum of the signal in FIG. 27. Note that heterodyning has shifted the spectrum of the baseband signal and has centered it around a relatively high frequency (approximately 4 GHz).

Conversely, mixing output signal 2208, or a pulse, with a sinusoid, one may generate a quadrature or Q channel. Thus, $$s_Q(t) = [\cos(2\pi f_{osc} t)] \cdot \sin(2\pi f_o t),$$

and $$S(f) = f_{osc}^2 \cdot \left| \frac{\cos\left(\frac{\pi[|f| - f_0]}{2 f_{osc}}\right)}{\left[f_{osc}^2 - [|f| - f_0]^2\right]} \right|.$$

Figure 29:
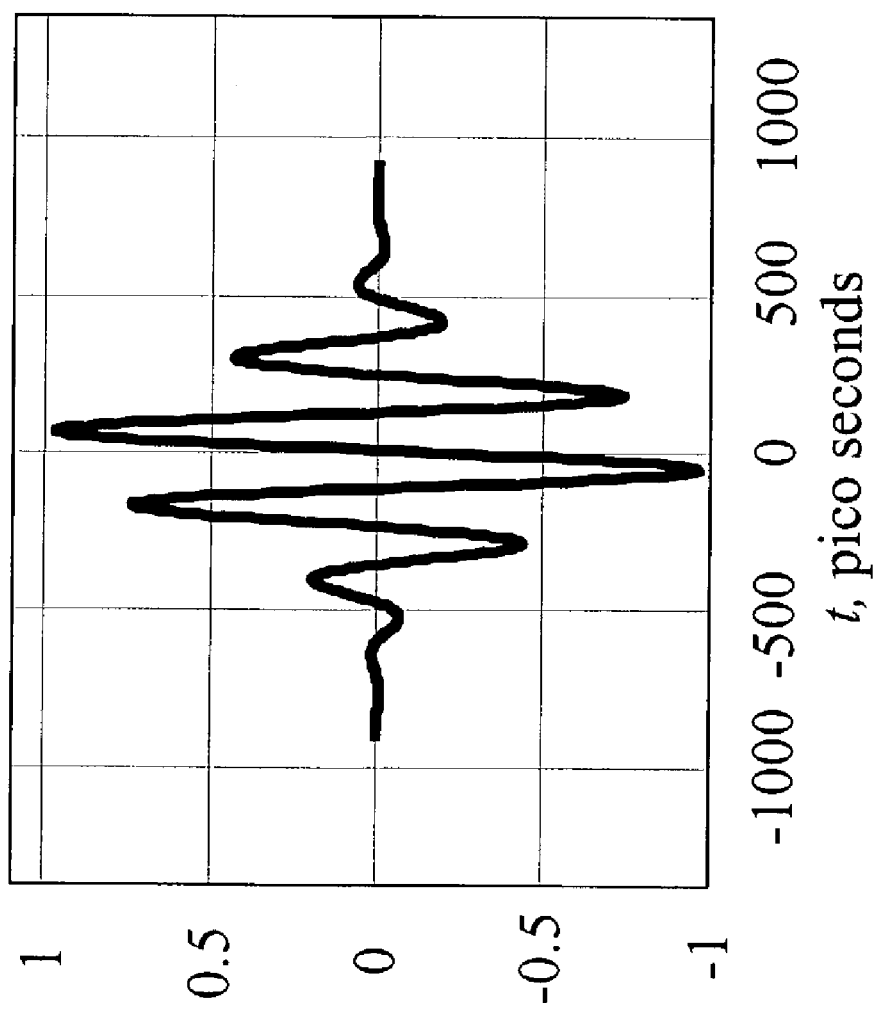
FIG. 29 illustrates an exemplary quadrature channel pulse as a function of time in an illustrative embodiment according to the invention.
Figure 30:
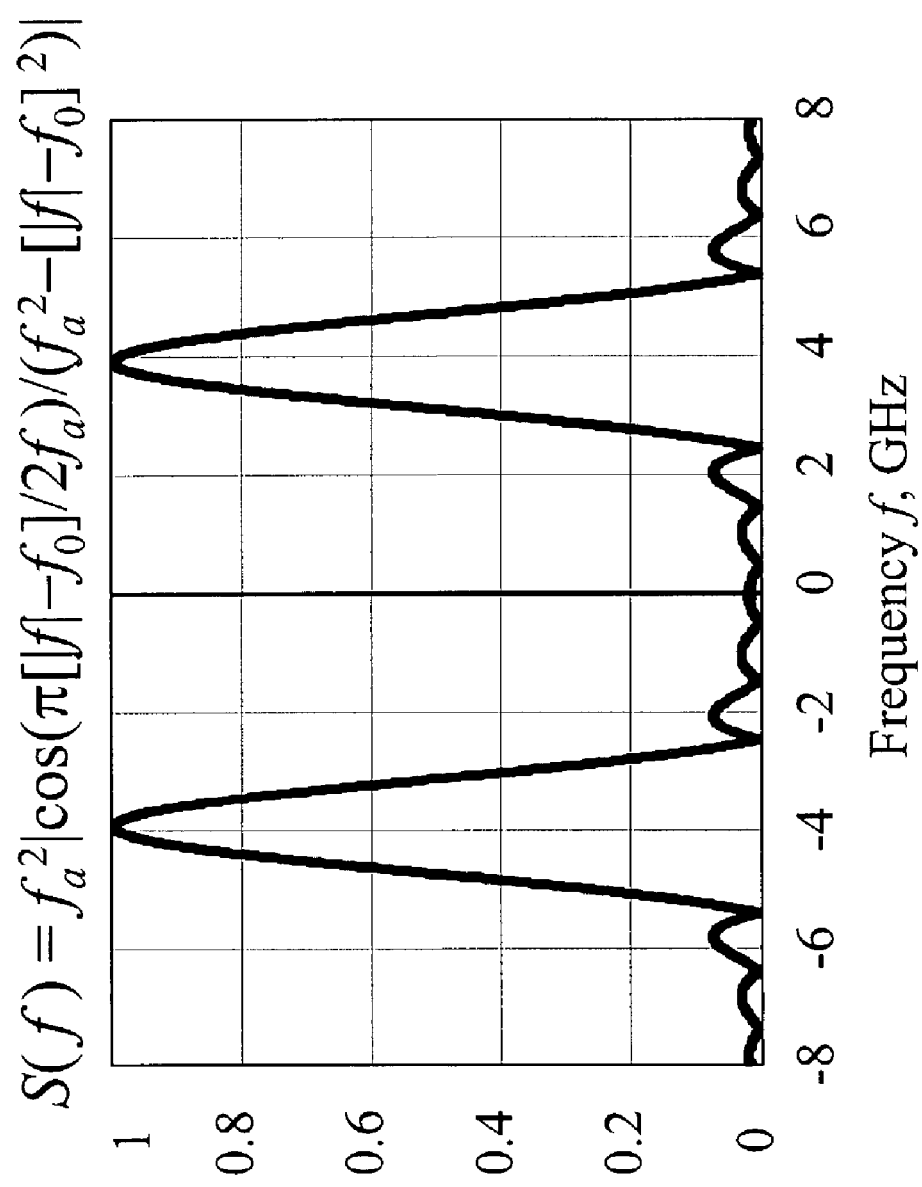
FIG. 30 depicts the magnitude of the spectrum of the signal in FIG. 29.

FIG. 29 illustrates an exemplary Q-channel pulse (as mixed to generate a shifted or heterodyned signal) as a function of time. FIG. 30 shows the magnitude of the spectrum of the signal in FIG. 29. Note that heterodyning has shifted the spectrum and has centered it around a relatively high frequency (approximately 4 GHz).

Note further that the formulae for S(f) for the I and Q channels, and the magnitude of the spectra in FIGS. 28 and 30, are the same. As persons skilled in the art with the benefit of the description of the invention understand, the phase of the spectra are different for the I and Q channels. (As noted above, however, FIGS. 28 and 30 depict the magnitude of the respective spectra and therefore do not illustrate the phase differences.)

Figure 31:
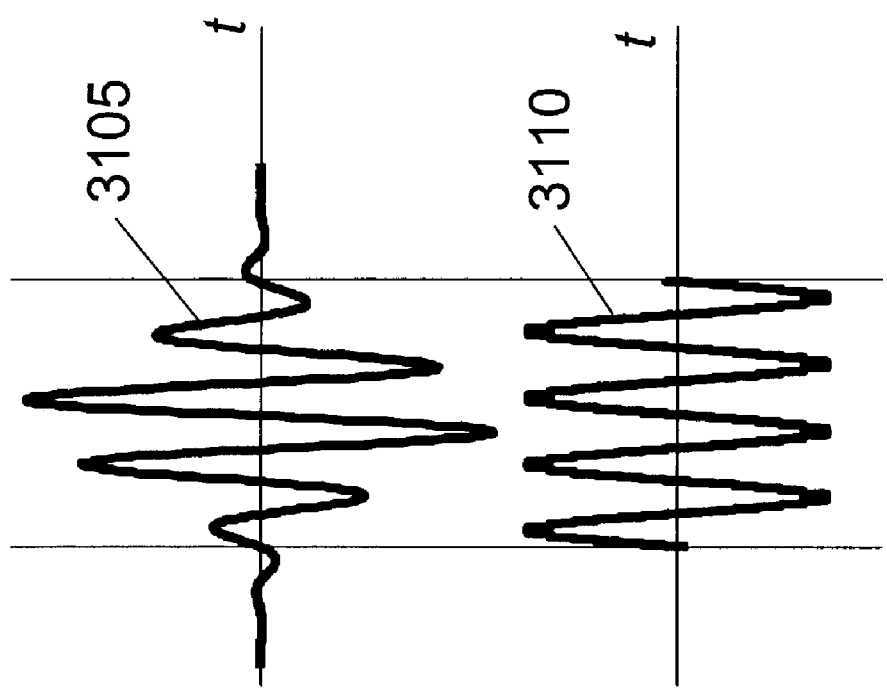
FIG. 31 shows two signals as a function of time in illustrative embodiments according to the invention.
Figure 32:
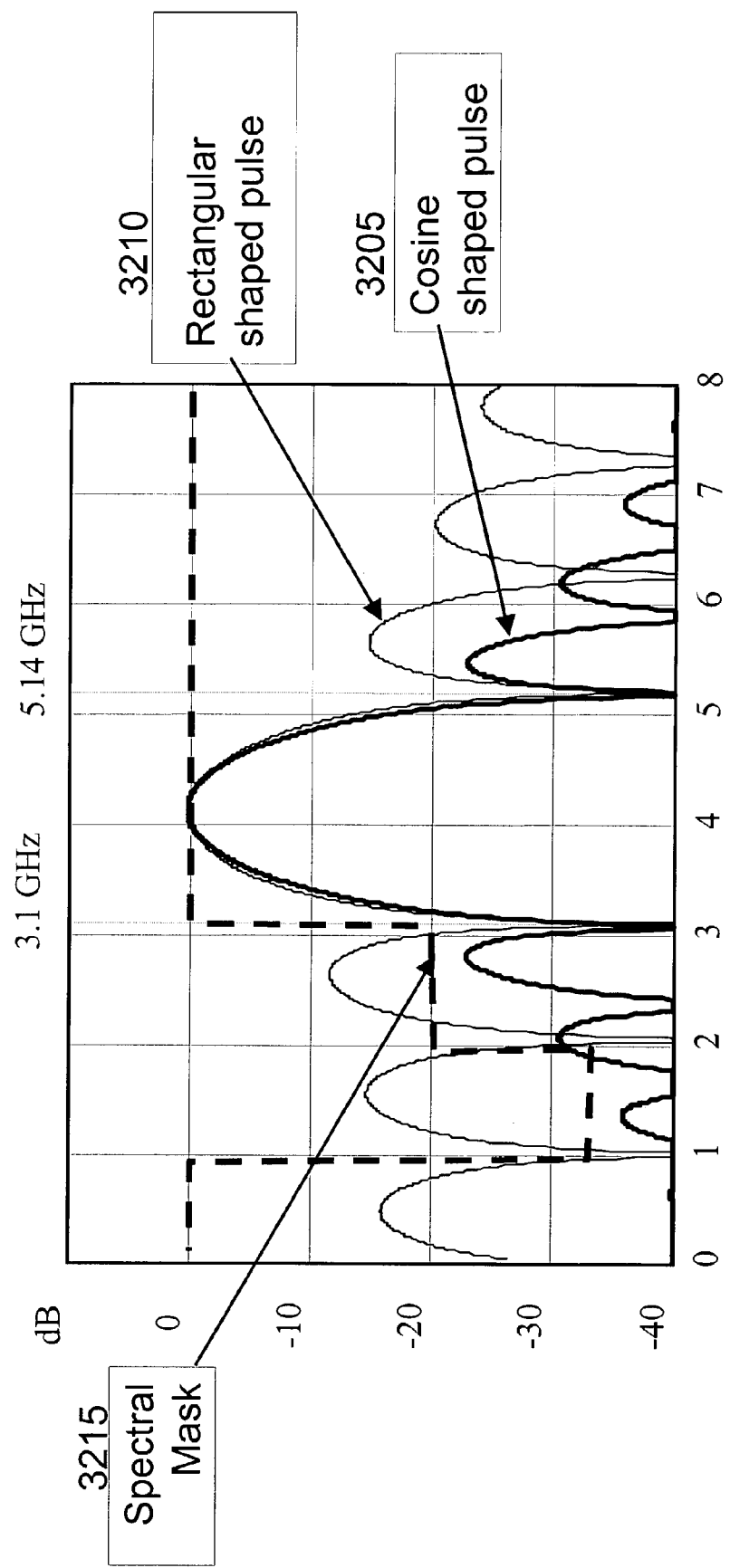
FIG. 32 illustrates the spectra resulting from using the signal shaping shown in FIG. 31.

As noted above, by using signal shaping circuitry 2218, one may reduce the magnitude of the side lobes present in the output spectra or profiles of transmitter 2200 (see FIG. 22). FIGS. 31 and 32 illustrate examples of how shaping the pulses affects the side lobe magnitudes.

FIG. 31 shows two signals as a function of time that correspond to a cosine-shaped pulse and a pulse with no shaping, in illustrative embodiments according to the invention. Signal 3105 corresponds to a cosine-shaped pulse in output signal 2212 (see FIG. 22) or, put differently, to a situation where one realizes a magnitude function by using signal shaping circuitry 2218. Signal 3110, on the other hand, corresponds to a situation where one does not apply any signal shaping to signal 2202A. In other words, in the latter situation, signal 2204A constitutes a rectangular pulse or a DC level.

FIG. 32 illustrates the spectra resulting from using the signal shaping shown in FIG. 31. Spectrum 3205 corresponds to the cosine-weighted pulse (shown as signal 3105 in FIG. 31). Spectrum 3210 corresponds to the situation where one does not apply any signal shaping. Note that the side lobes of spectrum 3205 have a smaller magnitude than do the side lobes of spectrum 3210. Spectral mask 3215 denotes a desired or specified mask, such as a mask prescribed by the FCC.

Figure 33:
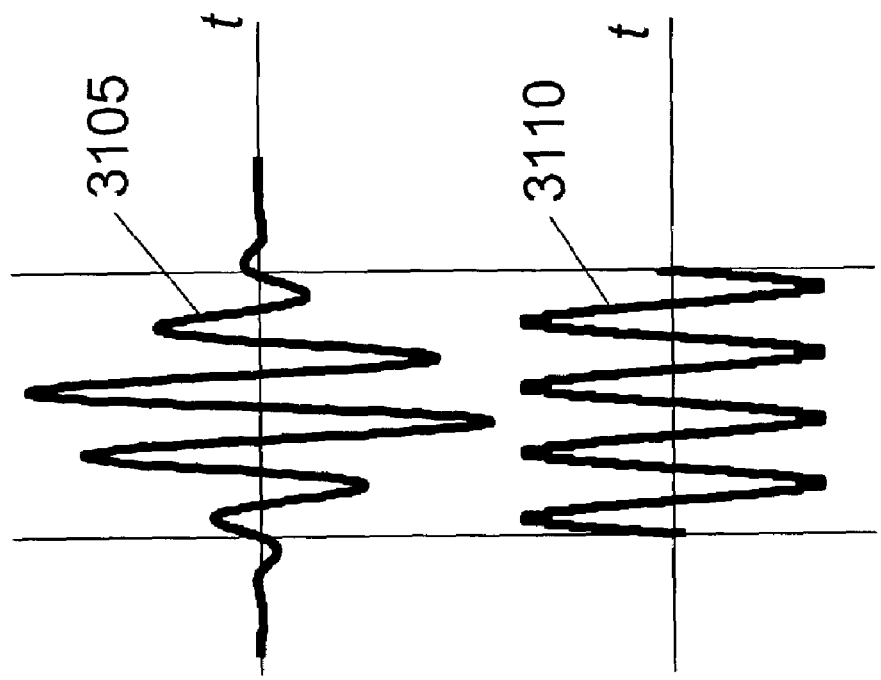
FIG. 33 depicts two signals as a function of time in other illustrative embodiments according to the invention.
Figure 34:
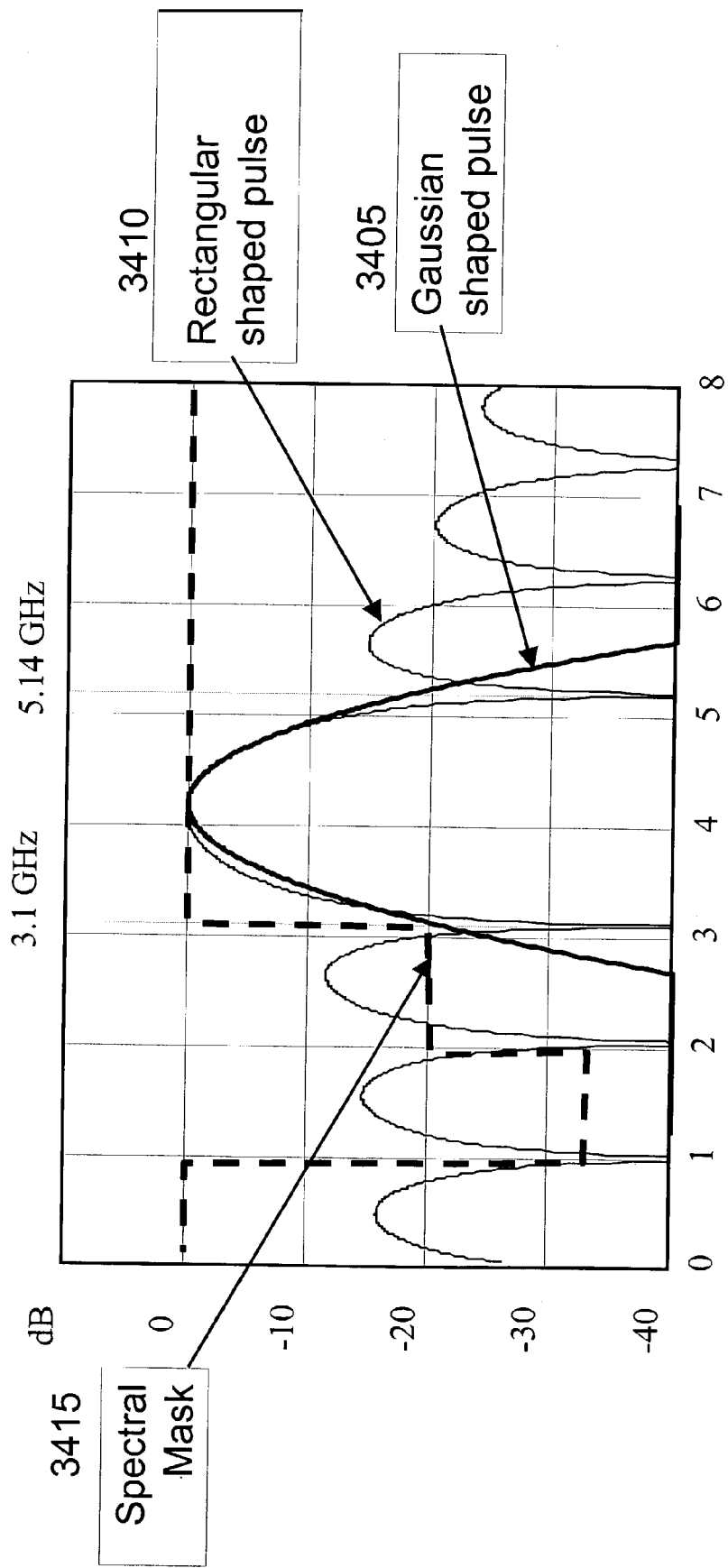
FIG. 34 shows the spectra resulting from using the signal shaping shown in FIG. 33.

As noted above, one may apply virtually any signal shaping via signal shaping circuitry 2218. FIGS. 33 and 34 provide additional examples of how shaping the pulses affects the side lobe magnitudes.

FIG. 33 shows two signals as a function of time that correspond to a Gaussian-shaped pulse and a pulse with no shaping, in illustrative embodiments according to the invention. Signal 3105 corresponds to a Gaussian-shaped pulse in output signal 2212 (see FIG. 22) or, put differently, to a situation where signal shaping circuitry 2218 generates a Gaussian-shaped signal (or an approximation to a Gaussian-shaped signal), as described by the equation $s(t) = e^{-0.5 t^2/\tau^2}$, at its output. Signal 3110, similar to FIG. 31, corresponds to a situation where one does not apply any signal shaping to signal 2202A.

FIG. 34 illustrates the spectra resulting from using the signal shaping shown in FIG. 33. Spectrum 3405 corresponds to the Gaussian-weighted pulse (shown as signal 3305 in FIG. 33). Spectrum 3410 corresponds to the situation where one does not apply any signal shaping. Similar to FIG. 32, note that the side lobes of spectrum 3405 have a smaller magnitude than do the side lobes of spectrum 3410. Spectral mask 3415, similar to spectral mask 3215 in FIG. 32, denotes a desired or specified mask, such as a mask prescribed by the FCC.

Note that the choice of signal shaping function realized or applied by signal shaping circuitry 2218 tends to not affect the characteristics of the main lobe in the spectrum of the resulting output signal of the transmitter. In other words, although certain signal shaping schemes (for example, the techniques described above) tends to reduce the magnitude of the spectral side lobes, the main lobe characteristics tend to remain relatively unaltered. As an example, note that in FIG. 32, the main lobe in spectrum 3205 has a substantially similar shape and magnitude as does the main lobe in spectrum 3210.

Depending on the signal shaping implemented or realized by signal shaping circuitry 2218, the side lobes in the spectrum of the resulting signal at the output of mixer 2202 (i.e., signal 2212 in FIG. 22) may have too high a magnitude. In other words, the side lobes in the spectrum of the resulting signal may exceed a limitation prescribed by a particular mask. In such cases, one may filter signal 2212 before providing it to antenna 48. One may configure or design the transfer function (i.e., the filtering characteristics) of the filter to remove or reduce energy at certain frequencies or within certain frequency bands. Doing so reduces the side lobe magnitudes that would otherwise not fit within the constraints of the particular mask.

Apparatus and methods according to the invention are flexible and lend themselves to a broad range of implementations, as persons of ordinary skill in the art who have the benefit of the description of the invention understand. One may design, implement, and manufacture communication apparatus and systems according to the invention using a wide variety of semiconductor materials and technologies. For example, one may use silicon, thin-film technology, silicon-on-insulator (SOI), silicon-germanium (SiGe), gallium-arsenide (GaAs), as desired.

Furthermore, one may implement such systems and apparatus using n-type metal oxide semiconductor (NMOS), p-type metal oxide semiconductor (PMOS), complementary metal oxide semiconductor (CMOS), bipolar junction transistors (BJTs), a combination of BJTs and CMOS circuitry (BiCMOS), hetero-junction transistors, and the like, as desired. The choice of semiconductor material, technology, and design methodology depends on design and performance specifications for a particular application, as persons of ordinary skill in the art who have the benefit of the description of the invention understand.

Note that, by taking advantage of standard semiconductor devices and fabrication technology, one may manufacture communication systems and apparatus according to the invention with high yield, high reliability, and low cost. For example, one may manufacture such systems and apparatus using standard mixed-signal CMOS processes. This flexibility allows manufacture and marketing of high data-rate consumer products, professional products, health-care products, industrial products, scientific instrumentation, military gear, and the like, that employ communication systems and apparatus according to the invention.

Although the above description of communication systems and apparatus relates to wireless communications, one may use the disclosed inventive concepts in other contexts, as persons of ordinary skill in the art who have the benefit of the description of the invention understand. For example, one may realize high data-rate land-line (i.e., using cables, fiber optics, house wiring, coaxial lines, twin-lead lines, telephone lines, cable television lines, and the like) communication systems and apparatus, as desired.

Put another way, one may omit the antennas (and any associated circuitry) and couple the transmitter and receiver together via a transmission line such as a wire line or an optical fiber. In such systems, one obtains the same or similar benefits as the wireless counterparts. More specifically, the UWB signal can coexist with other signals on the same transmission medium.

The spectra shown in various figures (e.g., FIGS. 13–16) are representative of transmitted and emitted spectra. Radio wave propagation in free space exhibits no frequency dependency, so the field strength PSD at the receiver is the same as the transmitted PSD, and the signal attenuates as $1/(4\pi r^2)$. As noted above, if one receives the signal with a constant-aperture type of antenna, then the received spectrum equals the transmitted spectrum. An example of a constant-aperture antenna is a wide-band horn or a wide-band parabola whose gain increases as the square of frequency.

On the other hand, if one receives the signal with a constant-gain type of antenna, then the received spectrum will have an imposed $1/f^2$ characteristic. An example of a suitable constant-gain antenna is a wide dipole whose gain is essentially flat with frequency. Non-free-space environments may exhibit some frequency dependencies. Those effects, however, are essentially equal whether one employs a constant-aperture or a constant-gain antenna is employed.

Referring to the figures, the various blocks shown (for example, FIG. 3 or FIG. 5) depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have read the disclosure of the invention will understand.

Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only.

The forms of the invention shown and described should be taken as the presently preferred embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

I claim:

1. A radio-frequency (RF) transmitter, comprising:
   a reference signal generator, the reference signal generator configured to provide a reference signal having a frequency;
   a signal generator coupled to the reference signal generator and operable to receive the reference signal, the signal generator configured to provide an operating signal based on a selection signal, wherein said selection signal varies according to a predetermined channel frequency and timing plan, wherein the operating signal has a frequency equal to the frequency of the reference signal multiplied by a number; and
   a first mixer operable to receive the operating signal, the first mixer configured to mix the operating signal with a first signal comprising data to generate a transmission signal, wherein the predetermined channel frequency and timing plan is configured to cause the transmission of the transmission signal on each of a plurality of predetermined harmonic frequencies in a predetermined order, the transmission time duration on any one of the plurality of harmonic frequencies lasting for a predetermined time duration.

2. The transmitter according to claim 1, further comprising a second mixer, the second mixer configured to mix an input data signal with a second signal to generate the first signal.

3. The transmitter according to claim 2, further comprising a signal shaping circuitry, the signal shaping circuitry configured to generate the second signal by shaping the reference signal.

4. The transmitter according to claim 3, wherein the input data signal comprises a modulated data signal.

5. The transmitter according to claim 4, wherein the input data signal comprises a binary phase shift keyed (BPSK) signal.

6. The transmitter according to claim 4, wherein the input data signal comprises a quadrature amplitude modulated (QAM) signal.

7. The transmitter according to claim 4, wherein the input data signal comprises a quadrature phase shift keyed (QPSK) signal.

8. The transmitter according to claim 3, wherein the signal shaping circuitry is configured to full-wave rectify the reference signal to generate the second signal.

9. The transmitter according to claim 8, wherein the reference signal comprises a sinewave signal.

10. The transmitter according to claim 3, wherein the signal shaping circuitry is configured to generate a Gaussian-shaped signal as the second signal.

11. The transmitter according to claim 3, wherein the signal shaping circuitry comprises a filter.

12. The transmitter according to claim 1, further comprising a filter, the filter configured to receive the transmission signal, the filter further configured to generate a filtered transmission signal.

* * * * *